US012535531B2

(12) United States Patent
Hotta et al.

(10) Patent No.: US 12,535,531 B2
(45) Date of Patent: Jan. 27, 2026

(54) IMPEDANCE MEASUREMENT DEVICE

(71) Applicant: HIOKI E.E. CORPORATION, Nagano (JP)

(72) Inventors: Akinori Hotta, Nagano (JP); Hiroyuki Toya, Nagano (JP); Hiroyoshi Ikeda, Nagano (JP); Shin Kasai, Nagano (JP); Tomoharu Sakai, Nagano (JP); Yasuyuki Tsukioka, Nagano (JP); Koichi Yanagisawa, Nagano (JP)

(73) Assignee: HIOKI E.E. CORPORATION, Nagano (JP)

( * ) Notice: Subject to any disclaimer, the term of this patent is extended or adjusted under 35 U.S.C. 154(b) by 301 days.

(21) Appl. No.: 18/563,141

(22) PCT Filed: Mar. 25, 2022

(86) PCT No.: PCT/JP2022/014242
§ 371 (c)(1),
(2) Date: Nov. 21, 2023

(87) PCT Pub. No.: WO2022/249709
PCT Pub. Date: Dec. 1, 2022

(65) Prior Publication Data
US 2024/0230780 A1 Jul. 11, 2024

(30) Foreign Application Priority Data

May 24, 2021 (JP) .................................. 2021-086778
Jun. 18, 2021 (JP) .................................. 2021-101505
Oct. 29, 2021 (JP) .................................. 2021-177590

(51) Int. Cl.
*G01R 31/389* (2019.01)
*G01R 15/18* (2006.01)
(Continued)

(52) U.S. Cl.
CPC ........... *G01R 31/389* (2019.01); *G01R 15/18* (2013.01); *G01R 27/16* (2013.01); *G01R 31/386* (2019.01)

(58) Field of Classification Search
CPC ...... G01R 31/389; G01R 15/18; G01R 27/16; G01R 31/386; G01R 15/20; G01R 27/02
(Continued)

(56) References Cited

FOREIGN PATENT DOCUMENTS

| CA | 3063083 A1 | * | 12/2020 | ............. B64D 15/12 |
| CN | 110531139 A | * | 12/2019 | ......... G01R 19/0092 |

(Continued)

*Primary Examiner* — Judy Nguyen
*Assistant Examiner* — Robert P Alejnikov, Jr.
(74) *Attorney, Agent, or Firm* — Conley Rose, P.C.

(57) ABSTRACT

A signal injection unit configured to inject an AC signal to an target injection line to which a battery is connected in series, a non-contact-type current sensor that detects a current value of the AC signal flowing through the target injection line in a non-contact manner with respect to the target injection line and outputs a detection signal, a voltage detection unit that detects a voltage value of an AC voltage generated at ends of the battery by being in contact with the ends and outputs an end-to-end voltage signal, and a processing unit that measures an internal impedance of the battery on the basis of the detection signal and the end-to-end voltage signal. The signal injection unit is configured to inject the AC signal to the target injection line in a non-contact manner.

37 Claims, 23 Drawing Sheets

(51) Int. Cl.
  *G01R 27/16*   (2006.01)
  *G01R 31/385*   (2019.01)
(58) Field of Classification Search
  USPC .......................................................... 324/430
  See application file for complete search history.

(56)     References Cited

FOREIGN PATENT DOCUMENTS

| CN | 111650526 A | * | 9/2020 | ........... G01R 31/389 |
|---|---|---|---|---|
| JP | 7-110345 A | | 4/1995 | |
| JP | 2004-251625 A | | 9/2004 | |
| JP | 2012-108007 A | | 6/2012 | |
| JP | 2012-113884 A | | 6/2012 | |
| JP | 2016-188790 A | | 11/2016 | |
| JP | 2018-126006 A | | 8/2018 | |
| JP | 2019-204158 A | | 11/2019 | |
| KR | 20100079288 A | * | 7/2010 | ............. G01R 15/18 |
| WO | 2014/010187 A1 | | 1/2014 | |
| WO | 2014/104188 A1 | | 7/2014 | |

* cited by examiner

IMPEDANCE MEASUREMENT DEVICE

TECHNICAL FIELD

The present invention relates to an impedance measurement device that measures an impedance of a measurement target connected in series to a target injection line formed of a conductor in a state where an AC signal for measurement is injected into the target injection line by a signal injection unit.

BACKGROUND ART

An internal impedance measurement device for a battery (hereinafter, also referred to as "measurement device") disclosed in the following patent document is a known impedance measurement device of this type. The measurement device includes an AC power supply unit, an AC voltage detection unit, an AC current detection unit, and a calculation control unit. The measurement device is configured to measure an internal impedance of a secondary battery in a state where a DC current is supplied to a load connected via a pair of power lines.

In this measurement device, the AC current supply unit functions as a signal injection unit and supplies an AC current for measurement to the secondary battery. At this time, the AC voltage detection unit detects an AC voltage generated between terminals of the secondary battery when the AC current is supplied, and the AC current detection unit detects an AC current flowing through the secondary battery when the AC current is supplied. Next, the calculation control unit calculates an internal impedance of the secondary battery on the basis of the AC voltage detected by the AC voltage detection unit and the AC current detected by the AC current detection unit. Therefore, the measurement device can measure the impedance of the secondary battery as a measurement target connected in series to the pair of power lines formed of conductors in a state where the AC signal for measurement is injected into the pair of power lines.

CITATION LIST

Patent Literature

Patent Document 1: JP 2004-251625 A (pages 3 to 7, FIG. 1)

SUMMARY OF INVENTION

Technical Problem

However, the following problems are present in the above measurement device. Specifically, at the time of measuring the impedance in the measurement device, the AC power supply unit (signal injection unit) needs to be connected directly to ends of the secondary battery such that the AC current is supplied to the secondary battery via the ends. In this case, when the secondary battery is used for a fuel cell vehicle (FCV) or the like, the voltage between the ends is a voltage that is as high as about DC 650 V. Thus, an expensive part having a breakdown voltage greater than or equal to an output voltage of the secondary battery needs to be used as an internal part of the AC power supply unit connected directly to the ends of the secondary battery. Therefore, the AC power supply unit needs be configured with a high breakdown voltage specification, leading to significantly high manufacturing costs for the entire measurement device. Thus, it is desirable to solve this problem.

The present invention was made in view of such a problem, and a main object thereof is to provide an impedance measurement device that can sufficiently reduce manufacturing costs of the entire impedance measurement device and reliably measure an impedance of a measurement target by using a signal injection unit of a low breakdown voltage specification even when a high voltage is present in an target injection line to which the measurement target is connected in series and an AC signal for measurement is injected.

Solution to Problem

To achieve the above object, an impedance measurement device according to the present invention includes: a signal injection unit configured to generate an AC signal for measurement and inject the AC signal to an target injection line to which a measurement target is connected in series; a non-contact-type current detection unit configured to detect a current value of the AC signal flowing through the target injection line in a non-contact manner with respect to the target injection line, and output a current detection signal; a voltage detection unit configured to detect a voltage value of the AC voltage generated at ends of the measurement target by being in contact with the ends, and output a voltage detection signal; and a processing unit configured to receive input of the current detection signal and the voltage detection signal and measure an impedance of the measurement target on the basis of the current detection signal and the voltage detection signal, in which the signal injection unit is configured to inject the AC signal to the target injection line in a non-contact manner.

In the impedance measurement device, the signal injection unit injects the AC signal in a non-contact manner with respect to the target injection line, the non-contact-type current detection unit detects the current value of the AC signal flowing through the target injection line in a non-contact manner with respect to the target injection line and outputs the current detection signal, the voltage detection unit detects a voltage value of the AC signal generated at the ends of the measurement target by being in contact with the ends and outputs the voltage detection signal, and the processing unit inputs the current detection signal and the voltage detection signal and measures the impedance of the measurement target on the basis of the current detection signal and the voltage detection signal.

Therefore, according to the impedance measurement device, the signal injection unit injects the AC signal to the target injection line in a non-contact manner even when a measurement target is connected in series and a high voltage is present at the target injection line to which the AC signal for measurement is injected, it is thus possible to use a part of a low breakdown voltage specification as a part constituting the signal injection unit, and as a result, it is possible to reduce manufacturing costs of the signal injection unit, thus to sufficiently reduce manufacturing costs of the entire impedance measurement device, and to reliably measure the impedance of the measurement target.

Also, the impedance measurement device according to the present invention includes an insulating circuit configured to output the detected voltage detection signal to the processing unit in a state where the voltage detection unit is insulated from the measurement target.

In the impedance measurement device, the non-contact-type current sensor detects the current of the AC current flowing through the target injection line in a non-contact manner with respect to the target injection line and outputs the current detection signal to the processing unit, the voltage detection unit outputs the end-to-end voltage signal detected by being in contact with ends of the measurement target to the processing unit in a state where the voltage detection unit is insulated from the measurement target, and it is thus possible to accurately detect the minute AC voltage generated inside the measurement target due to the current flowing through the measurement target on the basis of the injection of the AC signal even if a significantly high voltage has occurred in the measurement target or even in a case where noise such as switching noise is present in the surroundings of a load or the impedance measurement device. Therefore, according to the impedance measurement device, it is possible to accurately measure the impedance of the measurement target. Also, according to the impedance measurement device, the non-contact-type current sensor is used, and it is thus possible to measure the impedance of the measurement target in a non-contact manner with respect to and without cutting the target injection line.

Moreover, in the impedance measurement device according to the present invention, the processing unit includes a first quadrature detection circuit configured to receive input of the AC signal, perform quadrature detection on the current detection signal, and generate an in-phase component and a quadrature component of the AC current, a second quadrature detection circuit configured to receive input of the AC signal, perform quadrature detection on the voltage detection signal, and generate an in-phase component and a quadrature component of the AC voltage, and an arithmetic circuit configured to compute the impedance of the measurement target on the basis of the in-phase component and the quadrature component of the AC current output from the first quadrature detection circuit and the in-phase component and the quadrature component of the AC voltage output from the second quadrature detection circuit.

According to the impedance measurement device, the arithmetic circuit of the processing unit computes the impedance of the measurement target on the basis of the in-phase component and the quadrature component of the AC current output from the first quadrature detection circuit and the in-phase component and the quadrature component of the AC voltage output from the second quadrature detection circuit, and it is thus possible to accurately measure the impedance by increasing a ratio (S/N) of a signal level (S) of the AC signal injected to the target injection line with respect to a noise level (N) even when the signal level is low.

Also, in the impedance measurement device according to the present invention, the signal injection unit includes a primary winding component constituting a primary winding to be magnetically coupled to the target injection line as a secondary winding, the signal injection unit injecting the AC signal to the target injection line by applying the AC signal to the primary winding component.

Also, in the impedance measurement device according to the present invention, the primary winding component includes an insulated coated wire wound around a first magnetic core, the first magnetic core having an annular shape and being configured to receive insertion of the target injection line.

According to these impedance measurement devices, it is possible to simply constitute the primary winding component and to reliably inject the AC signal to the target injection line.

Also, in the impedance measurement device according to the present invention, the first magnetic core is provided with gaps. According to the impedance measurement device, it is possible to avoid saturation of the magnetic core by the gaps being provided in the magnetic core.

Moreover, in the impedance measurement device according to the present invention, the first magnetic core is configured of a plurality of C-type unit magnetic cores, and the plurality of unit magnetic cores overlap each other such that a separation distance between two of the gaps being mutually adjacent is equal along an outer periphery of the first magnetic core in a top view in an overlapping state.

According to the impedance measurement device, it is possible to stably inject the AC signal to the target injection line without decreasing injection of the AC signal to the target injection line regardless of the position of the target injection line inserted into the magnetic core even if the target injection line is located near the gaps.

Furthermore, in the impedance measurement device according to the present invention, the primary winding component includes Na windings from a first winding to an Na-th winding (Na is an integer greater than or equal to two) that are configured of the insulated coated wires wound around the first magnetic core and are connected in series as a whole, and Na switches from a first parallel switch to an Na-th parallel switch that are connected in parallel to the first winding to the Na-th winding, respectively, and the processing unit performs ON/OFF control on the Na parallel switches to change the number of turns of the primary winding component overall.

According to the impedance measurement device, it is possible to accurately inject the AC signal to the target injection line regardless of how large the load impedance as viewed from the signal injection winding is when a load is connected to the measurement target and a closed loop state has been achieved, by changing the number of turns of the primary winding component overall.

Also, in the impedance measurement device according to the present invention, each of the first winding to the Na-th winding is wound such that the numbers of turns are different from each other. According to the impedance measurement device, it is possible to increase or decrease numbers of turns in contrast to a primary winding component configured to have the same numbers of turns.

Also, in the impedance measurement device according to the present invention, each of the first winding to the Na-th winding is wound a number of times obtained by multiplying $2^{Ma}$ (Ma denotes Na integers from 0 to (Na−1)) by La being an integer greater than or equal to 1. According to the impedance measurement device, it is possible to finely control the number of turns of the primary winding component overall.

Moreover, in the impedance measurement device according to the present invention, the first winding to the Na-th winding are formed such that wire diameters of core wires in the insulated coated wires of windings with larger numbers of turns are thinner than wire diameters of core wires in the insulated coated wires of windings with smaller numbers of turns. According to the impedance measurement device, it is possible to use thin insulated coated wires (or enameled wires) for the windings with the larger numbers of turns, and as a result, it is possible to sufficiently improve productivity of the signal injection windings.

Also, in the impedance measurement device according to the present invention, the signal injection unit includes a capacitor circuit that constitutes, with the primary winding, an LC resonance circuit that has a resonance point at a frequency of the AC signal or at a frequency in a vicinity of the frequency. According to the impedance measurement device, the signal injection unit includes the capacitor circuit that constitutes, with the primary winding, the LC resonance circuit that has the resonance point at the frequency of the AC signal or at the frequency in the vicinity of the frequency, the AC signal thus easily flows through the primary winding, and as a result, it is possible to sufficiently reduce a loss of the AC signal at the LC resonance circuit.

Furthermore, in the impedance measurement device according to the present invention, the signal injection unit includes a damping resistor configured to cause a Q value of the LC resonance circuit to decrease. According to the impedance measurement device, it is possible to sufficiently reduce a loss of the AC signal at the LC resonance circuit even if the frequency of the AC signal generated by the signal injection unit and a resonance frequency of the LC resonance circuit are slightly different from each other.

Also, in the impedance measurement device according to the present invention, the signal injection unit includes an amplification circuit configured to amplify the AC signal, and the LC resonance circuit is disposed as a load circuit of the amplification circuit. According to the impedance measurement device, it is possible to cause the amplification circuit to linearly amplify the AC signal of a sine wave.

Also, in the impedance measurement device according to the present invention, the LC resonance circuit is configured of an LC parallel resonance circuit with one end of the LC resonance circuit connected to a high potential, and the amplification circuit is configured of an N-channel MOSFET with a side of the other end of the LC resonance circuit connected to a drain terminal, a source terminal connected to a low potential, and a pulse signal as the AC signal input to a gate terminal to thereby perform class-D amplification on the AC signal. According to the impedance measurement device, it is possible to simply configure the amplification circuit.

Also, in the impedance measurement device according to the present invention, a voltage of the high potential is configured to be variable. According to the impedance measurement device, a drain voltage of an FET changes, and as a result, it is possible to freely change the voltage (this is also a power) of the AC signal output from the FET.

Also, in the impedance measurement device according to the present invention, the LC resonance circuit is configured of an LC serial resonance circuit in which a first end of the LC resonance circuit is connected to a reference potential, and the amplification circuit is configured as a push-pull circuit by an N-channel MOSFET and a P-channel MOSFET in which a drain terminal of the N-channel MOSFET is connected to a high potential as compared with the reference potential, a drain terminal of the P-channel MOSFET is connected to a low potential as compared with the reference potential, a side of a second end of the LC serial resonance circuit is connected to a source terminal of the N-channel MOSFET and a source terminal of the P-channel MOSFET, a positive pulse signal serving as the AC signal is input to a gate terminal of the N-channel MOSFET, and a negative pulse signal serving as the AC signal is input to a gate terminal of the P-channel MOSFET, to thereby perform class-D amplification on the AC signal. According to the impedance measurement device, it is possible to reliably perform class-D amplification on the AC signal by the amplification circuit configured of the push-pull circuit.

Also, in the impedance measurement device according to the present invention, each of a voltage of the high potential and a voltage of the low potential is configured to be variable. According to the impedance measurement device, drain voltages of two FETs change, and as a result, it is possible to freely change voltages (this is also powers) of AC signals output from the two FETs.

Also, the impedance measurement device according to the present invention includes: either an LPF or a BPF that is connected in series to the LC resonance circuit and allows passage of the AC signal. According to the impedance measurement device, it is possible to reliably cause the amplification circuit to linearly amplify the AC signal of a sine wave.

Moreover, in the impedance measurement device according to the present invention, the capacitor circuit includes Nb capacitors from a first capacitor to an Nb-th capacitor (Nb is an integer greater than or equal to 2) that are connected in parallel as a whole and Nb switches from a first serial switch to an Nb-th serial switch connected in series to the first capacitor to the Nb-th capacitor, respectively, and the processing unit performs ON/OFF control on the Nb serial switches in accordance with a frequency of the AC signal to change a capacity of the entire capacitor circuit. According to the impedance measurement device, the processing unit can finely control the resonance frequency of the LC resonance circuit by performing ON/OFF control on the Nb switches in accordance with the frequency of the AC signal and changing the capacity of the capacitor circuit CS.

Also, in the impedance measurement device according to the present invention, the first capacitor to the Nb-th capacitor have mutually different capacities. According to the impedance measurement device, it is possible to increase an increase/decrease in capacity as compared with a capacitor circuit configured of capacitors with the same capacity.

Also, in the impedance measurement device according to the present invention, each of the first capacitor to the Nb-th capacitor has a capacity obtained by multiplying $2^{Mb}$ (Mb denotes Nb integers from 0 to (Nb−1)) by a specific capacity. According to the impedance measurement device, it is possible to change the capacity of the entire capacitor circuit and to thereby finely control the resonance frequency of the LC resonance circuit. In this case, it is possible to linearly change the resonance frequency by increasing the number of capacitors in the capacitor circuit.

Also, the impedance measurement device according to the present invention includes a signal detection unit configured to detect a current value of the AC signal flowing through the target injection line, in which the processing unit controls a signal level of the AC signal output from the signal injection unit such that a current value of the AC signal detected by the signal detection unit is within a target current value range.

Also, the impedance measurement device according to the present invention includes: a signal detection unit configured to detect a current value of the AC signal flowing through the target injection line, and the processing unit performs ON/OFF control on the first parallel switch to the Na-th parallel switch such that a current value of the AC signal detected by the signal detection unit is within the target current value range.

Also, the impedance measurement device according to the present invention includes: a signal detection unit that detects a current value of the AC signal flowing through the target injection line, and the processing unit determines a load impedance of the target injection line and performs ON/OFF control on the first parallel switch to the Na-th parallel switch on the basis of the current value of the AC signal injected by the signal injection unit to the target injection line and the current value of the AC signal detected by the signal detection unit, to thereby increase the number of turns of the primary winding component overall when the determined load impedance is small or decrease the number of turns of the primary winding component overall when the determined load impedance is large.

According to these impedance measurement devices, it is possible to increase a ratio (S/N) of a signal level (S) with respect to a noise level (N) of the current detection signal and the voltage detection signal, and as a result, it is possible to accurately measure the impedance in impedance calculation processing (measurement processing) performed by the processing unit.

Also, in the impedance measurement device according to the present invention, the signal detection unit includes a secondary winding component that is formed as a separate member from the signal injection unit and forms a primary winding to be magnetically coupled to the target injection line as a secondary winding.

According to the impedance measurement device, the non-contact-type current detection unit as a signal detection unit is formed as a separate member from the signal injection unit and includes the secondary winding component, and it is thus possible to avoid a leaking magnetic flux in accordance with the AC signal injected by the signal injection windings of the signal injection unit becoming noise and leaking to the secondary winding component and to thereby accurately measure the impedance.

Also, in the impedance measurement device according to the present invention, the signal detection unit functions as the current detection unit. According to the impedance measurement device, it is possible to achieve size reduction of the impedance measurement device and to sufficiently reduce manufacturing costs by the non-contact-type current detection unit including both the configuration of the current detection unit and the configuration of the signal detection unit.

Moreover, in the impedance measurement device according to the present invention, the signal injection unit includes a plurality of the primary winding components made to correspond to a plurality of frequency band groups grouped from a frequency band of the AC signal to be generated, respectively, and when injecting the AC signal of a frequency belonging to one frequency band group of the plurality of frequency band groups, the signal injection unit applies the AC signal to ends of the primary winding component corresponding to the one frequency band group, the frequency band is grouped into two frequency band groups, the first magnetic core in the primary winding component made to correspond to a frequency band group on a low frequency band side of the two frequency band groups is configured of a metal-based magnetic core, and the first magnetic core in the primary winding component made to correspond to a frequency band group on a high frequency band side of the two frequency band groups is configured of a ferrite-based magnetic core.

Also, in the impedance measurement device according to the present invention, the signal injection unit includes a plurality of the primary winding components made to correspond to a plurality of frequency band groups grouped from a frequency band of the AC signal to be generated, respectively, and when injecting the AC signal of a frequency belonging to one frequency band group of the plurality of frequency band groups, the signal injection unit applies the AC signal to ends of the primary winding component corresponding to the one frequency band group, the frequency band is grouped into three frequency band groups, the first magnetic core in the primary winding component made to correspond to a frequency band group on a low frequency band side among the three frequency band groups is configured of a metal-based magnetic core, the first magnetic core in the primary winding component made to correspond to a frequency band group on a middle frequency band side among the three frequency band groups is configured of a ferrite-based magnetic core, and the primary winding component made to correspond to a frequency band group on a high frequency band side among the three frequency band groups is configured of an air core coil.

According to these impedance measurement devices, it is possible to use the magnetic core or the air core coil of the material with the best suitable coupling with the target injection line in accordance with the frequency of the AC signal when the AC signal is injected to the target injection line in a transformer scheme and to thereby sufficiently efficiently inject the AC signal to the target injection line over a wide frequency band.

Also, in the impedance measurement device according to the present invention, the signal injection unit is configured to change a frequency of the AC signal, and applies the AC signal to two of the primary winding components corresponding to two frequency band groups of the plurality of frequency band groups when changing the frequency of the AC signal from one of the two frequency band groups to another of the two frequency band groups at a boundary portion of the two frequency band groups, the two frequency band groups having mutually adjacent frequency bands of the AC signal.

According to the impedance measurement device, the primary winding components of the two types with suitable coupling with the target injection line are used in accordance with the frequency of the AC signal at the boundary portion, and it is thus possible to sufficiently efficiently inject the AC signal to the target injection line. Also, according to the impedance measurement device, it is possible to moderate variations in signal level of the AC signal due to switching of the primary winding components to which the AC signal is applied, when the frequency of the AC signal is changed from the one frequency band group to the other frequency band group at the boundary portion.

Also, in the impedance measurement device according to the present invention, the primary winding component is configured of an air core coil. According to the impedance measurement device, it is possible to reliably inject the AC signal of a high-frequency band to the target injection line with a simple configuration.

Furthermore, in the impedance measurement device according to the present invention, the signal injection unit includes a plurality of the primary winding components of identical specification, and synchronously applies the AC signal of the same frequency and the same phase to the plurality of primary winding components of identical specification. According to the impedance measurement device, it is possible to inject an AC signal of a sufficiently large current value to the target injection line as compared with a case where a single primary winding component is used.

Also, the impedance measurement device according to the present invention includes a plurality of the voltage detection units, in which each of the plurality of voltage detection units detects a voltage value of the AC voltage generated at each of the ends of the plurality of measurement targets connected in series to the target injection line by being in contact with the end, and outputs the voltage detection signal to the processing unit, and the processing unit measures each of impedances of the plurality of measurement targets on the basis of the current detection signal and a plurality of the voltage detection signals output from the plurality of voltage detection units, respectively. According to the impedance measurement device, it is possible to synchronously measure the impedances of the plurality of measurement targets.

Moreover, the impedance measurement device according to the present invention includes a capacitor connected in parallel to ends of a non-measurement target in a measurement target system in which the measurement target and the non-measurement target are connected with the target injection line to form a closed loop with an annular shape. According to the impedance measurement device, it is possible to increase the current value when the signal injection unit injects the AC signal to the target injection line even if an impedance of a non-measurement target is large.

Also, in the impedance measurement device according to the present invention, the signal injection unit includes a class-D amplification unit as a final stage and injects the AC signal amplified by the class-D amplification unit to the target injection line. According to the impedance measurement device, the signal injection unit can maintain an output level of the AC signal at a controlled constant level even with respect to load variations.

Also, in the impedance measurement device according to the present invention, the signal injection unit sweeps a frequency of the AC signal. According to the impedance measurement device, it is possible to supply the AC signal which is a sine wave signal to the measurement target, to configure a frequency response thereto as a measurable FRA, and to thereby perform highly accurate impedance measurement.

Also, in the impedance measurement device according to the present invention, the metal-based magnetic core is any of a permalloy core, a sendust core, an amorphous core, a powder magnetic core, pure iron, a silicon steel plate, Permendur, nickel, cobalt, Fe—Si—Al, and electromagnetic stainless steel, and the ferrite-based magnetic core is any of Mn—Zn-based ferrite and Ni—Zn-based ferrite. According to the impedance measurement device, it is possible to configure a magnetic core which is unlikely to cause saturation with respect to a DC current by using any one of the above types as the metal-based magnetic core, and it is possible to avoid generation of an eddy current at the magnetic core by using any one of the above types as the ferrite-based magnetic core.

Advantageous Effects of Invention

According to the impedance measurement device of the present invention, since the signal injection unit injects the AC signal to the core wire of the target injection line in a non-contact manner, a part having a low breakdown voltage specification can be used as a part constituting the signal injection unit. Thus, it is possible to reduce manufacturing costs of the signal injection unit and hence sufficiently reduce manufacturing costs of the entire impedance measurement device, and reliably measure the impedance of the measurement target even when a high voltage is present in the target injection line to which the measurement target is connected in series and the AC signal for measurement is injected.

DESCRIPTION OF EMBODIMENTS

Hereinafter, embodiments of an impedance measurement device will be described with reference to the accompanying drawings.

Figure 1:
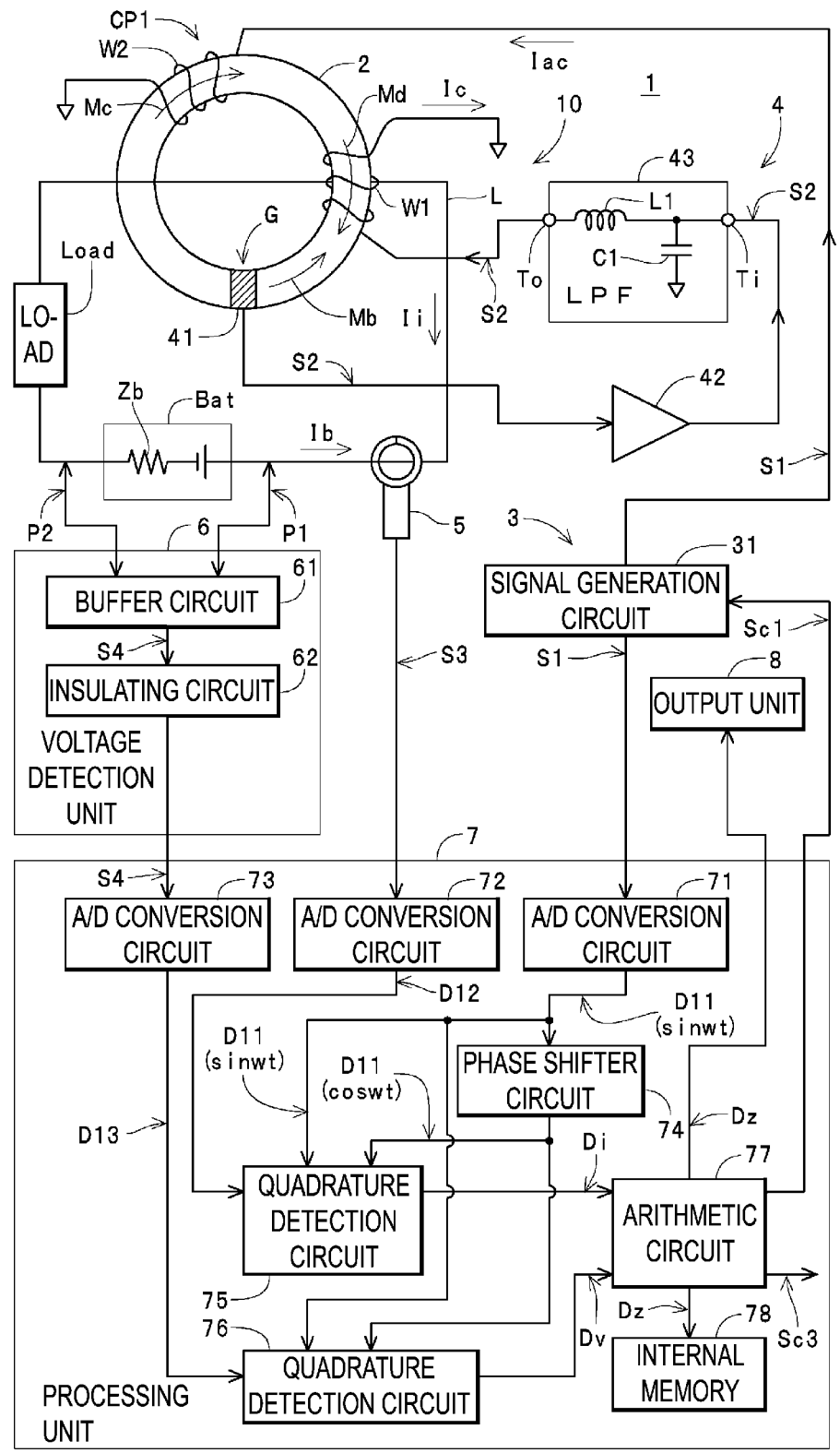
FIG. 1 is a configuration diagram illustrating a configuration of an impedance measurement device 1.

An impedance measurement device 1 illustrated in FIG. 1 is an example of the "impedance measurement device" and is configured to measure, for example, an impedance (an internal impedance Zb in this example) of a battery Bat, serving as a measurement target, when a load Load (non-measurement target) is connected to the measurement target and a closed loop state has been achieved. The impedance measurement device 1 is configured as a frequency response analyzer (FRA) that can supply an AC signal S1 which is a sine wave signal as will be described later to the battery Bat and measuring a frequency response thereto, and can perform accurate impedance measurement.

For example, in a fuel cell vehicle, the load Load that consumes a large current, such as a motor, and the battery Bat configured of a plurality of battery cells connected in series (illustrated overall as a single battery in the drawing) are connected by, for example, an insulated coated cable in which a core wire that is a conductor is coated in an insulated manner and a power line (hereinafter, also referred to as "target injection line L") formed of a conductor such as an enameled wire or a wire that is not coated in an insulated manner, and a large DC current flows through the target injection line L from the battery Bat to the load Load. To measure the internal impedance Zb of the battery Bat in such a connected state, it is necessary to supply an AC signal S1 for impedance measurement (e.g., 1 Hz to 10 Mhz) to the battery Bat. At this time, the impedance measurement device 1 is configured to inject the AC signal S1 to the target injection line L through which the large DC current is flowing from the battery Bat to the load Load by using an injection extraction device 10, which will be described later.

Specifically, the impedance measurement device 1 includes a magnetic core 2, a signal injection unit 3, a magnetic flux cancellation unit 4, a non-contact-type current sensor 5, a voltage detection unit 6, a processing unit 7, and an output unit 8. In this case, the signal injection device 10 is configured by the magnetic core 2, the signal injection unit 3, and the magnetic flux cancellation unit 4.

The magnetic core 2 is an element constituting the signal injection unit 3 and the magnetic flux cancellation unit 4 and is formed into an annular shape such as a circular shape, an oval shape, a rectangular shape, or a polygonal shape of a material such as ferrite, permalloy, Permendur, a silicon steel plate, or pure iron such that the target injection line L through which a DC current Ib flows can be inserted thereinto. In the magnetic core 2, a magnetic flux cancellation winding W1 serving as a first winding for supplying a DC current (hereinafter, also referred to as a "cancellation current Ic") of a negative feedback as a cancellation current for magnetic flux cancellation and a signal injection winding W2 serving as a secondary winding for injecting the AC signal S1 are wound around each other and hall elements 41 are disposed in gaps G between the magnetic flux cancellation winding W1 and the signal injection winding W2. In this case, due to the gaps G being provided, saturation is unlikely to occur in the magnetic core 2. Note that it is also possible to employ a splittable clamp-type configuration for the magnetic core 2. In addition, a signal is injected to one end of each of the magnetic flux cancellation winding W1 and the signal injection winding W2, and the other ends thereof are connected to a reference potential (floating ground), which will be described later.

The signal injection unit 3 is configured to generate the AC signal S1 for measurement and inject the AC signal S1 to the target injection line L (the core wire (conductor wire) of the target injection line L) in a non-contact manner. Specifically, the signal injection unit 3 includes the magnetic core 2, the signal injection winding W2, and a signal generation circuit 31 configured to generate the AC signal S1, perform class-D amplification on the AC signal S1 by a class-D amplification circuit disposed in an output stage, and output the AC signal S1. In this case, the signal injection unit 3 injects the AC signal S1 to the core wire of the target injection line L in a non-contact manner, and a component having a significantly low breakdown voltage specification as compared with the output voltage of the battery Bat is used as each component. In the signal injection unit 3, the signal generation circuit 31 sweeps (1 Hz to 10 Mhz, for example) the frequency while a signal level and frequency of the AC signal S1 to be injected to the target injection line L is controlled by a control signal Sc1 output from the processing unit 7, outputs the generated AC signal S1 to the processing unit 7, performs class-D amplification thereon, and supplies the processed signal to the signal injection winding W2. In this case, the signal injection winding W2 functions as a primary winding component CP1 configured of an insulated coated wire (or an enameled wire or the like) wound around the magnetic core 2 (first magnetic core) and constitutes a primary winding to be magnetically coupled to the target injection line L as a secondary winding. Therefore, by supplying the AC signal S1 to the signal injection winding W2 in a transformer scheme (in which the signal injection winding W2 is a primary winding of multiple turns and the target injection line L is a secondary winding of one turn) (that is, applying the AC signal S1 to both ends of the signal injection winding W2), an AC current Iac based on the AC signal S1 flows through the signal injection winding W2, a magnetic flux Mc based on the AC signal S1 is generated at the magnetic core 2 in the orientation illustrated in FIG. 1, and an injection current Ii which is an AC signal of a current value in accordance with the magnitude of the magnetic flux Mc is supplied (injected) as a normal mode signal to the target injection line L. Note that sweeping the frequency by the signal generation circuit 31 is not essential. In a case where sweeping is not required, it is also possible to apply a configuration of generating the AC signal S1 with a fixed frequency to the signal generation circuit 31.

The magnetic flux cancellation unit 4 is configured to generate a magnetic flux Mb as a first magnetic flux generated in the orientation illustrated in FIG. 1 at the magnetic core 2 and, by a zero flux method, a magnetic flux Md as a second magnetic flux in a direction opposite to that of the magnetic flux Mb at the magnetic core 2, to thereby cancel (offset) the magnetic fluxes when the DC current Ib flows through the target injection line L. Specifically, the magnetic flux cancellation unit 4 includes a hall element 41 as an example of a magnetic flux detection circuit disposed in the aforementioned gap G, a voltage driver 42, a low pass filter 43 (hereinafter, also referred to as an "LPF 43"), the magnetic core 2, and the signal injection winding W2. Note that the current value of the DC current Ib may be a small value or substantially no DC current Ib may flow when the impedance of the load Load is large or when the output voltage of the battery Bat is low, for example. Assuming utilization of the impedance measurement device 1 under such a situation, saturation of the magnetic core 2 does not occur. Thus, it is possible to choose not to use the function of the magnetic flux cancellation unit 4 or to omit the magnetic flux cancellation unit 4 itself. Impedance measurement devices 1A to 1C with configurations obtained by omitting the magnetic flux cancellation unit 4 will be described later.

The hall element 41 is an example of the "magnetic flux detection circuit", is provided at the magnetic core 2, and outputs a voltage signal S2 in accordance with the magnetic flux generated at the magnetic core 2. In this case, a configuration in which a current signal is output from the hall element 41 as a detection signal may be employed, and a signal converted into a voltage signal by such a current signal is also included in the "voltage signal S2". Note that the "magnetic flux detection circuit" is not limited to a hall element and can be configured by disposing a flux gate sensor, a magneto resistive (MR), or the like at the magnetic core 2. As the magneto resistive, a giant magneto resistive (GMR), a semiconductor magneto resistive (SMR), an anisotropic magneto resistive (AMR) using a ferromagnetic thin film material, a giant magneto resistive (GMR), or a tunnel magneto resistive (TMR) may be used.

Figure 2:
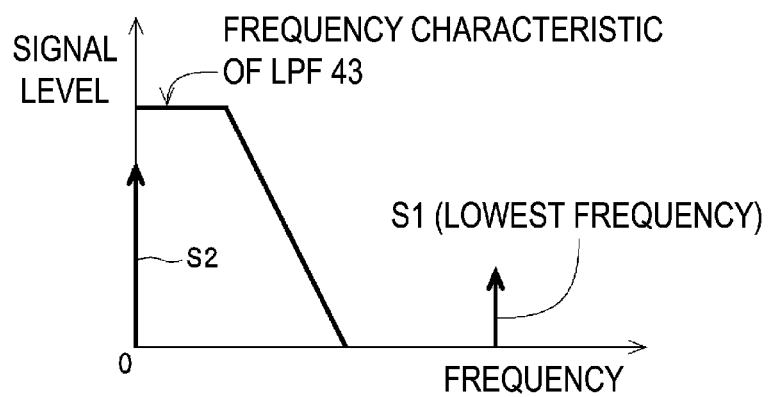
FIG. 2 is a characteristic diagram showing a frequency characteristic of an LPF 43 (a characteristic diagram showing capability of a magnetic flux cancellation unit 4 for canceling a magnetic flux Mb generated at a magnetic core 2).

The voltage driver 42 is an example of an amplification circuit that functions as a negative feedback amplification circuit overall, and amplifies the voltage signal S2 and outputs the voltage signal S2 with a low impedance to the LPF 43. The LPF 43 is an example of a filter circuit. The LPF 43 inhibits output of the voltage signal S2 on the basis of the AC signal S1 included in the voltage signal S2 amplified by the voltage driver 42, allows the voltage signal S2 based on the DC current Ib to pass therethrough, supplies the cancellation current Ic to the magnetic flux cancellation winding W1 in an orientation of cancelling the magnetic flux Mb, and inhibits input to the voltage driver 42 of the voltage signal generated at the magnetic flux cancellation winding W1 on the basis of the magnetic flux Mc generated at the magnetic core 2 (the voltage signal generated at the cancellation winding on the basis of the AC signal) due to the supply of the AC signal S1 to the signal injection winding W2. Specifically, as illustrated in FIG. 1, the LPF 43 is configured of an L-type LC filter in which a capacitor C1 is connected between an input terminal Ti on the voltage driver 42 side and a reference potential, and an inductor L1 is connected between the input terminal Ti and an output terminal To on the magnetic flux cancellation winding W1 side. As shown in FIG. 2, the LPF 43 has a frequency characteristic that the cut-off frequency becomes a lower frequency than the frequency of the AC signal S1 (the lowest frequency of the AC signal S1 if frequency sweeping has been performed), inhibits output of the voltage signal S2 based on the AC signal S1, and allows the voltage signal S2 based on the DC current Ib to pass therethrough.

Figure 7:
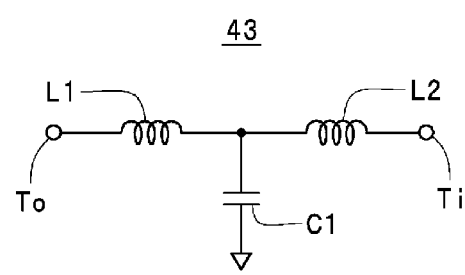
FIG. 7 is a configuration diagram illustrating another configuration of the LPF 43.

In this case, to cause only the voltage signal S2 based on the DC current Ib to pass, the cut-off frequency is preferably as close to the frequency of 0 Hz as possible. Therefore, the filter circuit is configured of the LPF 43 including the inductor L1 formed by a reactor with a large inductance, for example, in the magnetic flux cancellation unit 4. For this reason, the cut-off frequency of the LPF 43 is caused to approach the frequency of 0 Hz as closely as possible. Further, the LPF 43 can inhibit an output of the voltage signal S2 based on the AC signal S1, allow only the voltage signal S2 based on the DC current Ib to pass therethrough, and supply the cancellation current Ic to the magnetic flux cancellation winding W1 in the orientation of canceling out the magnetic flux Mb, and is also configured at low cost. In addition, since input to the voltage driver 42 of the voltage signal generated at the magnetic flux cancellation winding W1 on the basis of the magnetic flux Mc generated at the magnetic core 2 in response to supply of the AC signal S1 to the signal injection winding W2 is inhibited, a decrease in the level of the injection current Ii (AC signal S1) to be injected to the target injection line L is avoided by the magnetic flux Mc generated at the magnetic core 2. Note that low pass filters with various configurations other than the L-type LC filter illustrated in FIG. 1 can also be employed as the LPF 43. For example, the LPF 43 may be configured of a T-type LC filter in which the above inductor L1 and an inductor L2 with a small inductance are connected in series between the input terminal Ti and the output terminal To and the aforementioned capacitor C1 is connected between a connection point of the inductors L2 and L1 and the reference potential as illustrated in FIG. 7. Although not illustrated in the drawing, the LPF 43 may be configured of a π-type LC filter. The LPF 43 in each of the magnetic flux cancellation units 4A, 4B, 4C and an LPF 48 (described later) in the magnetic flux cancellation unit 4D do not need to have the function of avoiding a decrease in the level of the injection current Ii. Thus, it is possible to use an inductor with a small inductance rather than a reactor with a large inductance as the internal inductor L1. In addition, configurations of the LPF 43 in each of the magnetic flux cancellation units 4, 4A, 4B, 4C and the LPF 48 in the magnetic flux cancellation unit 4D are not limited to LC-type low pass filters of the L-type, the T-type, or the π-type, and various low pass filters such as RC-type low pass filters of the L-type, the T-type, and the π-type using resistors instead of the inductors can be employed. Moreover, a frequency characteristic of the LPF 43 coincides with the frequency characteristic of the magnetic flux cancellation unit 4 that exhibits an ability of canceling out the magnetic flux generated at the magnetic core 2.

In addition, the orientation in which the cancellation current Ic flows and the winding direction of the magnetic flux cancellation winding W1 are set in advance such that the magnetic flux Md in an orientation of reducing the magnetic flux Mb generated in the magnetic core 2 due to the DC current Ib to be supplied from the battery Bat to the load Load flowing is generated. Therefore, saturation of the magnetic core 2 due to the DC current Ib that is a large current flowing through the target injection line L is avoided by the voltage driver 42 of the magnetic flux cancellation unit 4 generating such a voltage signal S2 (cancellation current Ic) that the magnitude of the magnetic flux Mb detected by the hall element 41 becomes zero, and supplying the voltage signal S2 to the magnetic flux cancellation winding W1 wound around the magnetic core 2. As a result, by supplying the AC signal S1 to the signal injection winding W2, the magnetic flux Mc is reliably generated at the magnetic core 2, and the AC signal S1 is reliably injected to the target injection line L.

Figure 8:
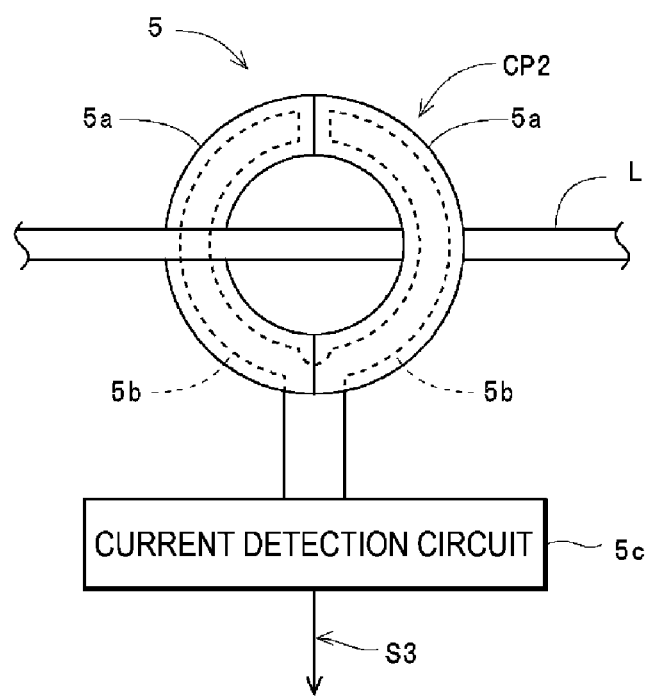
FIG. 8 is a configuration diagram illustrating a configuration of a non-contact-type current sensor 5.

The non-contact-type current sensor 5 is a so-called clamp-type current sensor and functions as a non-contact-type current detection unit and a signal detection unit. The non-contact-type current sensor 5 detects the injection current Ii which is an AC current flowing through the target injection line L in a non-contact manner with respect to the target injection line L (the core wire (the conductor wire) of the target injection line L) and outputs a detection signal S3 as a current detection signal indicating the current value of the injection current Ii to the processing unit 7. The non-contact-type current sensor 5 includes a pair of magnetic cores 5a, 5a each having semi-ring shapes, a single winding 5b wound around the magnetic cores 5a, 5a and configured of an insulated coated wire, and a current detection circuit 5c, as illustrated in FIG. 8. In the non-contact-type current sensor 5, the pair of magnetic cores 5a, 5a are configured to be opened and closed, and when the target injection line L is to be clamped, the target injection line L is caused to advance from opening parts of the magnetic cores 5a, 5a that have been brought into an opened state by operating an operation switch, which is not illustrated, the magnetic cores 5a, 5a are then brought into a closed state (ring shape) by operating the operation switch, and the target injection line L is thereby clamped by the magnetic cores 5a, 5a. In the state where the target injection line L is clamped, magnetic fluxes with magnitudes changing in accordance with the magnitude of the current flowing through the target injection line L are generated at the magnetic cores 5a, 5a, and a current with a magnitude changing in accordance with the magnitudes of the magnetic fluxes is output from the winding 5b. The current detection circuit 5c generates the detection signal S3 by converting the current output from the winding 5b into a voltage, and outputs the detection signal S3 to the processing unit 7. Note that magnetic cores 5a, 5a and the winding 5b forming the secondary winding to be magnetically coupled to the target injection line L as the primary winding constitute a secondary winding component CP2 corresponding to the "secondary winding component at the signal detection unit formed as a separate member from the signal injection unit". Moreover, the secondary winding component CP2 can also be configured only of an air core coil.

The voltage detection unit 6 includes a pair of contact-type probes P1, P2, a buffer circuit 61, and an insulating circuit 62, detects an end-to-end voltage of the battery Bat, and outputs an end-to-end voltage signal S4 as a voltage detection signal to the processing unit 7. In this case, the buffer circuit 61 is an example of a voltage detection circuit, includes, at a pair of input units, coupling capacitors that inhibit an input of a DC voltage and enable an input of the AC voltage, generates a differential voltage of the AC voltage detected by the probes P1, P2, and outputs an end-to-end voltage signal S4 as an end-to-end voltage of the battery Bat. In addition, the insulating circuit 62 insulates the reference potential (ground) of the circuit including the load Load, the battery Bat, and the buffer circuit 61 from the reference potential (floating ground) of the impedance measurement device 1 except for the buffer circuit 61 and outputs an end-to-end voltage signal S4 in an insulated state to the processing unit 7.

The processing unit 7 is configured of a CPU, for example, includes A/D conversion circuits 71 to 73, a phase shifter circuit 74, quadrature detection circuits 75, 76, an arithmetic circuit 77, and an internal memory 78, inputs the detection signal S3 (current detection signal) and the end-to-end voltage signal S4 (voltage detection signal), and measures the internal impedance Zb of the battery Bat that is a measurement target on the basis of the detection signal S3 and the end-to-end voltage signal S4. In this case, the A/D conversion circuit 71 inputs the AC signal S1 output from the signal generation circuit 31, performs analog/digital conversion (A/D conversion), and outputs, to the phase shifter circuit 74 and the quadrature detection circuits 75, 76, signal data D11 (sin ωt) indicating the voltage value, the frequency, and the phase of the AC signal S1 of a sine wave. The A/D conversion circuit 72 inputs the detection signal S3 output from the non-contact-type current sensor 5, performs A/D conversion, and outputs, to the quadrature detection circuit 75, signal data D12 indicating the current value, the frequency, and the phase of the detection signal S3 (injection current Ii). The A/D conversion circuit 73 inputs the end-to-end voltage signal S4 output from the insulating circuit 62, performs A/D conversion, and outputs, to the quadrature detection circuit 76, signal data D13 indicating the voltage value, the frequency, and the phase of the end-to-end voltage signal S4.

The phase shifter circuit 74 inputs the signal data D11 (sin ωt) output from the A/D conversion circuit 71, causes the phase of the AC signal S1 which is a sine wave signal indicated by the signal data D11 to be shifted by 90° to thereby generate a cosine wave signal, generates signal data D11 (cos ωt) indicating the current value, the frequency, and the phase of the cosine wave signal, and outputs the signal data D11 (cos ωt) to the quadrature detection circuits 75, 76. The quadrature detection circuit 75 inputs the signal data D12 indicating the detection signal S3 (the AC current value of the injection current Ii) output from the A/D conversion circuit 72, performs quadrature detection on the signal data D12 with the signal data D11 (sin ωt) indicating the AC signal S1 of the sine wave output from the A/D conversion circuit 71 and the signal data D11 (cos ωt) indicating the AC signal S1 of the cosine wave output from the phase shifter circuit 74, generates current data Di indicating, by complex numbers, an in-phase component (I component) and a quadrature component (Q component) of the current value of the injection current Ii, and outputs the current data Di to the arithmetic circuit 77. The quadrature detection circuit 76 inputs the signal data D13 indicating the end-to-end voltage signal S4 (the voltage value of the AC voltage generated at ends of the battery Bat due to the injection current Ii flowing) output from the A/D conversion circuit 73, performs quadrature detection on the signal data D13 with the signal data D11 (sin ωt) indicating the AC signal S1 of the sine wave output from the A/D conversion circuit 71 and the signal data D11 (cost) indicating the AC signal S1 of the cosine wave output from the phase shifter circuit 74, generates voltage data Dv indicating, by complex numbers, an in-phase component (I component) and a quadrature component (Q component) of the voltage value of the end-to-end voltage signal S4, and outputs the voltage data Dv to the arithmetic circuit 77.

The arithmetic circuit 77 inputs the current data Di output from the quadrature detection circuit 75, inputs the voltage data Dv output from the quadrature detection circuit 76, and calculates the internal impedance Zb of the battery Bat on the basis of the current data Di and the voltage data Dv. Also, the arithmetic circuit 77 outputs impedance data Dz indicating the internal impedance Zb of the battery Bat as a result of the calculation to the internal memory 78 to store the impedance data Dz, and outputs the impedance data Dz to the output unit 8. Also, the arithmetic circuit 77 outputs a control signal Sc1 to the signal injection unit 3 such that the current value of the injection current Ii detected by the non-contact-type current sensor 5 is within a target current value range (for example, 1 mA±0.1 mA) necessary for impedance measurement and controls the signal level of the AC signal S1 to be output from the signal injection unit 3 (signal generation circuit 31). Specifically, the arithmetic circuit 77 outputs the control signal Sc1 and controls the signal level of the AC signal S1 to be output from the signal injection unit 3 while monitoring the current value (the signal level of the AC signal S1) of the injection current Ii that is being injected to the target injection line L on the basis of the input current data Di (or this may be the signal data D12 output from the A/D conversion circuit 72). In addition, the internal memory 78 is configured of a semiconductor memory, a hard disk device, and the like and stores the impedance data Dz and the like.

In an example, the output unit 8 is configured of a display device (display) such as a liquid crystal panel or an organic EL panel, inputs the impedance data Dz output from the processing unit 7, and displays the internal impedance Zb of the battery Bat on a screen. Note that the output unit 8 may be configured of an interface device that performs data communication with an external device instead of the display device and a configuration in which the impedance data Dz is output to the external device may also be employed.

Next, measurement processing in which the impedance measurement device 1 measures the internal impedance Zb of the battery Bat as a measurement target will be described with reference to the accompanying drawings.

First, the battery Bat and the load Load are connected with the target injection line L. When the load Load is activated in this state, the DC current Ib which is a large current flows from the battery Bat to the load Load via the target injection line L. In this state, the non-contact-type current sensor 5 is caused to be clamped by the target injection line L, and the probes P1, P2 are brought into contact with both ends of the battery Bat.

Then, a measurement start switch (not illustrated) is operated. In this manner, the processing unit 7 controls the signal generation circuit 31 to generate the AC signal S1. At this time, the signal generation circuit 31 generates the AC signal S1 while sweeping the frequency, outputs the generated AC signal S1 to the processing unit 7, and supplies the AC signal S1 after being subjected to class-D amplification to the signal injection winding W2. In this case, the AC current Iac flows through the signal injection winding W2 by supplying the AC signal S1 to the signal injection winding W2, the magnetic flux Mc based on the AC signal S1 is generated at the magnetic core 2 in the orientation illustrated in FIG. 1, and the injection current Ii which is the AC signal of the current value in accordance with the magnitude of the magnetic flux Mc is injected to the target injection line L. Therefore, the AC signal S1 is injected to the core wire of the target injection line L via the signal injection winding W2 in a non-contact state.

Moreover, the magnetic flux cancellation unit 4 causes the magnetic flux Mb as a first magnetic flux generated in the orientation illustrated in FIG. 1 at the magnetic core 2 and by the zero flux method, the magnetic flux Md as a second magnetic flux in an orientation opposite to that of the magnetic flux Mb at the magnetic core 2 and achieves cancellation, when the DC current Ib flows through the magnetic core 2. Specifically, the hall element 41 outputs the voltage signal S2 in accordance with the magnetic flux generated at the magnetic core 2 to the voltage driver 42. Then, the voltage driver 42 amplifies the voltage signal S2 and outputs the amplified voltage signal S2 with a low impedance to the LPF 43. Also, the LPF 43 inhibits an output of the voltage signal S2 based on the AC signal S1 (the voltage signal S2 based on the magnetic flux Mc) included in the voltage signal S2 amplified by the voltage driver 42, allows the voltage signal S2 based on the DC current Ib to pass therethrough, supplies the cancellation current Ic to the magnetic flux cancellation winding W1 in an orientation of canceling out the magnetic flux Mb, and inhibits an input, to the voltage driver 42, of the voltage signal generated at the magnetic flux cancellation winding W1 due to the supply of the AC signal S1 to the signal injection winding W2. Therefore, the voltage driver 42 generates such a cancellation current Ic that the magnitude of the magnetic flux Mb detected by the hall element 41 becomes zero and supplies the cancellation current Ic to the magnetic flux cancellation winding W1, without causing the cancellation current to cancel out the magnetic flux Mc based on the AC signal S1 generated at the magnetic core 2 to flow. In this manner, saturation of the magnetic core 2 due to the DC current IB which is a large current flowing through the target injection line L is avoided. In addition, since the input, to the voltage driver 42, of the voltage signal generated at the magnetic flux cancellation winding W1 on the basis of the magnetic flux Mc generated at the magnetic core 2 due to the supply of the AC signal S1 to the signal injection winding W2 is inhibited by the LPF 43, a decrease in level of the injection current Ii (AC signal S1) to be injected to the target injection line L is avoided on the basis of the magnetic flux Mc caused to be generated at the magnetic core 2. As a result, the magnetic flux Mc is reliably generated at the magnetic core 2, and the AC signal S1 is reliably and efficiently injected to the target injection line L by the AC signal S1 being supplied to the signal injection winding W2.

On the other hand, in the state where the AC signal S1 is injected to the target injection line L and the DC current Ib is flowing therethrough, the non-contact-type current sensor 5 detects the injection current Ii flowing through the target injection line L in a non-contact manner with respect to the target injection line L and outputs the detection signal S3 indicating the current value to the processing unit 7.

Also, the buffer circuit 61 of the voltage detection unit 6 inputs voltage across both ends of the battery Bat via the pair of probes P1, P2 and outputs, to the insulating circuit 62, the end-to-end voltage signal S4 which is a differential voltage of the AC voltage. In this case, the buffer circuit 61 generates only the differential voltage of the AC voltage detected by the probes P1, P2 and outputs the end-to-end voltage signal S4 as the end-to-end voltage of the battery Bat since the pair of input units include the coupling capacitors. Then, the insulating circuit 62 outputs the end-to-end voltage signal S4 to the processing unit 7. At this time, the insulating circuit 62 outputs the end-to-end voltage signal S4 to the processing unit 7 in a state where the reference potential (ground) on the side of the load Load and the battery Bat and the reference potential (floating ground) of the impedance measurement device 1 are insulated. As a result, it is possible to accurately detect a minute AC voltage generated in the battery Bat due to the AC signal S1 flowing through the battery Bat even if the output voltage of the battery Bat is a significantly high voltage, by the end-to-end voltage signal S4 being output to the impedance measurement device 1 via the insulating circuit 62.

On the other hand, in the processing unit 7, the A/D conversion circuit 71 inputs the AC signal S1, performs A/D conversion, and outputs signal data D11 (sin ωt) indicating the voltage value, the frequency, and the phase of the AC signal S1 of the sine wave to the phase shifter circuit 74 and the quadrature detection circuits 75, 76. Also, the A/D conversion circuit 72 inputs the detection signal S3, performs A/D conversion, and outputs signal data D12 indicating the current value, the frequency, and the phase of the detection signal S3 to the quadrature detection circuit 75. In addition, the A/D conversion circuit 73 inputs the end-to-end voltage signal S4, performs A/D conversion, and outputs signal data D12 indicating the voltage value, the frequency, and the phase of the end-to-end voltage signal S4 to the quadrature detection circuit 76. Moreover, the phase shifter circuit 74 inputs the signal data D11, shifts the phase of the AC signal S1 which is a sine wave signal indicated by the signal data D11 by 90° to thereby generate a cosine wave signal, generates signal data D11 (cos ωt) indicating the current value, the frequency, and the phase of the cosine wave signal, and outputs the signal data D11 (cos ωt) to the quadrature detection circuits 75, 76.

In addition, the quadrature detection circuit 75 inputs signal data D12 indicating the detection signal S3, performs quadrature detection on the signal data D12 with the signal data D11 (sin ωt) indicating the AC signal S1 of the sine wave and the signal data D11 (cos ωt) indicating the AC signal S1 of the cosine wave, generates current data Di indicating, by complex numbers, an in-phase component and a quadrature component of the current value of the injection current Ii, and outputs the current data Di to the arithmetic circuit 77. Moreover, the quadrature detection circuit 76 inputs signal data D13 indicating the end-to-end voltage signal S4, performs quadrature detection on the signal data D13 with the signal data D11 (sin ωt) and the signal data D11 (cos ωt), generates voltage data Dv indicating, by complex numbers, an in-phase component and a quadrature component of the voltage value of the end-to-end voltage signal S4, and outputs the voltage data Dv to the arithmetic circuit 77. Then, the arithmetic circuit 77 inputs the current data Di and the voltage data Dv, calculates the internal impedance Zb of the battery Bat on the basis of the current data Di and the voltage data Dv, outputs the impedance data Dz to the internal memory 78 to store the impedance data Dz, and outputs the impedance data Dz to the output unit 8.

At this time, the output unit 8 inputs the impedance data Dz and displays the internal impedance Zb of the battery Bat on the screen of the display device. Note that the arithmetic circuit 77 can also cause the frequency characteristic of the internal impedance Zb of the battery Bat with respect to the frequency of the AC signal S1 to be displayed on the screen of the display device by including frequency information of the AC signal S1 in the impedance data Dz. Also, the arithmetic circuit 77 can cause the characteristic of the internal impedance Zb of the battery Bat with respect to the current value of the DC current Ib by generating current value information of the DC current Ib flowing through the target injection line L on the basis of the input current data Di (this may be the signal data D12 output from the A/D conversion circuit 72) and including the current value information in the impedance data Dz.

Also, the arithmetic circuit 77 outputs the control signal Sc1 and controls the signal level of the AC signal S1 to be output from the signal injection unit 3 such that the current value of the injection current Ii detected by the non-contact-type current sensor 5 is included in the target current value range necessary for impedance measurement, while monitoring the current value of the injection current Ii that is being injected to the target injection line L on the basis of the input current data Di (this may be the signal data D12 output from the A/D conversion circuit 72). In this manner, the injection current Ii is within the target current value range, it is thus possible to increase the ratio (S/N) of the signal level (S) with respect to the noise level (N) of the detection signal S3 and the end-to-end voltage signal S4, and as a result, it is possible to accurately measure the internal impedance Zb in the calculation processing (measurement processing) for the internal impedance Zb performed by the arithmetic circuit 77. In this manner, the measurement of the internal impedance Zb of the battery Bat performed by the impedance measurement device 1 ends.

Note that the configuration of the "impedance measurement device" is not limited to the above example of the impedance measurement device 1. For example, a configuration illustrated in FIG. 3 can be employed for the magnetic flux cancellation unit 4. Note that in configurations which will be described below, components having the same functions as those of the components in the aforementioned impedance measurement device 1 will be denoted by the same reference signs and repeated description will be omitted.

Figure 3:
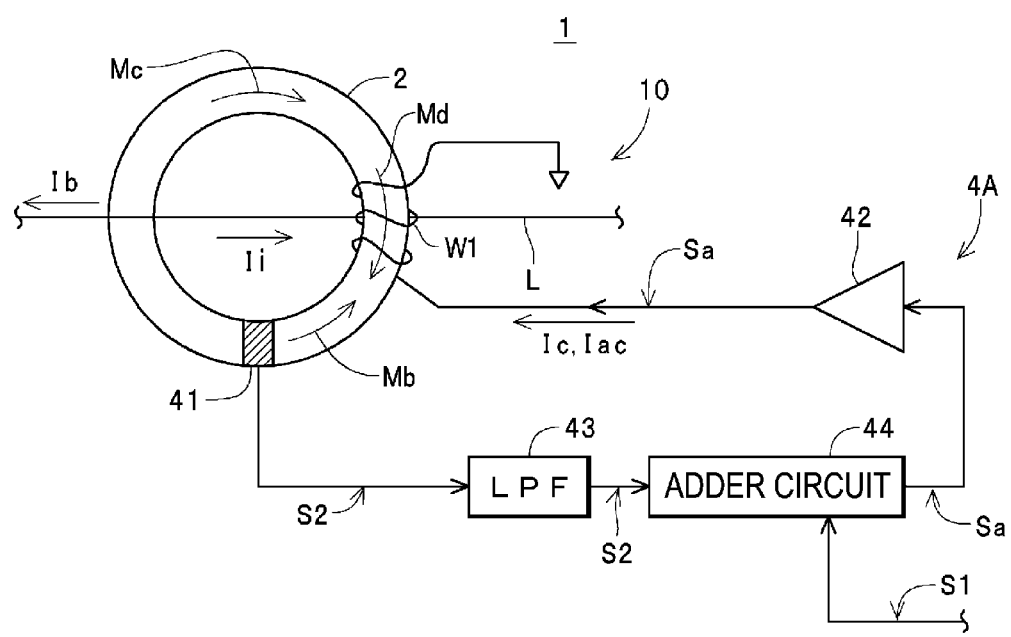
FIG. 3 is a configuration diagram illustrating a configuration of a magnetic flux cancellation unit 4A.

A magnetic flux cancellation unit 4A illustrated in FIG. 3 includes a hall element 41, a magnetic flux cancellation winding W1, an LPF 43, an adder circuit 44, and a voltage driver 42. In this case, the one magnetic flux cancellation winding W1 has the function of the cancellation winding and the function of the signal injection winding. Also, the LPF 43 is an example of a filter circuit, has a frequency characteristic that is similar to that of the LPF 43 of the magnetic flux cancellation unit 4, inhibits an output of a voltage signal S2 based on an AC signal S1 included in the voltage signal S2 output from the hall element 41, and allows the voltage signal S2 based on a DC current Ib to pass therethrough. The adder circuit 44 adds the voltage signal S2 and the AC signal S1 that have passed through the LPF 43 and generates and outputs an added signal Sa. The voltage driver 42 amplifies the added signal Sa output from the adder circuit 44, supplies the added signal Sa to the magnetic flux cancellation winding W1, supplies a cancellation current Ic to the magnetic flux cancellation winding W1 in an orientation of canceling out a magnetic flux Mb, supplies the AC signal S1 (AC current Iac) to the magnetic flux cancellation winding W1, and injects the AC signal S1 to the target injection line L.

In the signal injection device 10, the voltage driver 42 amplifies the added signal Sa obtained by the adder circuit 44 adding the voltage signal S2 and the AC signal S1, supplies the added signal Sa to the magnetic flux cancellation winding W1, and thereby causes magnetic fluxes Md and Mc to be generated at the magnetic core2 with the cancellation current Ic and the AC current Iac added at the magnetic flux cancellation winding W1. Therefore, according to the signal injection device 10, it is possible to avoid saturation of the magnetic core 2 due to the DC current Ib which is a large current flowing through the target injection line L, and as a result, it is possible to reliably cause the magnetic flux Mc to be generated at the magnetic core 2 and to reliably and efficiently inject the AC signal S1 to the target injection line L by supplying the AC signal S1 (added signal Sa) to the magnetic flux cancellation winding W1. Moreover, according to the signal injection device 10, it is possible to realize the function of the cancellation winding and the function of the signal injection winding by using the single magnetic flux cancellation winding W1 and to thereby configure the signal injection device 10 at low costs.

Figure 4:
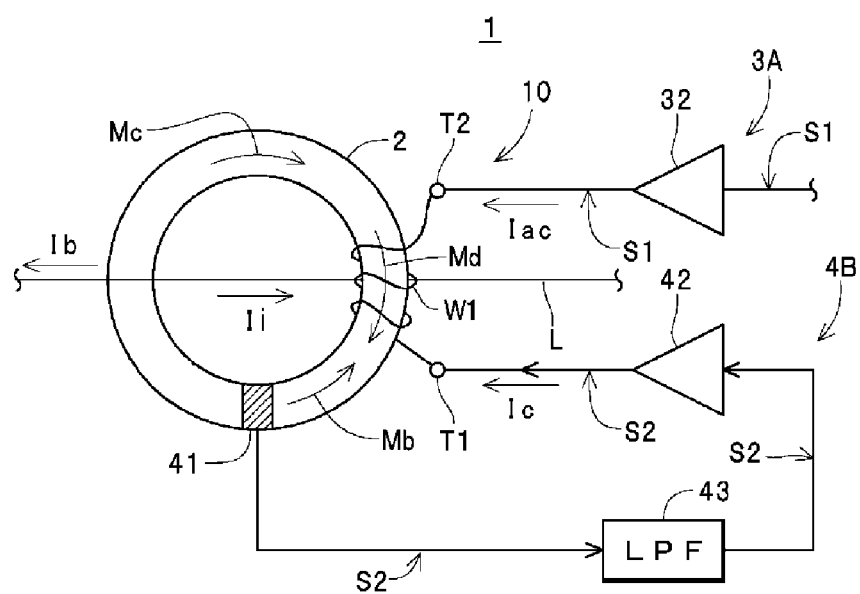
FIG. 4 is a configuration diagram illustrating a configuration of a magnetic flux cancellation unit 4B.

Also, a magnetic flux cancellation unit 4B illustrated in FIG. 4 includes a hall element 41, a magnetic flux cancellation winding W1, an LPF 43, and a voltage driver 42. Moreover, a signal injection unit 3A includes a voltage driver 32 in addition to the configuration of the aforementioned signal injection unit 3. In this case, the one magnetic flux cancellation winding W1 has the function of the cancellation winding and the function of the signal injection winding. Also, the LPF 43 is an example of a filter circuit, has a frequency characteristic that is similar to that of the LPF 43 of the magnetic flux cancellation unit 4, inhibits an output of a voltage signal S2 based on an AC signal S1 included in the voltage signal S2 output from the hall element 41, and allows the voltage signal S2 based on a DC current Ib to pass therethrough. The voltage driver 42 amplifies the voltage signal S2 that has passed through the LPF 43 and supplies a cancellation current Ic to one end T1 of the magnetic flux cancellation winding W1 in an orientation of canceling out a magnetic flux Mb. Moreover, the voltage driver 32 amplifies the AC signal S1, supplies the amplified AC signal S1 (AC current Iac) to the other end T2 of the magnetic flux cancellation winding W1, and injects the AC signal S1 to the target injection line L.

In the signal injection device 10, the voltage driver 42 supplies the voltage signal S2 (cancellation current Ic) from the side of the one end T1 of the magnetic flux cancellation winding W1 to an output unit of the voltage driver 32 via the magnetic flux cancellation winding W1, the voltage driver 32 supplies the AC signal S1 (AC current Iac) from the side of the other end T2 of the magnetic flux cancellation winding W1 to an output unit of the voltage driver 42 via the magnetic flux cancellation winding W1, and magnetic fluxes Md, Mc are thereby caused to be generated at the magnetic core 2 with the cancellation current Ic and the AC current Iac added at the magnetic flux cancellation winding W1. Therefore, according to the signal injection device 10, it is possible to avoid saturation of the magnetic core 2 due to the DC current Ib which is a large current flowing through the target injection line L, and as a result, it is possible to reliably cause the magnetic flux Mc to be generated at the magnetic core 2 and to reliably and efficiently inject the AC signal S1 to the target injection line L by supplying the AC signal S1 to the magnetic flux cancellation winding W1.

Moreover, according to the signal injection device 10, it is possible to realize the function of the cancellation winding and the function of the signal injection winding by using the single magnetic flux cancellation winding W1 and to thereby configure the signal injection device 10 at low costs.

Figure 5:
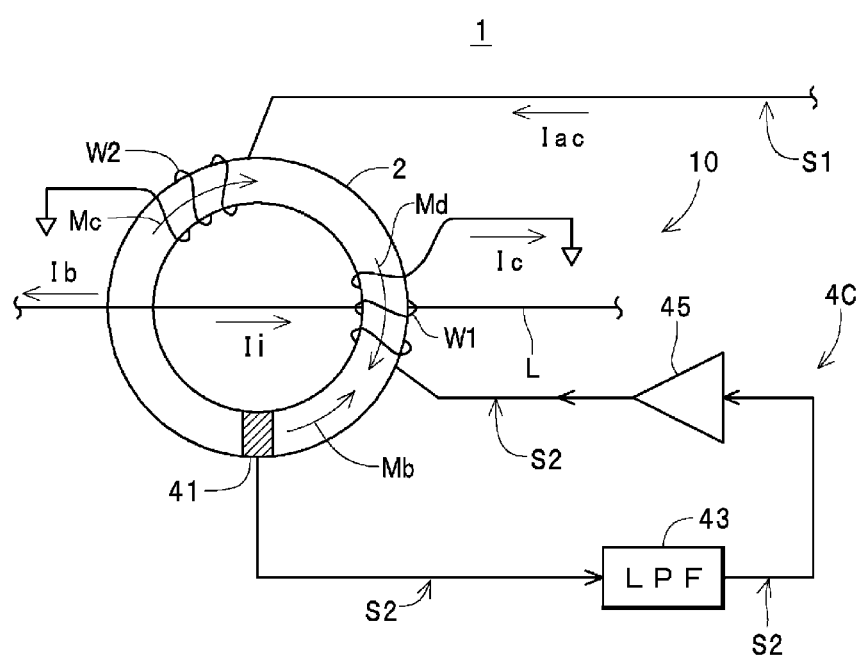
FIG. 5 is a configuration diagram illustrating a configuration of a magnetic flux cancellation unit 4C.

Also, a magnetic flux cancellation unit 4C illustrated in FIG. 5 includes a hall element 41, a magnetic flux cancellation winding W1, an LPF 43, and a current driver 45. In this case, the LPF 43 is an example of a filter circuit, has a frequency characteristic that is similar to that of the LPF 43 of the magnetic flux cancellation unit 4, inhibits an output of a voltage signal S2 based on an AC signal S1 included in the voltage signal S2 output from the hall element 41, and allows the voltage signal S2 based on a DC current Ib to pass therethrough. The current driver 45 amplifies the voltage signal S2 that has passed through the LPF 43, outputs a cancellation current Ic with a high output impedance in an orientation of canceling out a magnetic flux Mb, and supplies the cancellation current Ic to the magnetic flux cancellation winding W1. Also, the signal injection unit 3 includes a signal injection winding W2 wound around the magnetic core 2 similarly to the signal injection unit 3 illustrated in FIG. 1, supplies the AC signal S1 (AC current Iac) to the signal injection winding W2, and injects the AC signal S1 to the target injection line L.

In the signal injection device 10, the current driver 45 supplies the voltage signal S2 (cancellation current Ic) to the magnetic flux cancellation winding W1 in a state of a high output impedance. In this case, the magnetic flux Mc is generated at the magnetic core 2 by the signal injection unit 3 supplying the AC signal S1 to the signal injection winding W2. Although the AC current based on the generated magnetic flux Mc tries to flow through the magnetic flux cancellation winding W1 at this time, the AC current based on the magnetic flux Mc does not flow in the orientation directed to an output unit of the current driver 45 from the magnetic flux cancellation winding W1 since the output impedance of the current driver 45 is high. Therefore, the current driver 45 generates such a cancellation current Ic that the magnitude of the magnetic flux Mb detected by the hall element 41 is zero and supplies the cancellation current Ic to the magnetic flux cancellation winding W1 without causing the cancellation current that tries to cancel out the magnetic flux Mc based on the AC signal S1 generated at the magnetic core 2 to flow. Therefore, according to the signal injection device 10, it is possible to avoid saturation of the magnetic core 2 due to the DC current Ib which is a large current flowing through the target injection line L, and as a result, it is possible to reliably cause the magnetic flux Mc to be generated at the magnetic core 2 and to reliably and efficiently inject the AC signal S1 to the target injection line L by supplying the AC signal S1 (AC current Iac) to the signal injection winding W2.

Also, according to the signal injection device 10, it is possible to reliably detect the magnetic flux Mb with a simple configuration by disposing, at the magnetic core 2, any of the hall element 41, the flux gate sensor, and the GMR element and thereby configuring the magnetic flux detection circuit.

In addition, it is possible to cause the cut-off frequency to approach the frequency of 0 Hz as much as possible by configuring the filter circuit with the LPF 43 including the inductor formed of a reactor with a large inductance, and as a result, it is possible to allow only the voltage signal S2 based on the DC current Ib to pass therethrough and to obtain the configuration at low costs. Also, according to the signal injection device 10 having the magnetic flux cancellation unit 4, an input, to the voltage driver 42, of the voltage signal generated at the magnetic flux cancellation winding W1 on the basis of the magnetic flux Mc generated at the magnetic core 2 due to the supply of the AC signal S1 to the signal injection winding W2 is inhibited by the LPF 43, it is thus possible to avoid a decrease in level of the injection current Ii (AC signal S1) to be injected to the target injection line L on the basis of the magnetic flux Mc that is caused to be generated at the magnetic core 2, and as a result, it is possible to reliably and efficiently inject the AC signal S1 to the target injection line L.

Figure 6:
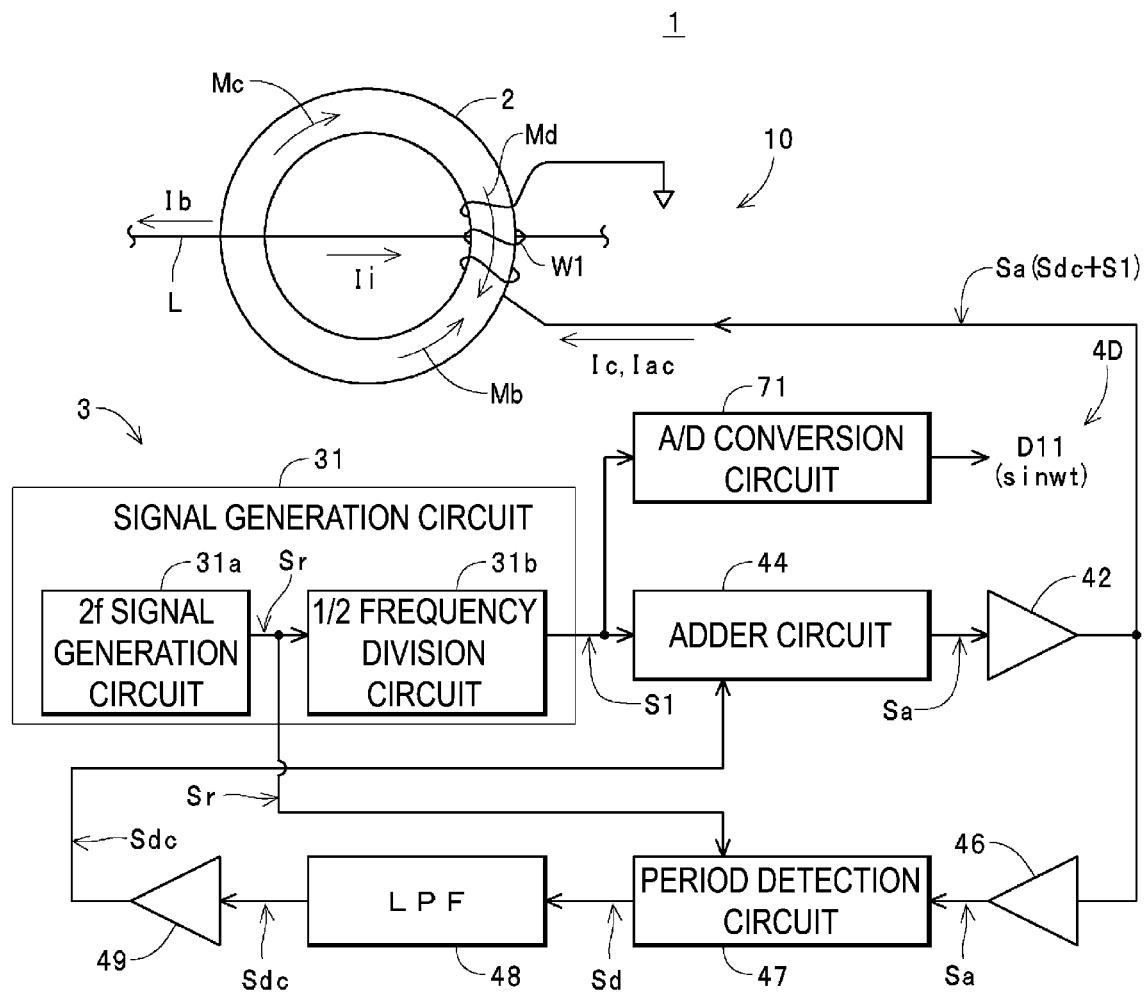
FIG. 6 is a configuration diagram illustrating configurations of a signal injection unit 3 and a magnetic flux cancellation unit 4D.

In addition, a magnetic flux cancellation unit 4D illustrated in FIG. 6 is configured to supply, to a magnetic flux cancellation winding W1, a cancellation current Ic decreasing a signal level of a voltage signal S2 in accordance with a magnetic flux based on a frequency that is double the frequency of an AC signal S1 generated at a magnetic core 2 and avoid saturation of the magnetic core 2 due to a DC current Ib which is a large current flowing through an target injection line L. Note that in the signal injection device 10 using the magnetic flux cancellation unit 4D, a magnetic flux detection circuit such as a hall element 41 is not used and a core with an annular shape with no gaps provided therein is thus used as the magnetic core 2. However, a core with an annular shape with gaps provided therein can also be used as the magnetic core 2.

Specifically, a signal injection device 10 illustrated in FIG. 6 is configured such that a signal generation circuit 31 of a signal injection unit 3 includes a 2f signal generation circuit 31a and a ½ frequency division circuit 31b. In this case, the 2f signal generation circuit 31a generates a reference signal Sr for synchronous detection of a frequency that is double the frequency of the AC signal S1. Also, the ½ frequency division circuit 31b generates the AC signal S1 to be injected to the target injection line L by performing ½ frequency division on the reference signal Sr output from the 2f signal generation circuit 31a.

On the other hand, the magnetic flux cancellation unit 4D includes a magnetic flux cancellation winding W1, an adder circuit 44, voltage drivers 42, 46, 49, a synchronous detection circuit 47, and an LPF 48. In this case, the synchronous detection circuit 47 synchronously detects, with the reference signal Sr, the voltage signal S2 at the frequency that is double the frequency of the AC signal S1 (that is, a distorted signal of the AC signal S1) included in the voltage signal S2 generated at the magnetic flux cancellation winding W1 and outputs an output signal Sd. The LPF 48 is an example of a filter circuit, extracts (allows passage of) the DC signal included in the output signal Sd of the synchronous detection circuit 47, that is, the DC signal Sdc generated on the basis of a harmonic signal with a double frequency (the same frequency component as the frequency reference signal Sr) which is a distorted signal of the AC signal S1 and inhibits passage of the AC signal of a frequency component or the like that is greater than or equal to double the frequency of the reference signal Sr. The voltage driver 49 amplifies the DC signal Sdc output from the LPF 48 and outputs the DC signal Sdc. The adder circuit 44 adds the DC signal Sdc output from the amplification circuit 49 and the AC signal S1 output from the signal generation circuit 31 (½ frequency division circuit 31b) and outputs an added signal Sa. The voltage driver 42 amplifies the added signal Sa output from the adder circuit 44 and supplies the added signal Sa to the magnetic flux cancellation winding W1.

In the signal injection device 10, the 2f signal generation circuit 31a inside the signal generation circuit 31 of the signal injection unit 3 generates the reference signal Sr for synchronous detection and outputs the reference signal Sr to the ½ frequency division circuit 31b and the synchronous detection circuit 47. Also, the ½ frequency division circuit 31b generates the AC signal S1 by inputting the reference signal Sr and performing ½ frequency division and outputs the AC signal S1 to the adder circuit 44 and the A/D conversion circuit 71 of the processing unit 7. On the other hand, the voltage driver 46 amplifies the input added signal Sa and outputs the added signal Sa to the synchronous detection circuit 47 in the magnetic flux cancellation unit 4D. At this time, the synchronous detection circuit 47 synchronously detects the voltage signal with a frequency that is double the frequency of the AC signal S1 generated at the magnetic flux cancellation winding W1 with the reference signal Sr and outputs the voltage signal generated through the synchronous detection as an output signal Sd. Moreover, the LPF 48 extracts (allows passage of) the DC signal Sdc included in the output signal Sd of the synchronous detection circuit 47 (that is, the DC signal based on the harmonic signal with a double frequency, which is a distorted signal of the AC signal S1) and inhibits passage of the AC signal. Then, the voltage driver 49 amplifies the DC signal Sdc output from the LPF 48 and outputs the DC signal Sdc to the adder circuit 44. At this time, the adder circuit 44 adds the DC signal Sdc output from the amplification circuit 49 and the AC signal S1 output from the signal generation circuit 31 (½ frequency division circuit 31b) and outputs an added signal Sa. Moreover, the voltage driver 42 amplifies the added signal Sa output from the adder circuit 44 and supplies the added signal Sa to the magnetic flux cancellation winding W1. In this case, the cancellation current Ic based on the DC signal Sdc is supplied to the magnetic flux cancellation winding W1 in the orientation of canceling out the magnetic flux Mb, saturation of the magnetic core 2 is avoided, the AC signal S1 (AC current Iac) is supplied to the magnetic flux cancellation winding W1, and the AC signal S1 is injected to the target injection line L, by the voltage driver 42 outputting the added signal Sa. In other words, feedback control is performed as a whole in the magnetic flux cancellation unit 4D without using any magnetic flux detection circuit such as the hall element 41, and the magnetic flux cancellation unit is thus configured like a flux gate sensor as a whole.

Therefore, according to the signal injection device 10, it is possible to avoid saturation of the magnetic core 2 due to the DC current Ib which is a large current flowing through the target injection line L, and as a result, it is possible to reliably cause the magnetic flux Mc to be generated at the magnetic core 2 and to reliably and efficiently inject the AC signal S1 to the target injection line L by supplying the AC signal S1 (AC current Iac) to the magnetic flux cancellation winding W1. Also, in the signal injection device 10, the magnetic flux cancellation unit 4D is feedback-controlled as a whole such that the magnitude of the harmonic signal with a frequency that is double the frequency of the AC signal S1 which is a distorted signal of the AC signal S1 generated at the magnetic core 2 in a saturated state is detected and the distorted signal is reduced. Therefore, according to the signal injection device 10, it is possible to directly detect the saturation of the magnetic core 2, and as a result, it is possible to more reliably cause the magnetic flux Mc to be generated without causing the saturation to be generated at the magnetic core 2 and to more reliably and efficiently inject the AC signal S1 to the target injection line L. Moreover, according to the signal injection device 10, it is possible to realize the function of the cancellation winding and the function of the signal injection winding by using the single magnetic flux cancellation winding W1 and to thereby configure the signal injection device 10 at low costs.

Note that it is possible to omit disposition of at least one of the voltage driver 46 and the voltage driver 49 in a case where a necessary gain at each circuit is secured in the magnetic flux cancellation unit 4D.

Next, an impedance measurement device 1A with a configuration in which disposition of the magnetic flux cancellation unit 4 is omitted will be described. Note that for the impedance measurement device 1A, components with the same functions as those of the components of the aforementioned impedance measurement device 1 will be denoted by the same reference signs, and repeated description will be omitted.

Figure 9:
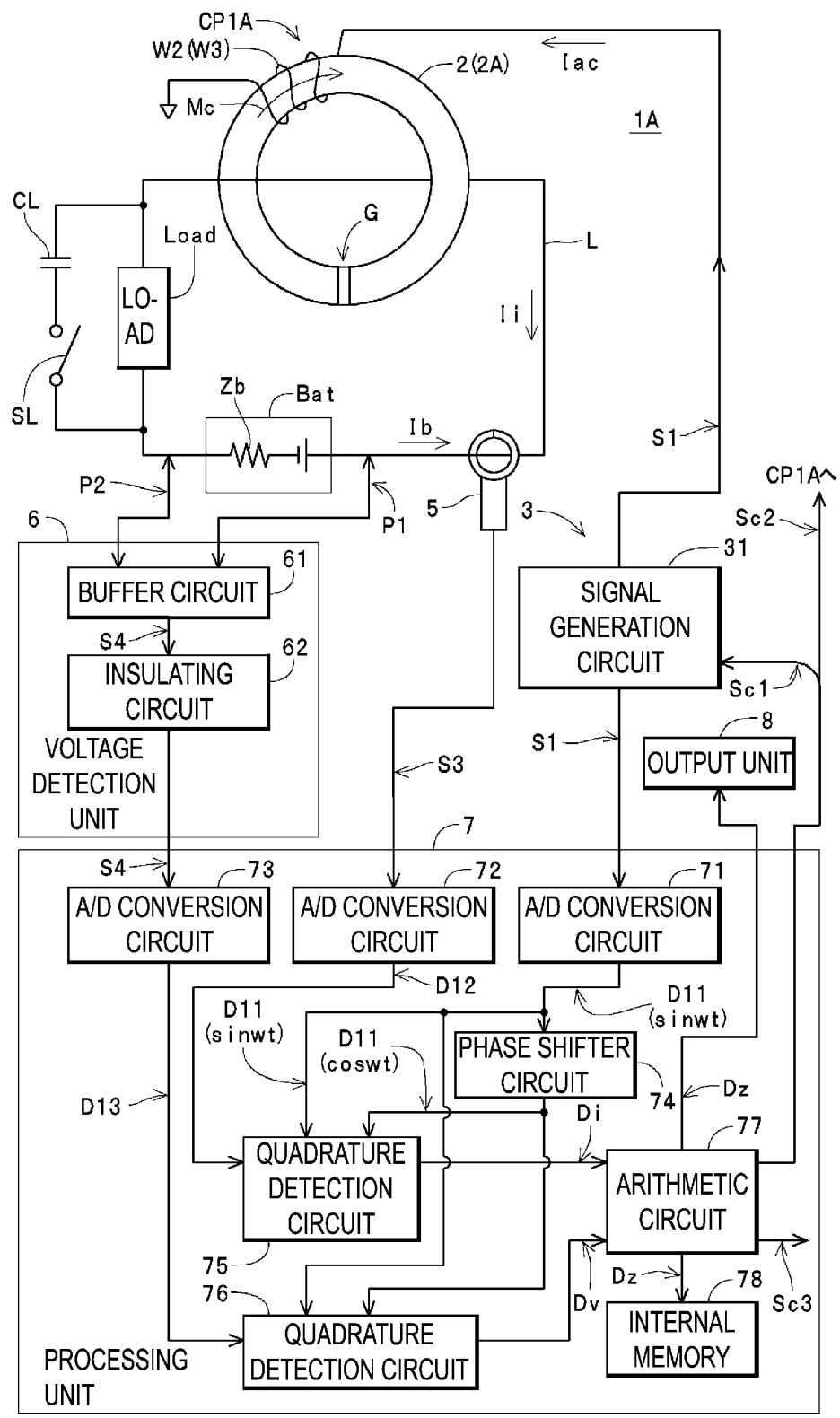
FIG. 9 is a configuration diagram illustrating a configuration of an impedance measurement device 1A.

As illustrated in FIG. 9, the impedance measurement device 1A includes the magnetic core 2, the signal injection unit 3, the non-contact-type current sensor 5, the voltage detection unit 6, the processing unit 7, the output unit 8, the capacitor CL, and the switch SL in the aforementioned impedance measurement device 1 and measures the internal impedance Zb of the battery Bat on the basis of the detection signal S3 and the end-to-end voltage signal S4 similarly to the impedance measurement device 1.

Figure 10:
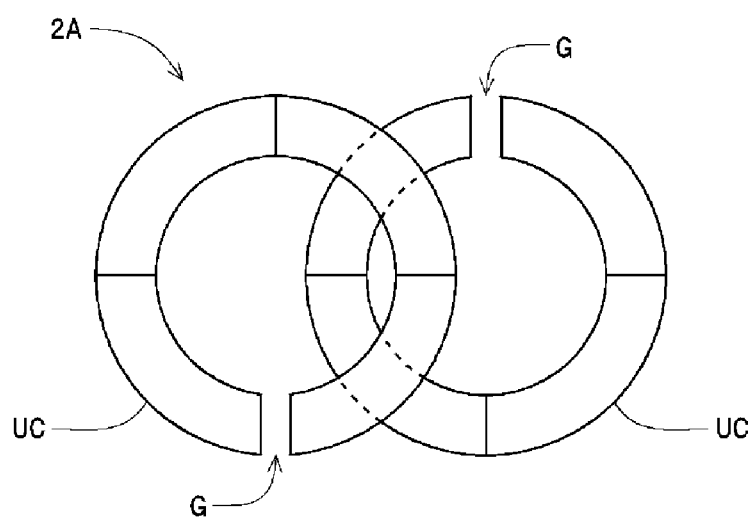
FIG. 10 is a configuration diagram illustrating a configuration of a magnetic core 2A.
Figure 11:
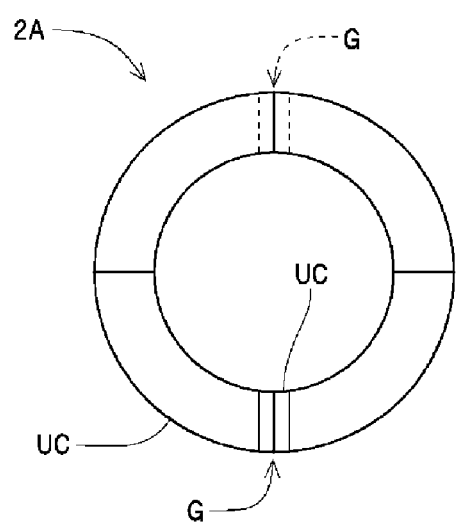
FIG. 11 is a plan view of the magnetic core 2A.
Figure 12:
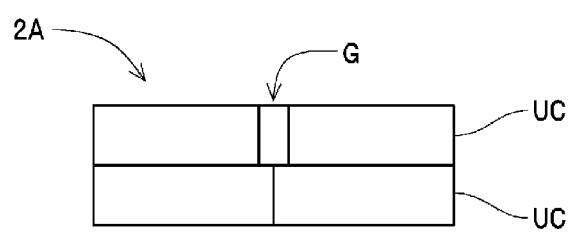
FIG. 12 is a side view of the magnetic core 2A.

Note that in the impedance measurement device 1, it is also possible to use the magnetic core 2 from which disposition of the hall element 41 and the magnetic flux cancellation winding W1 in the aforementioned impedance measurement device 1 are omitted or to use a magnetic core 2A illustrated in FIGS. 10 to 12 instead of the magnetic core 2.

In this case, the magnetic core 2A is a first magnetic core and is configured of a plurality of C-type (that is, C-shaped) unit magnetic cores UC having gaps G, as illustrated in FIGS. 10 to 12. In this example, two unit magnetic cores UC, for example, are used, and the two unit magnetic cores UC are caused to overlap such that a separation distance between two mutually adjacent gaps G along an outer periphery of the magnetic core 2A (the gap G of the unit magnetic core UC located on the upper side and the gap G of the unit magnetic core UC located on the lower side) is uniform in a top view in an overlapping state (see FIG. 11). Although the two unit magnetic cores UC are used, and the separation distance between the two gaps G is thus a length that is ½ the outer periphery of the magnetic core 2A in this example, the separation distance of three gaps G is a length that is ⅓ the outer periphery of the magnetic core 2A when three unit magnetic cores UC are used, or the separation distance of four gaps G is a length that is ¼ the outer periphery of the magnetic core 2A when four unit magnetic cores UC are used.

Figure 13:
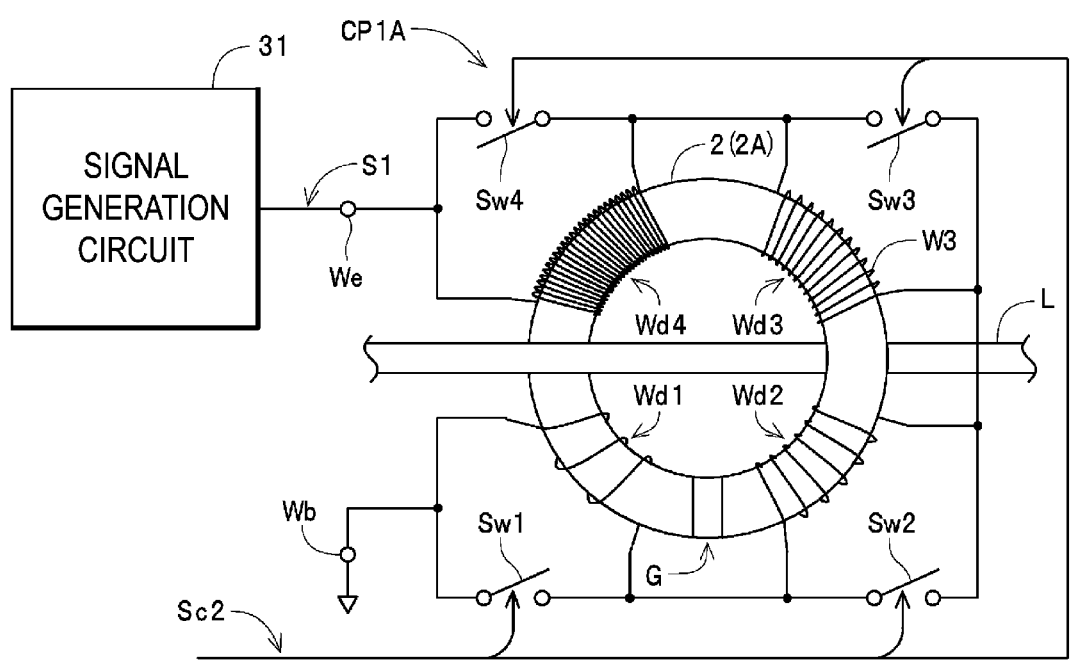
FIG. 13 is a configuration diagram illustrating a configuration of a primary winding component CP1A.

Also, it is also possible to use a primary winding component CP1A (hereinafter, also referred to as a "primary winding component CP" when various primary winding components which will be described later are not distinguished) illustrated in FIG. 13 instead of the signal injection winding W2 as the primary winding component CP1 in the impedance measurement device 1. The primary winding component CP1A includes a signal injection winding W3 configured of an insulated coated wire (or an enameled wire) wound around the magnetic core 2 (or the magnetic core 2A). In this case, the signal injection winding W3 includes Na windings (Na is an integer greater than or equal to 2) from a first winding to an Na-th winding that are connected in series as a whole and have mutually different numbers of turns from a winding start Wb to a winding end We, and Na switches from a first parallel switch to an Na-th parallel switch connected parallel to the first winding to the Na-th winding, respectively. Also, each of the first winding to the Na-th winding is wound the number of times obtained by multiplying $2^{Ma}$ (Ma denotes Na integers from 0 to (Na−1)) by La (La is an integer greater than or equal to 1). In this case, the winding start Wb of the signal injection winding W3 is connected to the reference potential, and the winding end We is connected to the output unit of the signal generation circuit 31.

Specifically, the primary winding component CP1A illustrated in the drawing is configured to employ 4 as the integer Na and 10 as the integer La, for example. Therefore, the primary winding component CP1A includes four windings from the first winding Wd1 to the fourth winding Wd4 (hereinafter, also referred to as "windings Wd" when they are not distinguished) and four switches from the first parallel switch SW1 to the fourth parallel switch SW4 (hereinafter, also referred to as "parallel switches SWa" when they are not distinguished) that are connected in parallel to the first winding Wd1 to the fourth winding Wd4, respectively. In this case, the parallel switch SWa may be configured of a semiconductor switch such as a transistor or an FET or may be configured of a mechanical switch such as a relay. Also, the first winding Wd1 to the first winding Wd4 are wound around the magnetic core 2 (or the magnetic core 2A) 10 turns, 20 turns, 40 turns, and 80 turns, respectively.

Also, the first winding Wd1 to the first winding Wd4 are formed such that wire diameters of core wires in the insulated coated wires of windings Wd with larger numbers of turns are thinner than wire diameters of core wires in the insulated coated wires of the windings Wd with smaller numbers of windings. In this case, the impedances of the windings Wd with larger numbers of turns are larger and the current value of the AC current Iac flowing through the target injection line L decreases, it is thus possible to use thin insulated coated wires (or enameled wires), and productivity of the signal injection winding W3 is thus sufficiently improved.

Figure 14:
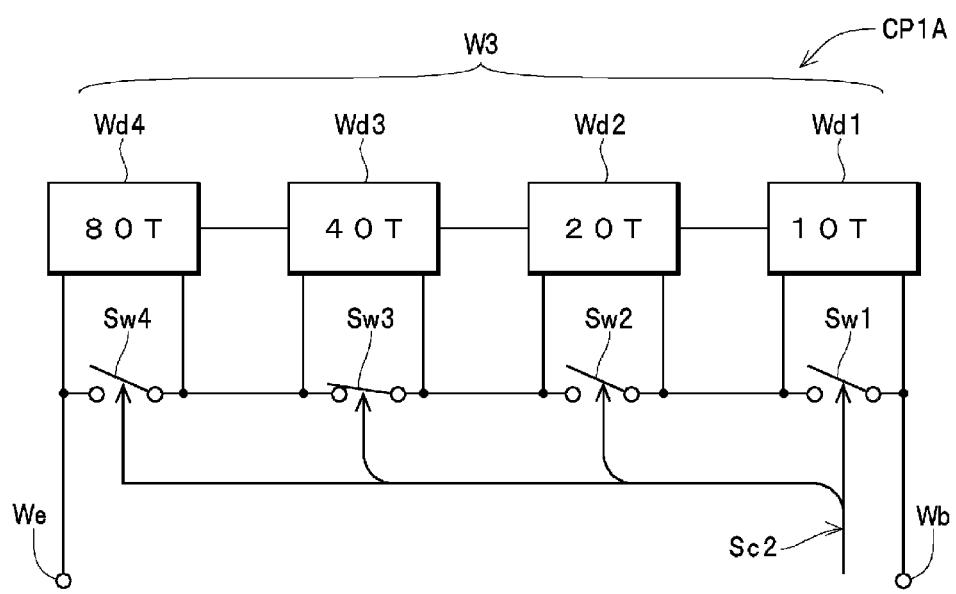
FIG. 14 is a configuration diagram illustrating a function of the primary winding component CP1A.
Figure 15:
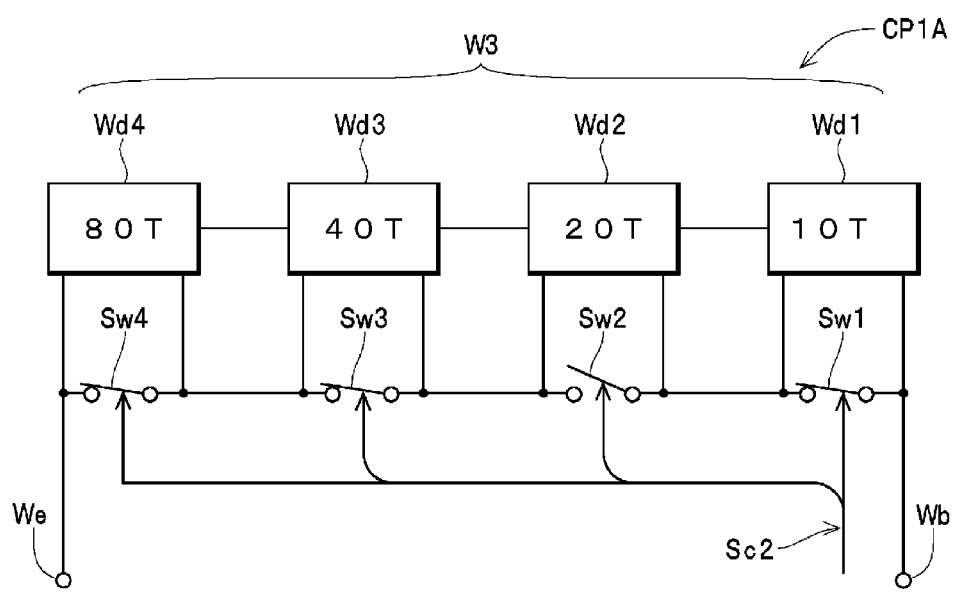
FIG. 15 is another configuration diagram illustrating the function of the primary winding component CP1A.

On the other hand, in the impedance measurement device 1A, the processing unit 7 performs ON/OFF control on the four parallel switches SW1 to SW4 through binary port control and changes the number of turns of the primary winding component CP1A (signal injection winding W3) overall. Specifically, both end portions of each winding Wd are short-circuited and the number of turns becomes 0 turns when the parallel switch SWa correspondingly connected in parallel is controlled in an ON state, and both the end portions are opened and the original number of turns (the number of turns) is achieved when the parallel switch SWa is controlled in an OFF state. Therefore, the number of turns of the primary winding component CP1A overall is caused to change by every 10 turns from 0 turns to 150 turns (in practice, from 10 turns to 150 turns) by the processing unit 7 (arithmetic circuit 77) outputting the control signal Sc2 to the four parallel switches SW1 to SW4 and individually performing ON/OFF control. When the parallel switch SW3 is controlled in the ON state and the parallel switches SW1, SW2, and SW4 are controlled in the OFF state as illustrated in FIG. 14, for example, the winding Wd3 is short-circuited, and the signal injection winding W3 is thus controlled to have the number of turns of 110 turns as a whole. Also, when the parallel switches SW1, SW3, and SW4 are controlled in the ON state and the parallel switch SW3 is controlled in the OFF state as illustrated in FIG. 15, the windings Wd1, Wd3, and Wd4 are short-circuited, and the signal injection winding W3 is thus controlled to have the number of turns of 20 turns as a whole.

On the other hand, the processing unit 7 (arithmetic circuit 77) outputs the control signal Sc2 and controls the current value of the injection current Ii instead of or in addition to the processing of outputting the aforementioned control signal Sc1 and controlling the signal level of the AC signal S1 to be output from the signal injection unit 3 to include the current value of the injection current Ii indicated by the detection signal S3 output from the non-contact-type current sensor 5 within the target current value range. Specifically, the processing unit 7 (arithmetic circuit 77) controls the current value of the injection current Ii by outputting the control signal Sc2 and changing the number of turns of the signal injection winding W3 while monitoring the current value of the injection current Ii (the signal level of the AC signal S1) that is being injected to the target injection line L on the basis of the input current data Di (this may be signal data D12 output from the A/D conversion circuit 72). More specifically, the processing unit 7 (arithmetic circuit 77) obtains a load impedance seen from the signal injection winding W3 when the load Load is connected to the battery Bat and a closed loop state has been achieved (the internal impedance Zb of the battery Bat and the impedance of the load Load) on the basis of the current value of the AC current Iac output from the signal generation circuit 31 and the current value of the injection current Ii detected by the non-contact-type current sensor 5 (the current value indicated by the current data Di or the signal data D12). In addition, the processing unit 7 (arithmetic circuit 77) performs control such that the number of turns of the entire signal injection winding W3 is caused to increase and more injection current Ii is likely to be injected, by outputting the control signal Sc2 and controlling each parallel switch SWa when the load impedance is small. On the other hand, the processing unit 7 (arithmetic circuit 77) performs control such that the number of turns of the entire signal injection winding W3 is caused to decrease, an electromotive force of the AC signal S1 at the signal injection winding W3 is caused to increase, and the injection current Ii is thereby likely to be injected, by outputting the control signal Sc2 and controlling each parallel switch SWa when the load impedance is large. In this manner, the processing unit 7 (arithmetic circuit 77) includes the magnitude of the injection current Ii to be injected to the target injection line L within the aforementioned target current value range by controlling the number of turns of the signal injection winding W3 to an optimal number of turns.

The capacitor CL is a capacitor that is connected in parallel to ends of the load Load in a measurement target system in which the battery Bat as a measurement target and the load Load as a non-measurement target are connected in series to the target injection line L to form a closed loop with an annular shape and includes a function of short-circuiting the load Load when the impedance of the load Load is large, and a multilayer capacitor of 100 µF is used, for example. Also, the switch SL is connected in series to the capacitor CL, and the processing unit 7 performs ON/OFF control thereon. Additionally, the serial circuit of the capacitor CL and the switch SL is connected in parallel to ends of the load Load. Therefore, when the switch SL is controlled in the ON state, the serial circuit of the capacitor CL and the switch SL short-circuits the ends of the load Load. When the impedance of the load Load is large, the impedance of the entire closed loop constituted by the battery Bat, the target injection line L, and the load Load also becomes large. At such a time, it is difficult to increase the current value (injection amount) of the injection current Ii when the signal injection unit 3 injects the AC signal S1 to the target injection line L.

Therefore, the impedance with respect to the AC signal S1 decreases in the entire closed loop, and it is possible to increase the current value of the injection current Ii when the signal injection unit 3 injects the AC signal S1 to the target injection line L, by short-circuiting the ends of the load Load with the capacitor CL. Note that for the capacitor CL, it is possible to employ a configuration not using the switch SL, in which the probes provided at both ends of the capacitor CL are attached directly to both ends of the load Load or a configuration in which both leads of the capacitor CL are attached directly to both ends of the load Load, when the impedance of the load Load is large.

Next, operations of the impedance measurement device 1A will be described with reference to FIG. 9. Note that the measuring processing itself of measuring the internal impedance Zb of the battery Bat as a measurement target is similar to that of the impedance measurement device 1, repeated description will thus be omitted, and different processing will be described.

In the impedance measurement device 1A, the processing unit 7 (arithmetic circuit 77) outputs the control signal Sc2 and controls the current value of the AC current Iac instead of or in addition to the processing of outputting the aforementioned control signal Sc1 to control the signal level of the AC signal S1 to be output from the signal injection unit 3 to include the current value of the injection current Ii indicated by the detection signal S3 output from the non-contact-type current sensor 5 within the target current value range in the impedance calculation processing. Specifically, the arithmetic circuit 77 controls the current value of the injection current Ii by outputting the control signal Sc2 and changing the number of turns of the signal injection winding W3 while monitoring the current value (the signal level of the AC signal S1) of the injection current Ii that is being injected to the target injection line L on the basis of the input current data Di (this may be the signal data D12 output from the A/D conversion circuit 72).

More specifically, the arithmetic circuit 77 obtains the load impedance seen from the signal injection winding W3 in a state where the load Load is connected to the battery Bat and the closed loop state has been achieved (the internal impedance Zb of the battery Bat and the impedance of the load Load) on the basis of the current value of the AC current Iac output from the signal generation circuit 31 and the current value of the injection current Ii (the current value indicated by the current data Di or the signal data D12) detected by the non-contact-type current sensor 5. Then, the arithmetic circuit 77 performs control such that the number of turns of the entire signal injection winding W3 is caused to increase and more injection current Ii is likely to be injected by outputting the control signal Sc2 and controlling each parallel switch SWa when the load impedance is small. On the other hand, the arithmetic circuit 77 performs control such that the number of turns of the entire signal injection winding W3 is reduced to increase an electromotive force of the AC signal S1 at the signal injection winding W3 and the injection current Ii is likely to be injected, by outputting the control signal Sc2 and controlling each parallel switch SWa when the load impedance is large. In this manner, the arithmetic circuit 77 includes the magnitude of the injection current Ii to be injected to the target injection line L within the aforementioned target current value range by controlling the number of turns of the signal injection winding W3 to an optimal number of times of winding. In this case, although variations in load on the signal generation circuit 31 increase when the number of turns of the signal injection winding W3 is changed (switched), the signal generation circuit 31 can maintain the output level of the AC signal S1 at a controlled constant level with respect to the variations in load since the final stage of the signal generation circuit 31 is configured of the class-D amplification unit.

Also, the processing unit 7 (arithmetic circuit 77) short-circuits both ends of the load Load with the capacitor CL by controlling the switch SL in the ON state instead of or in addition to the outputting of the control signal Sc2 when the load impedance is large. In this manner, the AC impedance of the load Load decreases, the load impedance thus decreases, and as a result, the current value of the AC current Iac to be injected to the target injection line L increases.

Note that the aforementioned integer Na is not limited to 4 and may be 2, 3, 5 or more in the configuration of the signal injection winding W3, the integer La is also not limited to 10, and it is possible to configure the primary winding component CP1A by employing an arbitrary integer greater than or equal to 1. Also, the first winding to the Na-th winding can also be configured such that they are wound the same number of times.

Figure 16:
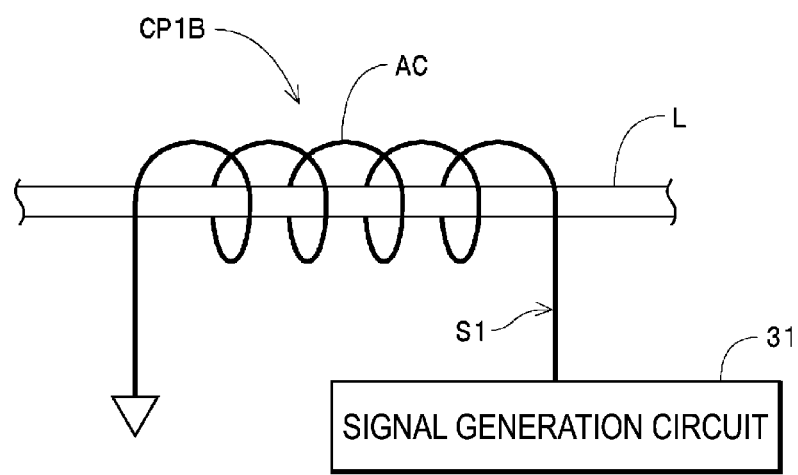
FIG. 16 is a configuration diagram illustrating a configuration of an air core coil AC.

As for the primary winding component CP, it is also possible to employ a primary winding component CP1B using an air core coil AC configured such that the target injection line L can be inserted as illustrated in FIG. 16 instead of the magnetic core 2 and the magnetic core 2A of the primary winding component CP1 and the primary winding component CP1A. Although not illustrated in the drawing, it is also possible to use a Rogowskii coil configured by an insulated coated wire being wound around a core material with an annular shape as the primary winding component CP. It is possible to inject the AC signal S1 to the core wire of the target injection line L in a non-contact manner and to configure the primary winding component CP at low costs by using these primary winding components CP. Also, it is possible to achieve size reduction of the primary winding component CP and to thereby reliably and easily attach the primary winding component CP to the target injection line L disposed in a narrow measurement place.

Next, an impedance measurement device 1B will be described. The impedance measurement device 1B includes a plurality of primary winding components CP that are caused to correspond to a plurality of frequency band groups obtained by grouping the frequency band of the AC signal S1 generated by the signal injection unit 3 and injected to the target injection line L (four primary winding components CP1 and two primary winding components CP1B in this example). Note that it is also possible to use the primary winding component CP1A instead of the primary winding component CP1. Also, since impedance measurement processing itself of the impedance measurement device 1B is similar to that of the impedance measurement devices 1 and 1A, components that have the same functions as those of the components in the aforementioned impedance measurement devices 1 and 1A will be denoted by the same reference signs, repeated description will be omitted, and different configurations and operations from those of the impedance measurement devices 1 and 1A will be mainly described.

Figure 17:
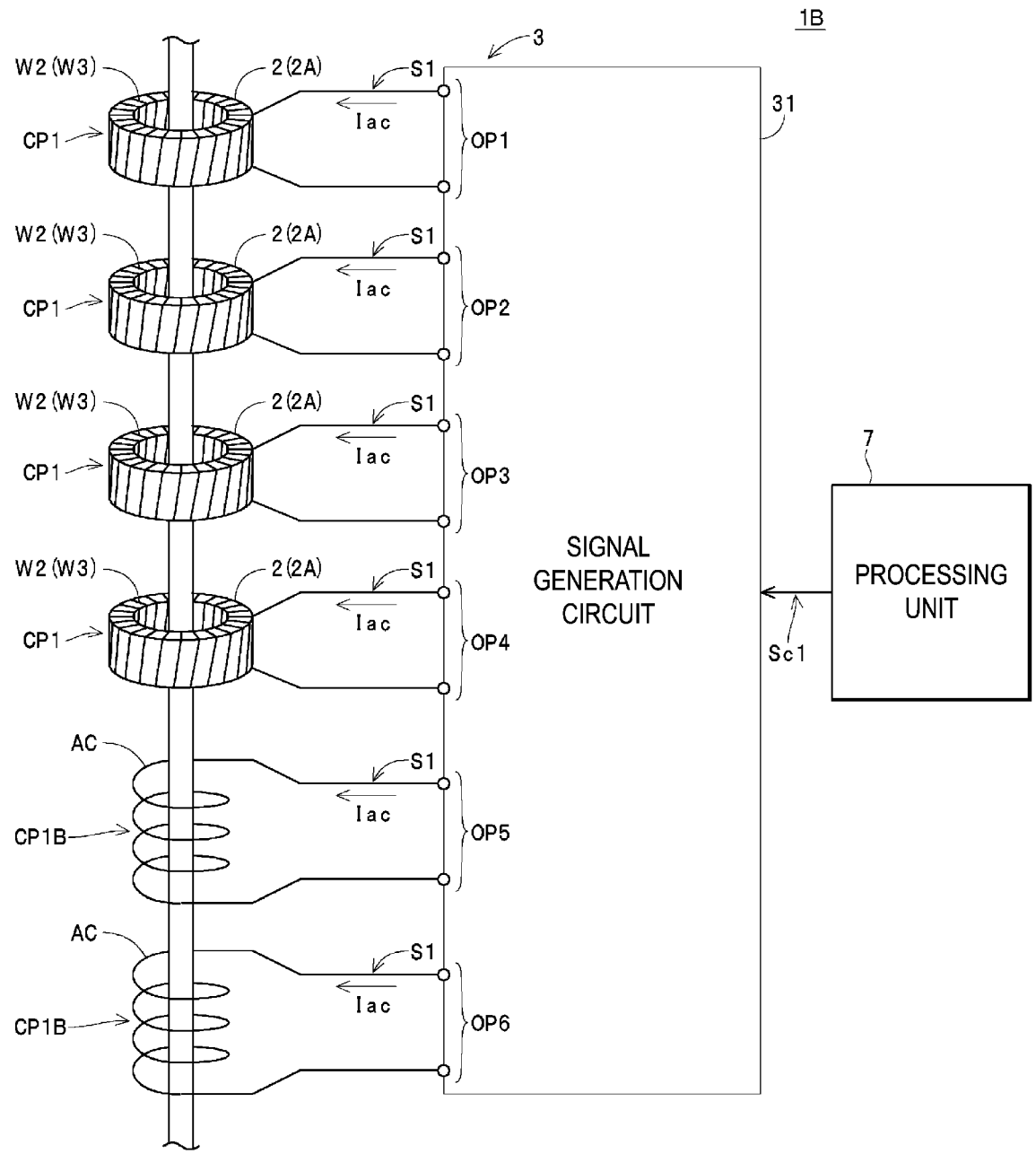
FIG. 17 is a configuration diagram illustrating a configuration of an impedance measurement device 1B.
Figure 18:
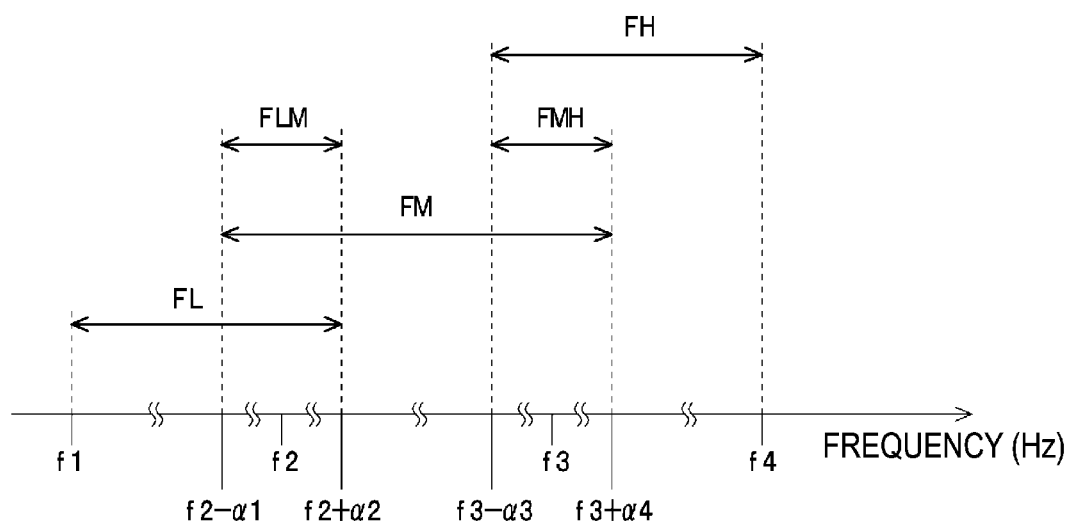
FIG. 18 is a graph showing three frequency band groups FL, FM, and FH.

In the impedance measurement device 1B, a signal injection unit 3 includes a signal generation circuit 31 including six output units Ou1 to Op6 (hereinafter, also referred to as "output units Op" when they are not distinguished) that output an AC signal S1 as illustrated in FIG. 17. In this case, the frequency band of the AC signal S1 is grouped into three frequency band groups FL, FM, and FH (hereinafter, also referred to as "frequency band groups F" when they are not distinguished). Here, the frequency band group FL on a low frequency band side is defined in a range from a frequency f1=1 Hz as a lower limit to a frequency f2=50 KHz as an upper limit, the frequency band group FM on a middle frequency band side is defined in a range from the frequency f2=50 KHz as a lower limit to a frequency f3=500 KHz as an upper limit, and the frequency band group FH on a high frequency band side is defined in a range from the frequency f3=500 KHz as a lower limit to a frequency f4=10 MHz as an upper limit, for example, as shown in FIG. 18.

Also, in the plurality of primary winding components CP1 (although the example of two primary winding components CP1 will be described in this example, the number thereof may be three or more), each of which is made to correspond to the frequency band group FL, a magnetic core 2 (or a magnetic core 2A) as a first magnetic core is configured of a metal-based magnetic core, a signal injection winding W2 (or a signal injection winding W3) is wound around the magnetic core 2 (or the magnetic core 2A), and the plurality of primary winding components CP1 are configured to have identical specification. Also, in the plurality of primary winding components CP1 (although the example of two primary winding components CP1 will be described in this example, the number thereof may be three or more), each of which is made to correspond to the frequency band group FM, the magnetic core 2 (or the magnetic core 2A) as the first magnetic core is configured of a ferrite-based magnetic core, the signal injection winding W2 (or the signal injection winding W3) is wound around the magnetic core 2 (or the magnetic core 2A), and the plurality of primary winding components CP1 are configured to have identical specification. Moreover, the plurality of primary winding components CP1B (although the example of two primary winding components CP1B will be described in this example, the number thereof may be three or more), each of which is made to correspond to the frequency band group FH are configured of air core coils AC of identical specification formed of insulated coated wires. In this case, any of a permalloy core, a sendust core, an amorphous core, a powder magnetic core, pure iron, a silicon steel plate, Permendur, nickel, cobalt, Fe—Si—Al, and electromagnetic stainless steel is used as the metal-based magnetic core, while any of Mn—Zn-based ferrite and Ni—Zn-based ferrite is used as the ferrite-based magnetic core. Moreover, it is also possible to use a magnetic fluid or a magnetic resin obtained by forming a metal-based material or a ferrite-based material as powder and mixing it in an oil or a resin.

Also, the signal injection unit 3 is configured to change the frequency of the AC signal S1, and when an AC signal S1 of a frequency belonging to one of the frequency band groups F is injected in accordance with a control signal Sc1 output from the processing unit 7 (arithmetic circuit 77), the AC signal S1 is output from two output units Op corresponding to the one frequency band group F, and the AC signal S1 is synchronously applied to each of the ends of the two primary winding components CP.

Next, operations of the impedance measurement device 1B will be described with reference to the accompanying drawings. Note that since measurement processing itself of measuring an internal impedance Zb of a battery Bat as a measurement target is similar to that of the impedance measurement devices 1 and 1A, repeated description will be omitted, and different processing will be described.

In the impedance measurement device 1B, the processing unit 7 (arithmetic circuit 77) outputs the control signal Sc1 to the signal injection unit 3 and designates a frequency of the AC signal S1 that the signal generation circuit 31 is caused to generate when the frequency of the AC signal S1 is changed or swept in the impedance calculation processing. At this time, the signal generation circuit 31 outputs the AC signal S1 at the same frequency, in the same phase, and in the same signal level to the two output units Op corresponding to the frequency band group F to which the designated frequency belongs. Specifically, the signal generation circuit 31 outputs the AC signal S1 to the two output units Op1 and Op2 when the AC signal S1 of the frequency belonging to the frequency band group FL is output. Also, the signal generation circuit 31 outputs the AC signal S1 to the two output units Op3 and Op4 when the AC signal S1 of the frequency belonging to the frequency band group FM is output. Additionally, the signal generation circuit 31 outputs the AC signal S1 to the two output units Op5 and Op6 when the AC signal S1 of the frequency belonging to the frequency band group FH is output. In this manner, the AC signal S1 is injected to the target injection line L via the two primary winding components CP.

Note that although variations in load on the signal generation circuit 31 increase when the signal generation circuit 31 outputs the AC signal S1 with a shift from one primary winding component CP to the other primary winding component CP, the final stage of the signal generation circuit 31 is configured of a class-D amplification unit, and the signal generation circuit 31 can thus maintain the output level of the AC signal S1 at a controlled constant level even with variations in load.

In addition, the processing unit 7 (arithmetic circuit 77) causes the signal generation circuit 31 to apply the AC signal S1 to the two primary winding components CP corresponding to two adjacent frequency band groups F when causing the signal generation circuit 31 to change (or sweep) the frequency of the AC signal S1 from one of the frequency band groups F to the other frequency band group F at the boundary portion of the two frequency band groups F of the mutually adjacent frequency bands of the AC signal S1.

Specifically, the processing unit 7 (arithmetic circuit 77) causes the signal generation circuit 31 to output the AC signal S1 to the two primary winding components CP corresponding to the two adjacent frequency band groups F at the boundary portion FLM of a range from a frequency that is lower than the frequency f2 by a frequency $\alpha 1$ (−10% with respect to the frequency f2, for example) to a frequency that is higher than the frequency f2 by a frequency $\alpha 2$ (+10% with respect to the frequency f2, for example) by outputting the control signal Sc1 to the signal generation circuit 31 when the frequency of the AC signal S1 is changed (or swept) from the frequency band group FL to the frequency band group FM and when the frequency of the AC signal S1 is changed (or swept) from the frequency band group FM to the frequency band group FL, as shown in FIG. 18. In this manner, the signal generation circuit 31 outputs the AC signal S1 with the same frequency, in the same phase, and in the same signal level (this may be controlled to ½ the signal level at a frequency other than the boundary portion FLM) from the four output units Op1, Op2, Op3, and Op4. As a result, the magnetic cores 2 (or the magnetic core 2A) of the two types of materials suitable for coupling to the target injection line L are used in accordance with the frequency of the AC signal S1 at the boundary portion FLM, and the AC signal S1 is thus sufficiently efficiently injected to the target injection line L.

Similarly, the processing unit 7 (arithmetic circuit 77) causes the signal generation circuit 31 to output the AC signal S1 to the two primary winding components CP corresponding to the two adjacent frequency band groups F at the boundary portion FMH of a range from a frequency that is lower than a frequency f3 by a frequency $\alpha 3$ (−10% with respect to the frequency f3, for example) to a frequency that is higher than the frequency f3 by a frequency α4 (+10% with respect to the frequency f3, for example) by outputting the control signal Sc1 to the signal generation circuit 31 when the frequency of the AC signal S1 is changed (or swept) from the frequency band group FM to the frequency band group FH and when the frequency of the AC signal S1 is changed (or swept) from the frequency band group FH to the frequency band group FM, as shown in FIG. 18. In this manner, the signal generation circuit 31 outputs the AC signal S1 with the same frequency, in the same phase, and in the same signal level (this may be controlled to ½ the signal level at a frequency other than the boundary portion FMH) from the four output units Op3, Op4, Op5, and Op6. As a result, the magnetic core 2 (or the magnetic core 2A) and the air core coil AC suitable for coupling to the target injection line L are used in accordance with the frequency of the AC signal S1 at the boundary portion FLM, and the AC signal S1 is thus sufficiently efficiently injected to the target injection line L.

Note that the number of groups obtained from the frequency band is not limited to three and the frequency band may be grouped into two frequency band groups. In that case, the magnetic core 2 (or the magnetic core 2A) in the primary winding component CP1 that is caused to correspond to the frequency band group FL on the low frequency band side out of the two frequency band groups is configured of a metal-based magnetic core, and the magnetic core 2 (or the magnetic core 2A) in the primary winding component CP1 that is caused to correspond to the frequency band group FM on the high frequency band side out of the two frequency band groups is configured of a ferrite-based magnetic core in an example.

Furthermore, the magnetic core 2 (or the magnetic core 2A) in the primary winding component CP1 that is caused to correspond to the frequency band group FM on the low frequency band side out of the two frequency band groups may be configured of a metal-based magnetic core or a ferrite-based magnetic core, and the primary winding component that is caused to correspond to the frequency band group FH on the high frequency band side out of the two frequency band groups may be configured of a primary winding component CP1B of an air core coil AC in another example.

Next, an impedance measurement device 1C with a configuration including a plurality of voltage detection units 6 will be described. Note that the impedance measurement device 1C is different from the aforementioned impedance measurement devices 1, 1A, and 1B in that the impedance measurement device 1C includes a plurality of the voltage detection units 6, and a processing unit 7A is configured to synchronously measure impedances of a plurality of measurement targets, but includes the other configurations and functions similar to those of the impedance measurement devices 1, 1A, and 1B. Therefore, configurations and operations that are different from those of the impedance measurement devices 1, 1A, and 1B will be mainly described below.

Figure 19:
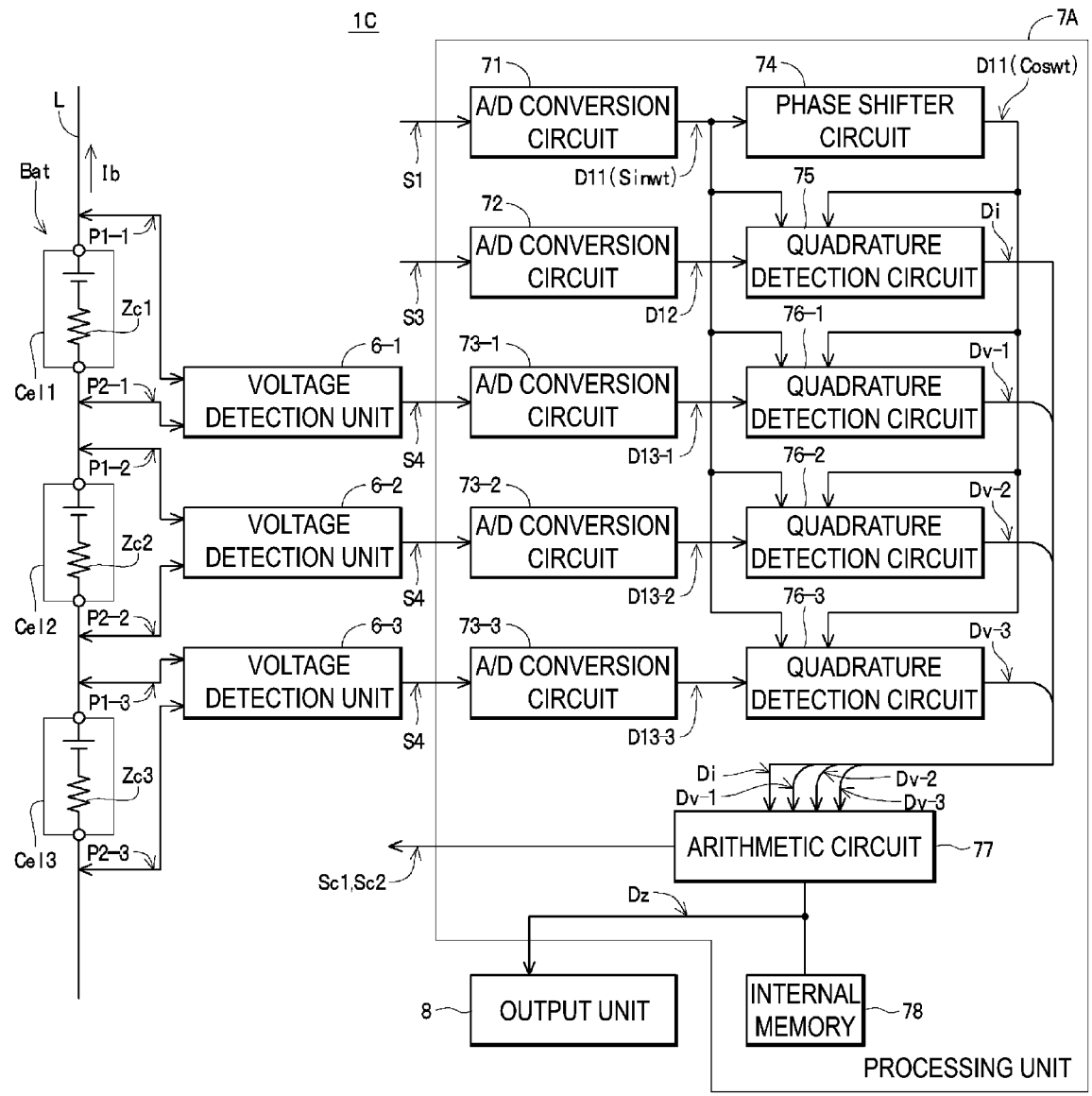
FIG. 19 is a configuration diagram illustrating a configuration of an impedance measurement device 1C.

The impedance measurement device 1C includes a plurality of voltage detection units 6 (three voltage detection units 6, namely a voltage detection unit 6-1, a voltage detection unit 6-2, and a voltage detection unit 6-3 in the drawing) having the same configuration and the same function as those of the aforementioned voltage detection unit 6, as illustrated in FIG. 19. Hereinafter, the three voltage detection units 6-1, 6-2, and 6-3 will also be referred to as "voltage detection units 6" when they are not distinguished.

In this case, the three voltage detection units 6 detect voltage values of AC signals S1 generated at ends of each of a plurality of battery cells from among many battery cells in a battery Bat as a measurement target that is connected in series to an target injection line L (in the drawing, three battery cells Cel1 to Cel3: hereinafter, also referred to as "battery cells Cel" when they are not distinguished) and output each end-to-end voltage signal S4 to the processing unit 7A. Also, each voltage detection unit 6 includes a pair of contact-type probes P1, P2, a buffer circuit 61, and an insulating circuit 62. Note that illustration of the buffer circuit 61 and the insulating circuit 62 is omitted. Also, the three sets of probes P1, P2 will be referred to as "a probe P1-1, a probe P1-2, a probe P1-3, a probe P2-1, a probe P2-2, and a probe P2-3" when they are distinguished, and the three sets of probes P1, P2 will be referred to as "probes P1, P2" when they are not distinguished below.

In addition, the processing unit 7A is configured of a CPU and, for example, includes A/D conversion circuits 71, 72, three A/D conversion circuits 73-1, 73-2, and 73-3 (hereinafter, also referred to as "A/D conversion circuits 73" when they are not distinguished) having the same configuration and the same function as those of the aforementioned A/D conversion circuit 73, a phase shifter circuit 74, a quadrature detection circuit 75, three quadrature detection circuits 76-1, 76-2, 76-3 (hereinafter, also referred to as "quadrature detection circuits 76" when they are not distinguished) having the same configuration and the same function as those of the aforementioned quadrature detection circuit 76, an arithmetic circuit 77, and an internal memory 78, inputs a detection signal S3 (current detection signal) and a plurality of (three in this example) end-to-end voltage signals S4 (voltage detection signals), and measures internal impedances Zc1, Zc2, Zc3 (hereinafter, also referred to as "internal impedances Zc" when they are not distinguished) of the three battery cells Cel1 to Cel3 that are measurement targets, on the basis of the detection signal S3 and the three end-to-end voltage signals S4.

Next, measurement processing in which the impedance measurement device 1C measures the internal impedance Zc of each battery cell Cel in the battery Bat as a measurement target will be described.

First, a non-contact-type current sensor 5 is caused to be clamped at the target injection line L, the probes P1-1 and P2-1 are connected (connected) to ends of the battery cell Cel1, respectively, the probes P1-2 and P2-2 are connected (connected) to ends of the battery cell Cel2, respectively, and the probes P1-3 and P2-3 are brought into contact with (connected) to ends of the battery cell Cel3.

At the time of impedance measurement processing, each voltage detection unit 6 inputs voltages across both ends of each battery cell Cel via the pair of probes P1 and P2 and outputs an end-to-end voltage signal S4 which is a differential voltage of the AC voltages to the processing unit 7.

On the other hand, the A/D conversion circuit 71 inputs an AC signal S1, performs A/D conversion, and outputs signal data D11 (sin ωt) to the phase shifter circuit 74, the quadrature detection circuit 75, and each quadrature detection circuit 76 in the processing unit 7. Also, the A/D conversion circuit 72 inputs a detection signal S3, performs A/D conversion, and outputs signal data D12 to the quadrature detection circuit 75. In addition, each of the A/D conversion circuits 73-1, 73-2, and 73-3 inputs the end-to-end voltage signal S4, performs A/D conversion, and outputs signal data D13-1, D13-2, and D13-3 (hereinafter, also referred to as "signal data D13" when they are not distinguished) to each of the corresponding quadrature detection circuits 76-1, 76-2, and 76-3, respectively. Moreover, the phase shifter circuit 74 inputs the signal data D11, generates signal data D11 (cos ωt), and outputs the signal data D11 (cos ωt) to the quadrature detection circuit 75 and each quadrature detection circuit 76.

In addition, the quadrature detection circuit 75 inputs the signal data D12, generates current data Di, and outputs the current data Di to the arithmetic circuit 77. Also, each of the quadrature detection circuits 76-1, 76-2, and 76-3 inputs the signal data D13, generates voltage data Dv-1, Dv-2, and Dv-3 (hereinafter, also referred to as "voltage data Dv" when they are not distinguished), and outputs the voltage data Dv-1, Dv-2, and Dv-3 to the arithmetic circuit 77, respectively. Then, the arithmetic circuit 77 inputs the current data Di and each piece of voltage data Dv, calculates the internal impedance Zc1 of the battery cell Cel1 on the basis of the current data Di and the voltage data Dv-1, calculates the internal impedance Zc2 of the battery cell Cel2 on the basis of the current data Di and the voltage data Dv-2, calculates the internal impedance Zc3 of the battery cell Cel3 on the basis of the current data Di and the voltage data Dv-3, outputs the impedance data Dz to the internal memory 78 to store the impedance data Dz, and outputs the impedance data Dz to the output unit 8. At this time, the output unit 8 inputs the impedance data Dz and displays, on the screen of the display device, the internal impedances Zc1, ZC2, and Zc3 of the battery cells Cel1, Cel2, and Cel3.

Figure 20:
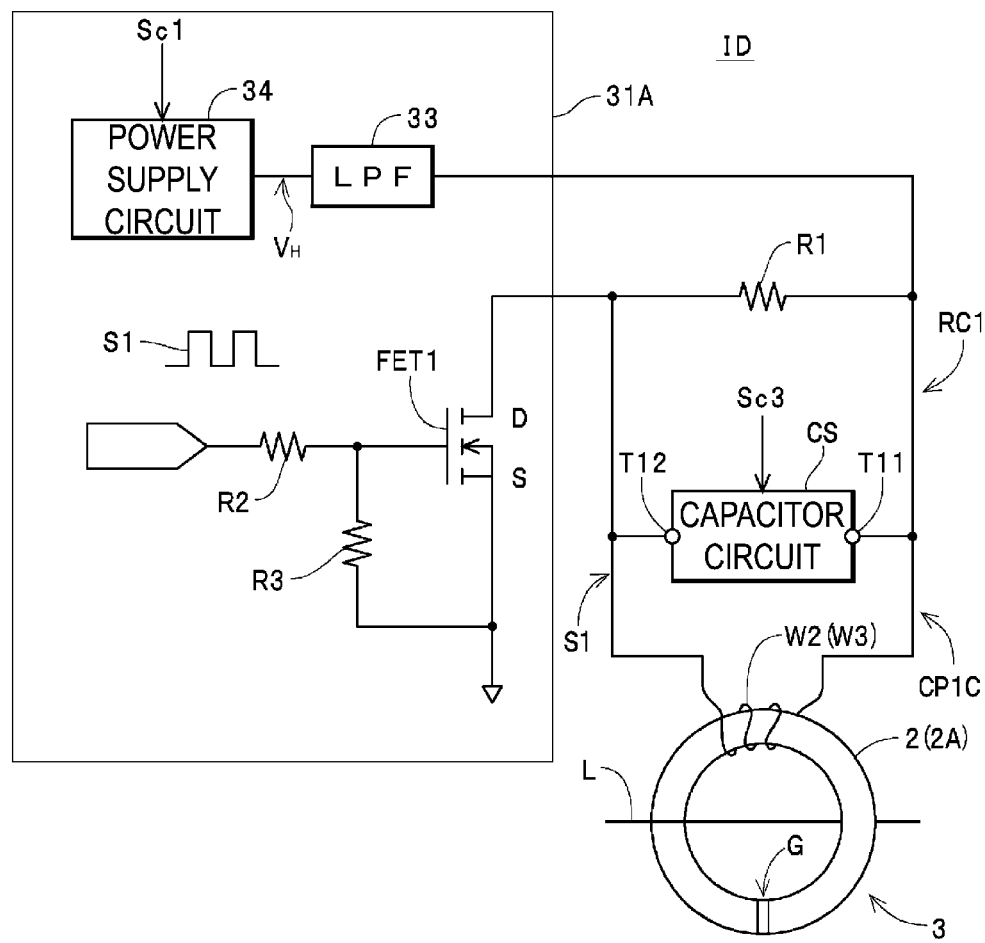
FIG. 20 is a configuration diagram illustrating a configuration of an impedance measurement device 1D.

Next, an impedance measurement device 1D will be described. The impedance measurement device 1D includes a primary winding component CP1C configured by a signal injection unit 3 including a magnetic core 2 (or a magnetic core 2A), a signal injection winding W2 (or a signal injection winding W3) wound around the magnetic core 2 (or the magnetic core 2A), a capacitor circuit CS, and a damping resistor R1 as illustrated in FIG. 20. Also, the signal injection unit 3 includes a signal generation circuit 31A. Note that the impedance measurement device 1D is different from the aforementioned impedance measurement devices 1, 1A, 1B, and 1C in that the impedance measurement device 1D includes the primary winding component CP1C including the capacitor circuit CS and the damping resistor R1 and the impedance measurement device 1D includes the signal generation circuit 31A instead of the aforementioned signal generation circuit 31 and includes the other configurations and functions similar to those of the impedance measurement devices 1, 1A, 1B, and 1C. Therefore, components having the same functions as those of the components in the aforementioned impedance measurement devices 1, 1A, 1B, and 1C will be denoted by the same references, repeated description will be omitted, and configurations and operations that are different from those of the impedance measurement devices 1, 1A, 1B, and 1C will be mainly described below.

The primary winding component CP1C includes a capacitor circuit CS constituting, along with a signal injection winding W2 (or a signal injection winding W3) as a primary winding, an LC parallel resonance circuit (an example of the LC resonance circuit) RC1. In this case, the LC parallel resonance circuit RC1 is disposed as a load circuit of an FET 1, which will be described later. In addition, an inductance of the signal injection winding W2 (or the signal injection winding W3) and capacity of the capacitor circuit CS are determined such that the LC parallel resonance circuit RC1 has a resonance point at the frequency of the AC signal S1 or at a frequency in the vicinity thereof (that is, a frequency between 9.5 kHz to 10.5 kHz when the frequency of the AC signal S1 is 10 kHz, for example (a frequency within a range of about +5% with respect to the frequency of the AC signal S1)). In this case, the LC parallel resonance circuit RC1 functions as a primary winding with respect to the target injection line L as a secondary winding, only a basic wave of the AC signal S1 that is a signal at the same frequency as or at a frequency in the vicinity of the resonance frequency of the LC parallel resonance circuit RC1 is thus transmitted to the target injection line L through parallel resonance. Therefore, when the FET 1 performs class-D amplification on the AC signal S1 that is a pulse signal as will be described later, only the AC signal S1 of a sine wave is transmitted without transmitting a harmonic of the AC signal S1 to the target injection line L. In other words, the LC parallel resonance circuit RC1 has a function of causing the FET 1 to linearly amplify the AC signal S1 of a sine wave.

In addition, the primary winding component CP1C also includes a damping resistor R1 that causes a Q value of resonance at the LC parallel resonance circuit RC1 to decrease. In this case, each of the capacitor circuit CS and the damping resistor R1 is connected in parallel to the signal injection winding W2 (or the signal injection winding W3). Also, the resistance value of the damping resistor R1 is defined as 10 KΩ, for example. However, in regard to the damping resistor R1, it is also possible to employ a variable resistor capable of varying a resistance value such that the Q value of resonance is arbitrarily variable, instead of the fixed resistor with a fixed resistance value. Also, in a case where it is necessary to keep the Q value of resonance in the LC parallel resonance circuit RC1 high, it is also possible to omit the disposition of the damping resistor R1.

The capacitor circuit CS includes Nb capacitors (Nb is an integer greater than or equal to 2) from a first capacitor to an Nb-th capacitor that are connected in parallel as a whole and have mutually different capacities and Nb switches from a first serial switch to an Nb-th serial switch that are connected in series to the first capacitor to the Nb-th capacitor, respectively. Also, each of the first capacitor to the Nb-th capacitor is defined to have a capacity obtained by multiplying $2^{Mb}$ (Mb denotes Nb integers from 0 to (Nb−1)) by a specific capacity (for example, "0.025 μF"). In this case, one end T11 (one end of the LC parallel resonance circuit RC1) of the capacitor circuit CS is connected to an output terminal of the LPF 33 which is a high potential and will be described later, and the other end T12 (the other end of the LC parallel resonance circuit RC1) of the capacitor circuit CS is connected to a drain of the FET 1.

Figure 21:
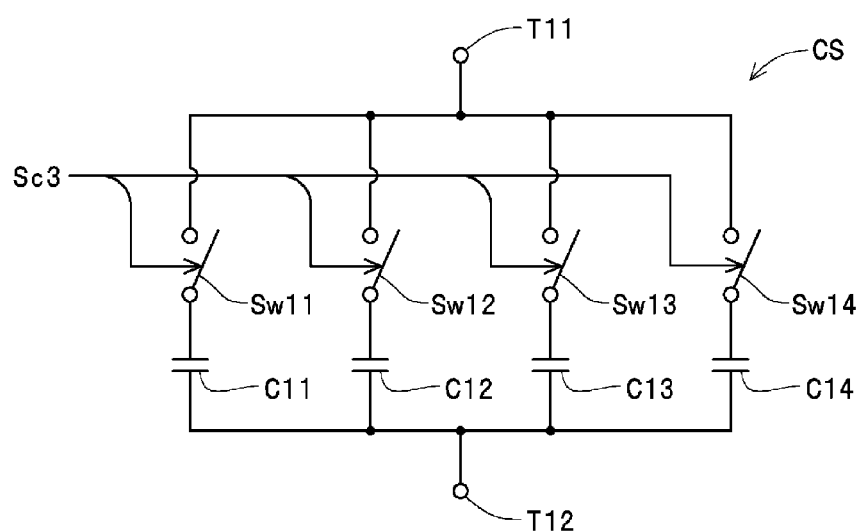
FIG. 21 is a configuration diagram illustrating a configuration of a capacitor circuit CS.

Specifically, the primary winding component CP1C is configured by employing 4 as the integer Nb, for example. Therefore, the primary winding component CP1C includes four capacitors from a capacitor C11 to a capacitor C14 (hereinafter, also referred to as "capacitors Cb" when they are not distinguished) and four switches from a serial switch SW11 to a serial switch SW14 (hereinafter, also referred to as "serial switches SWb" when they are not distinguished) that are connected in series to the capacitor C11 to the capacitor C14, respectively, as illustrated in FIG. 21. In this case, the serial switches SWb may be configured of semiconductor switches such as transistors or FETs or may be configured of mechanical switches such as relays. In addition, the capacitor C11 to the capacitor C14 have capacities of 0.025 μF, 0.050 μF, 0.100 μF, and 0.200 μF, respectively, in an example. Also, the integer Nb is not limited to 4, and it is possible to employ 2, 3, or a number greater than or equal to 5.

Figure 22:
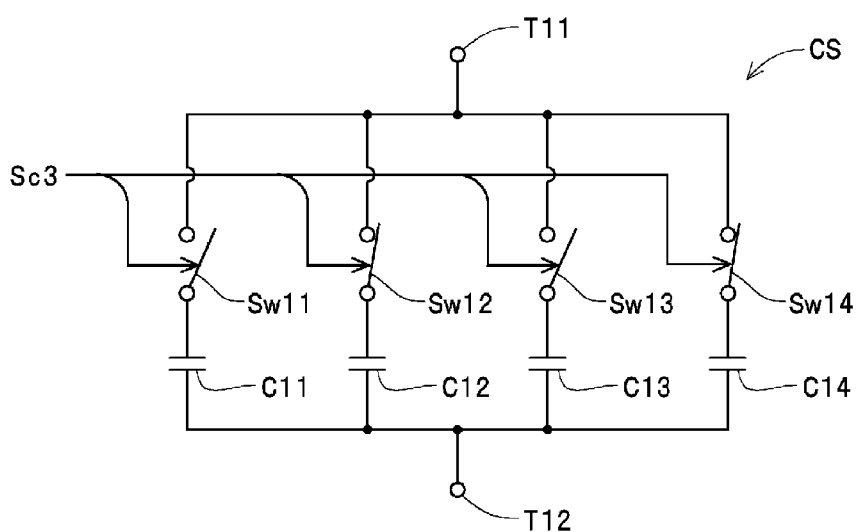
FIG. 22 is another configuration diagram illustrating a configuration of the capacitor circuit CS.

In the impedance measurement device 1D, the processing unit 7 performs ON/OFF control of the four serial switches SW11 to SW14 through binary port control and changes the capacity of the entire capacitor circuit CS. Specifically, the capacity of the capacitor circuit CS is caused to increase by the amount corresponding to the capacity of the capacitor Cb when the serial switch SWb that is connected in series correspondingly to each capacitor Cb is controlled in an ON state, and is caused to decrease by the amount corresponding to the capacity of the capacitor Cb when the serial switch SWb is controlled in an OFF state. Therefore, the processing unit 7 (arithmetic circuit 77) outputs a control signal Sc3 to the four serial switches SW11 to SW14 and individually performs ON/OFF control, and the capacity of the entire capacitor circuit CS is thereby caused to change by every 0.025 μF from 0 μf to 0.375 μf (substantially, from 0.025 μF to 0.375 μF). When the serial switches SW12 and SW14 are controlled in the ON state, and the serial switches SW11 and SW13 are controlled in the OFF state as illustrated in FIG. 22, for example, the capacitor circuit CS is controlled to have a capacity of 0.25 μF as a whole since the capacities of the capacitors C12 and C14 increase. In this manner, the processing unit 7 causes the capacity of the entire capacitor circuit CS to be changed by performing port control when the frequency of the AC signal S1 is caused to be swept, and changes the resonance frequency of the LC parallel resonance circuit RC1 to be the same as or in the vicinity of the frequency of the AC signal S1.

The signal generation circuit 31A includes an FET 1, resistors R2 and R3, a low pass filter 33 (hereinafter, also referred to as an "LPF 33"), and a power supply circuit 34 as illustrated in FIG. 20. The FET 1 is an amplification circuit that amplifies the AC signal S1 and is configured of an N-channel MOSFET. Also, the FET 1 has a drain terminal connected to the other end side of the LC parallel resonance circuit RC1, a source terminal connected to a reference potential which is a low potential, and a gate terminal connected to a signal oscillator which generates the AC signal S1 and is not illustrated in the drawing. The AC signal S1 that is a pulse signal with voltages split by the resistors R2 and R3 is input to the gate terminal of the FET 1, and the FET 1 performs class-D amplification on the AC signal S1. Note that it is also possible to use a bipolar transistor instead of the FET. Moreover, it is also possible to use an amplification circuit with a push-pull configuration by using an FET or a bipolar transistor, which is not illustrated, instead of the configuration of the FET 1 in this example.

A cut-off frequency of the LPF 33 is defined such that the LPF 33 allows the AC signal S1 (that is also a signal at the same frequency as the resonance frequency of the LC parallel resonance circuit RC1) to pass therethrough and inhibits passage of a higher frequency than that of the AC signal S1 (a harmonic signal of the AC signal S1, in particular), and the LPF 33 is connected in series to the LC parallel resonance circuit RC1. The LPF 33 has an input terminal connected to an output unit of the power supply circuit 34 and an output terminal connected to the LC parallel resonance circuit RC1. Therefore, the LPF 33 has a function of substantially causing the FET 1 along with the LC parallel resonance circuit RC1 to linearly (in a straight line) amplify the AC signal S1 of a sine wave by inhibiting passage of the harmonic frequency of the AC signal S1 to the side of the power supply circuit 34 and passage thereof from the side of the power supply circuit 34 when the FET 1 performs class-D amplification on the AC signal S1 which is a pulse signal.

The power supply circuit 34 is a power source device of an output voltage variable type capable of varying a voltage $V_H$ as a high potential and generates and outputs the voltage $V_H$ in accordance with the control signal Sc1 output from the processing unit 7. In this case, a drain voltage of the FET 1 changes by the power supply circuit 34 outputting the voltage $V_H$ in accordance with an instruction provided by the control signal Sc1, and as a result, the voltage (this is also a power) of the AC signal S1 output from the FET 1 is caused to freely change.

Next, operations of the impedance measurement device 1D will be described. Note that measurement processing itself of measuring the internal impedance Zb of the battery Bat as a measurement target is similar to that of the impedance measurement devices 1, 1A, 1B, and 1C, repeated description will thus be omitted, and different processing will be described.

In the impedance measurement device 1D, the processing unit 7 (arithmetic circuit 77) outputs the control signal Sc1 to the signal generation circuit 31A of the signal injection unit 3 and controls the signal level and the frequency of the AC signal S1 in the impedance calculation processing. At this time, the signal generation circuit 31A generates the AC signal S1 that is a pulse signal including, as a basic wave, the frequency indicated by the control signal Sc1, and outputs the AC signal S1 to the FET 1. Also, the FET 1 inputs the AC signal S1 with voltages split by the resistors R2 and R3 to the gate terminal and performs class-D amplification on the AC signal S1. Moreover, the power supply circuit 34 controls the voltage value of the voltage $V_H$ to be applied to the drain of the FET 1 such that the signal level of the AC signal S1 becomes the signal level indicated by the control signal Sc1. In this manner, the FET 1 of the signal generation circuit 31A generates and outputs the AC signal S1 in the signal level and with the frequency indicated by the control signal Sc1.

In this case, in a configuration in which the LC parallel resonance circuit RC1 is not provided, the AC signal S1 is unlikely to flow through the signal injection winding W2 (or the signal injection winding W3) due to an inductance component of the signal injection winding W2 (or the signal injection winding W3) when the frequency of the AC signal S1 is high. Also, a loss of the AC signal S1 increases, and heat generation also increases, due to a resistance value of a routing line and an inductance component when the distance between the signal injection winding W2 (or the signal injection winding W3) and the signal generation circuit 31A is long. Furthermore, a likelihood that radio wave radiation of the harmonic of the AC signal S1 from the routing line increases due to the AC signal S1 caused to flow through the routing line and does not meet the EMC standard (noise standard) may occur.

On the other hand, since the impedance measurement device 1D includes the LC parallel resonance circuit RC1, the processing unit 7 (arithmetic circuit 77) performs ON/OFF control on the four serial switches SW11 to SW14 in accordance with the frequency of the AC signal S1 generated by the signal generation circuit 31A by outputting the control signal Sc3 to the capacitor circuit CS, and changes the capacity of the entire capacitor circuit CS. In other words, the processing unit 7 (arithmetic circuit 77) changes the resonance frequency of the LC parallel resonance circuit RC1 to a frequency of the AC signal S1 or a frequency in the vicinity of the frequency. In this case, the control signal Sc3 is sequentially output to the capacitor circuit CS such that the frequency of the AC signal S1 becomes a resonance frequency that is or is in the vicinity of the frequency of the AC signal S1 to be swept when the frequency of the AC signal S1 is swept.

Therefore, since the impedance of the LC parallel resonance circuit RC1 at the frequency of the AC signal S1 increases, and the impedance of the LC parallel resonance circuit RC1 at the frequency of the harmonic of the AC signal S1 decreases, occurrence of harmonic distortion of the AC signal S1 in a current path including the LC parallel resonance circuit RC1 from the drain of the FET 1 is curbed. At the same time, since the impedance of the LPF 33 increases at the frequency of the harmonic of the AC signal S1, occurrence of harmonic distortion of the AC signal S1 is further curbed. As a result, the FET 1 outputs the AC signal S1 of a sine wave. In addition, even when the frequency of the AC signal S1 is high, the AC signal S1 is likely to flow through the signal injection winding W2 (or the signal injection winding W3) since the inductance component of the signal injection winding W2 (or the signal injection winding W3) is significantly small, and as a result, a loss of the AC signal S1 at the LC parallel resonance circuit RC1 is sufficiently reduced. Moreover, even in a case where the distance between the signal injection winding W2 (or the signal injection winding W3) and the signal generation circuit 31A is long, a loss of the AC signal S1 and heat generation due to the resistance value of the routing line and the inductance component decrease since the impedance of the LC parallel resonance circuit RC1 is large. Therefore, the configuration of the amplification circuit including the FET 1 is simplified. Further, since the impedance of the LC parallel resonance circuit RC1 is large, the current value of the AC signal S1 flowing through the routing line decreases, and substantially no harmonic component of the AC signal S1 is generated. As a result, radio wave radiation of the harmonic of the AC signal S1 from the routing line is curbed to a small amount, and the EMC standard (noise standard) is readily satisfied. In addition, since the damping resistor R1 causes the Q value of the resonance at the LC parallel resonance circuit RC1 to decrease, the frequency characteristic of the LC parallel resonance circuit RC1 becomes broad, and as a result, the aforementioned effect is sufficiently exhibited even if the frequency of the AC signal S1 generated by the signal generation circuit 31A and the resonance frequency of the LC parallel resonance circuit RC1 are slightly different from each other. Therefore, the AC signal S1 of the sine wave is efficiently injected to the target injection line L as a secondary winding via the signal injection winding W2 (or the signal injection winding W3) as a primary winding.

Note that in this example, each of the capacitors C11 to C14 is defined to have a capacity obtained by multiplying $2^{Mb}$ (Mb is an integer from 0 to 4) by 0.025 µF as a specific capacity as an example, and it is thus possible to finely control the capacity of the entire capacitor circuit CS. On the other hand, since the capacitor circuit CS includes the four capacitors C11 to C14, the sweepable frequency bandwidth of the AC signal S1 is small. Therefore, it is possible to sufficiently increase the sweepable frequency bandwidth of the AC signal S1 by providing the many capacitors Cb and the serial switches SWb in the same number as that of the capacitors. In addition, the processing unit 7 (arithmetic circuit 77) can output the control signal Sc2 and control the parallel switches SW1 to SW4 with the signal injection winding W3 wound around the magnetic core 2 (or the magnetic core 2A). With this configuration, it is possible to change both the capacities of the capacitors C11 to C14 of the LC parallel resonance circuit RC1 and the inductance of the signal injection winding W3 in accordance with the frequency of the AC signal S1 and to thereby further widen the sweepable frequency bandwidth of the AC signal S1.

However, only the capacity of the capacitor circuit CS may be changed, or only the inductance of the signal injection winding W3 may be changed by using a capacitor with a specific capacity without using the capacitor circuit CS, or both the capacity of the capacitor circuit CS and the inductance of the signal injection winding W3 may be chanced, to change the resonance frequency of the LC parallel resonance circuit RC1. Moreover, it is possible to further increase the sweepable frequency bandwidth of the AC signal S1 by increasing the number (Na) of windings to be wound around the magnetic core 2 (or the magnetic core 2A) and the number (Na) of the serial switches SWa. In this case, it is possible to change the resonance frequency in a linear fashion by changing both the capacity of the capacitor circuit CS and the inductance of the signal injection winding W3 or increasing the number (Na) of winding to be wound around the magnetic core 2 (or the magnetic core 2A) and the number of serial switches SWa (Na). Furthermore, it is also possible to employ a band pass filter (BPF) instead of the LPF 33. In this configuration, the processing unit 7 (arithmetic circuit 77) adjusts low-band and high-band cut-off frequencies of the BPF to achieve a frequency band that allows passage of the AC signal S1. Furthermore, it is also possible to omit disposition of the LPF 33. Also, it is also possible to use the primary winding component CP1B instead of the primary winding component CP1C. In addition, the power supply circuit 34 can also be configured of a power source device with a fixed voltage in a case where it is not necessary to control the signal level of the AC signal S1.

Figure 23:
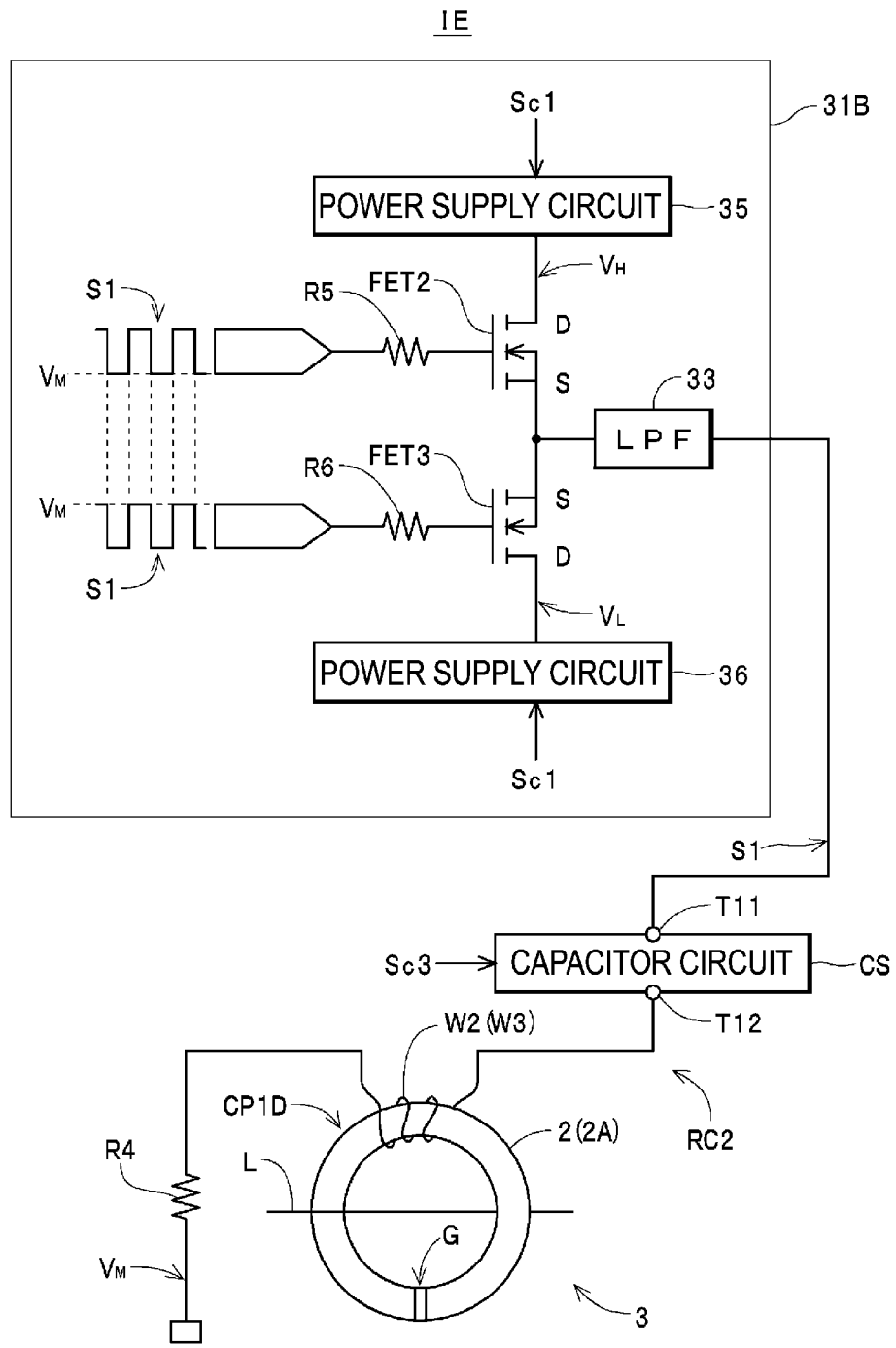
FIG. 23 is a configuration diagram illustrating a configuration of an impedance measurement device 1E.

Next, an impedance measurement device 1E will be described. The impedance measurement device 1D includes a primary winding component CP1D configured by a signal injection unit 3 including a magnetic core 2 (or a magnetic core 2A), a signal injection winding W2 (or a signal injection winding W3) wound around the magnetic core 2 (or the magnetic core 2A), a capacitor circuit CS, and a damping resistor R4 as illustrated in FIG. 23. In addition, the signal injection unit 3 includes a signal generation circuit 31B. Note that the impedance measurement device 1E is different from the aforementioned impedance measurement device 1D in that the impedance measurement device 1E includes the primary winding component CP1D instead of the primary winding component CP1C and includes the signal generation circuit 31B instead of the aforementioned signal generation circuit 31A, and includes the other configurations and functions similarly to the impedance measurement devices 1, 1A, 1B, 1C, and 1D. Therefore, components having the same functions as those of the components in the aforementioned impedance measurement devices 1, 1A, 1B, 1C, and 1D will be denoted by the same reference signs, repeated description will be omitted, and configurations and operations that are different from those of the impedance measurement devices 1, 1A, 1B, 1C, and 1D will be mainly described.

The primary winding component CP1D includes the aforementioned capacitor circuit CS constituting, along with a signal injection winding W2 (or a signal injection winding W3) as a primary winding, an LC serial resonance circuit (an example of an LC resonance circuit) RC2. In this case, the LC serial resonance circuit RC2 is disposed as a load circuit for an FET 2 and an FET 3, which will be described later. Also, an inductance of the signal injection winding W2 (or the signal injection winding W3) and the capacity of the capacitor circuit CS are determined such that the LC serial resonance circuit RC2 has a resonance point at a frequency of an AC signal S1 or a frequency in the vicinity of the frequency (that is, a frequency between 9.5 kHz to 10.5 kHz when the frequency of the AC signal S1 is 10 KHz, for example (a frequency within a range of about +5% with respect to the frequency of the AC signal S1)). In this case, since the LC serial resonance circuit RC2 functions as a primary winding for the target injection line L as a secondary winding, only a basic wave of the AC signal S1 which is a signal at a frequency which is the same as or close to the resonance frequency of the LC serial resonance circuit RC2 is transmitted to the target injection line L through serial resonance. Therefore, only the AC signal S1 of a sine wave is transmitted without allowing the harmonic of the AC signal S1 to be transmitted to the target injection line L when the FETs 2 and 3 perform class-D amplification on the AC signal S1 which is a pulse signal as will be described later. In other words, the LC serial resonance circuit RC2 has a function of causing the FETs 2 and 3 to linearly amplify the AC signal S1 of a sine wave.

In addition, the primary winding component CP1D also includes a damping resistor R4 that causes a Q value of resonance at the LC serial resonance circuit RC2 to decrease. In this case, the capacitor circuit CS and the damping resistor R4 are connected in series to the signal injection winding W2 (or the signal injection winding W3) and constitute a serial circuit, one end of the serial circuit on the side of the capacitor circuit CS is connected to an output terminal of the LPF 33, and the other end of the serial circuit on the side of the damping resistor R4 (one end of the LC serial resonance circuit RC2: one end of the LC resonance circuit) is connected to a midpoint potential $V_M$ (reference potential) between a voltage $V_H$ of a high potential and a voltage $V_L$ of a low potential, which will be described later. In addition, an input terminal of the LPF 33 is connected to sources of the FETs 2 and 3. Note that the resistance value of the damping resistor R4 is defined as 1Ω, for example. However, it is also possible to employ a variable resistor capable of varying the resistance value such that a Q value of resonance is arbitrarily variable, instead of the fixed resistor with a fixed resistance value, as the damping resistor R4. In addition, it is also possible to omit disposition of the damping resistor R4 in a case where it is necessary to keep the Q value of the resonance at the LC serial resonance circuit RC2 high.

Even in the impedance measurement device 1E, similar to the impedance measurement device 1D, the processing unit 7 performs ON/OFF control on four serial switches SW11 to SW14 through binary port control, changes the capacity of the entire capacitor circuit CS, and changes the resonance frequency of the LC serial resonance circuit RC2 to be a frequency that is the same as or is in the vicinity of the frequency of the AC signal S1.

The signal generation circuit 31A includes FETs 2 and 3, resistors R5 and R6, an LPF 33, and power supply circuits 35 and 36. The FETs 2 and 3 are amplification circuits with push-pull configuration of amplifying the AC signal S1, the FET 2 is configured of an N-channel MOSFET, and the FET 3 is configured of a P-channel MOSFET. Also, the FET 2 has a drain terminal connected to an output unit of the power supply circuit 35, a source terminal connected to a source terminal of the FET 3 and an input terminal of the LPF 33 (the side of the other end of the LC serial resonance circuit), and a gate terminal connected to a signal oscillator which generates the AC signal S1 and is not illustrated in the drawing. In addition, the FET 3 has a drain terminal connected to an output unit of the power supply circuit 36, a source terminal connected to a source terminal of the FET 2 and an input terminal of the LPF 33, and a gate terminal connected to a signal oscillator which generates the AC signal S1 and is not illustrated in the drawing. These FETs 2 and 3 perform class-D amplification on the AC signal S1 with the AC signal S1 which is a pulse signal that is positive with respect to the midpoint potential $V_M$ to the gate terminal of the FET 2 via the resistor R5 and with the AC signal S1 which is a pulse signal that is negative with respect to the midpoint potential $V_M$ to the gate terminal of the FET 3 via the resistor R6. Note that it is also possible to use a bipolar transistor instead of the FET.

The LPF 33 has the same configuration as that of the LPF 33 of the impedance measurement device 1D, has an input terminal connected to source terminals of the FETs 2 and 3 and an output terminal connected to the one end T11 of the capacitor circuit CS (one end of the LC parallel resonance circuit RC1), and is thereby connected in series to the LC serial resonance circuit RC2. Therefore, the LPF 33 substantially has a function of causing the FETs 2 and 3 along with the LC serial resonance circuit RC2 to linearly (in a straight line) amplify the AC signal S1 of a sine wave by inhibiting passage of the frequency of the harmonic of the AC signal S1 to the side of the power supply circuits 35 and 36 and passage thereof from the side of the power supply circuits 35 and 36 when the FETs 2 and 3 perform class-D amplification on the AC signal S1 which is a pulse signal.

The power supply circuit 35 is a power source device of an output voltage variable type capable of varying the voltage $V_H$ as a higher potential than the midpoint potential $V_M$ and generates and outputs the voltage $V_H$ in accordance with an instruction provided by the control signal Sc1 output from the processing unit 7. In addition, the power supply circuit 36 is a power source device of an output voltage variable type capable of varying the voltage $V_L$ as a lower potential than the midpoint potential $V_M$ and generates and outputs the voltage $V_L$ in accordance with an instruction provided by the control signal Sc1 output from the processing unit 7. In this case, the power supply circuits 35 and 36 are controlled by the control signal Sc1 output from the processing unit 7 (arithmetic circuit 77) such that a differential voltage obtained by subtracting the midpoint potential $V_M$ from the voltage $V_H$ and a differential voltage obtained by subtracting the voltage $V_L$ from the midpoint potential $V_M$ are the same voltage. In addition, drain voltages of the FETs 2 and 3 change by the power supply circuits 35 and 36 outputting the voltages $V_H$ and $V_L$ in accordance with the instruction by the control signal Sc1, and as a result, the voltages (these are also powers) of the AC signal S1 to be output from the FETs 2 and 3 are caused to freely change.

Next, operations of the impedance measurement device 1E will be described with reference to the accompanying drawings. Note that measurement processing itself of measuring the internal impedance Zb of the battery Bat as a measurement target is similar to that of the impedance measurement devices 1, 1A, 1B, 1C, and 1D, repeated description will be omitted, and different processing will be described.

In the impedance measurement device 1E, the processing unit 7 (arithmetic circuit 77) outputs the control signal Sc1 to the signal generation circuit 31B of the signal injection unit 3 and controls a signal level and a frequency of the AC signal S1 in the impedance calculation processing. At this time, the signal generation circuit 31B generates the AC signal S1 which is a pulse signal including, as a basic wave, the frequency indicated by the control signal Sc1 and outputs the AC signal S1 to the FETs 2 and 3. Additionally, the FETs 2 and 3 input the AC signal S1 to the gate terminals via the resistors R5 and R6, respectively and perform push-pull amplification in a class D on the AC signal S1. Moreover, the power supply circuit 35 controls the voltage value of the voltage $V_H$ to be applied to the drain of the FET 2 such that the signal level of the AC signal S1 becomes the signal level indicated by the control signal Sc1. At the same time, the power supply circuit 36 controls the voltage value of the voltage $V_L$ to be applied to the drain of the FET 3 such that the signal level of the AC signal S1 becomes the signal level indicated by the control signal Sc1. In this manner, the FETs 2 and 3 of the signal generation circuit 31B generate and output the AC signal S1 in the signal level and at the frequency indicated by the control signal Sc1.

In this case, in a configuration in which the LC serial resonance circuit RC2 is not provided, the AC signal S1 is unlikely to flow through the signal injection winding W2 (or the signal injection winding W3) due to an inductance component of the signal injection winding W2 (or the signal injection winding W3) when the frequency of the AC signal S1 is high.

On the other hand, since the impedance measurement device 1E includes the LC serial resonance circuit RC2, the signal generation circuit 31B performs ON/OFF control on the four serial switches SW11 to SW14 in accordance with the frequency of the AC signal S1 generated by the signal generation circuit 31B and changes the capacity of the entire capacitor circuit CS by the processing unit 7 (arithmetic circuit 77) outputting the control signal Sc3 to the capacitor circuit CS. In other words, the processing unit 7 (arithmetic circuit 77) changes the resonance frequency of the LC serial resonance circuit RC2 to the frequency of the AC signal S1 or a frequency in the vicinity of the frequency. In this case, the control signal Sc3 is sequentially output to the capacitor circuit CS such that the frequency of the AC signal S1 becomes a resonance frequency that is or is in the vicinity of the frequency of the AC signal S1 to be swept when the frequency of the AC signal S1 is swept.

Therefore, since the impedance of the LC serial resonance circuit RC2 at the frequency of the AC signal S1 decreases, and the impedance of the LC serial resonance circuit RC2 at the frequency of the harmonic of the AC signal S1 increases, occurrence of harmonic distortion of the AC signal S1 within the current path including the LC serial resonance circuit RC2 from the sources of the FETs 2 and 3 is curbed. At the same time, since the impedance of the LPF 33 increases at the frequency of the harmonic of the AC signal S1, occurrence of harmonic distortion of the AC signal S1 is further curbed. As a result, the FETs 2 and 3 output the AC signal S1 of a sine wave. Also, even when the frequency of the AC signal S1 is high, the AC signal S1 is likely to flow through the signal injection winding W2 (or the signal injection winding W3) since the inductance component of the signal injection winding W2 (or the signal injection winding W3) is significantly small, and as a result, a loss of the AC signal S1 at the LC serial resonance circuit RC2 is sufficiently reduced. In addition, since the damping resistor R4 causes the Q value of resonance at the LC serial resonance circuit RC2 to decrease, the frequency characteristic of the LC serial resonance circuit RC2 becomes broad, and as a result, the aforementioned effect is sufficiently exhibited even if the frequency of the AC signal S1 generated by the signal generation circuit 31B and the resonance frequency of the LC serial resonance circuit RC2 are slightly different from each other. Therefore, the AC signal S1 of the sine wave is efficiently injected to the target injection line L as a secondary winding via the signal injection winding W2 (or the signal injection winding W3) as a primary winding.

Note that in this example, each of the capacitors C11 to C14 is defined to have a capacity obtained by multiplying $2^{Mb}$ (Mb is an integer from 0 to 4) by 0.025 μF as a specific capacity as an example, and it is thus possible to finely control the capacity of the entire capacitor circuit CS. On the other hand, since the capacitor circuit CS includes the four capacitors C11 to C14, the sweepable frequency bandwidth of the AC signal S1 is small. Therefore, it is possible to sufficiently increase the sweepable frequency bandwidth of the AC signal S1 by providing the many capacitors Cb and the serial switches SWb in the same number as that of the capacitors. In addition, the processing unit 7 (arithmetic circuit 77) can output the control signal Sc2 and control the parallel switches SW1 to SW4 with the signal injection winding W3 wound around the magnetic core 2 (or the magnetic core 2A). In this configuration, it is possible to change both the capacities of the capacitors C11 to C14 of the LC serial resonance circuit RC2 and the inductance of the signal injection winding W3 in accordance with the frequency of the AC signal S1 and to thereby further widen the sweepable frequency bandwidth of the AC signal S1.

However, only the capacity of the capacitor circuit CS may be changed, only the inductance of the signal injection winding W3 may be changed by using a capacitor at a specific capacity without using the capacitor circuit CS, or both the capacity of the capacitor circuit CS and the inductance of the signal injection winding W3 may be changed, to change the resonance frequency of the LC serial resonance circuit RC2. Please confirm. Moreover, it is possible to further increase the sweepable frequency bandwidth of the AC signal S1 by increasing the number (Na) of windings to be wound around the magnetic core 2 (or the magnetic core 2A) and the number (Na) of the serial switches SWa. In this case, it is possible to change the resonance frequency in a linear fashion by changing both the capacity of the capacitor circuit CS and the inductance of the signal injection winding W3 or increasing the number (Na) of winding to be wound around the magnetic core 2 (or the magnetic core 2A) and the number of serial switches SWa (Na). Furthermore, it is also possible to employ a band pass filter (BPF) instead of the LPF 33. In this configuration, the processing unit 7 (arithmetic circuit 77) adjusts low-band and high-band cut-off frequencies of the BPF to achieve a frequency band that allows passage of the AC signal S1. Furthermore, it is also possible to omit disposition of the LPF 33. In addition, it is also possible to use the primary winding component CP1B instead of the primary winding component CP1D. Also, in a case where it is not necessary to control the signal level of the AC signal S1, it is also possible to constitute the power supply circuits 35 and 36 by the power source devices with fixed voltages.

In this manner, in the impedance measurement devices 1, 1A, 1B, 1C, 1D, and 1E, the signal injection unit 3 injects the AC signal S1 to the core wire of the target injection line L in a non-contact manner, the non-contact-type current sensor 5 detects the current value of the injection current Ii flowing through the target injection line L in a non-contact manner with respect to the core wire of the target injection line L and outputs the detection signal S3 to the processing unit 7, the voltage detection unit 6 detects the voltage values of the AC signal S1 generated at ends of the battery Bat by being in contact with the ends and outputs the end-to-end voltage signal S4 to the processing unit 7, and the processing unit 7 (arithmetic circuit 77) inputs the detection signal S3 and the end-to-end voltage signal S4 and measures the internal impedance Zb (or the internal impedance Zc) of the battery Bat (or the battery cell Cel) on the basis of the detection signal S3 and the end-to-end voltage signal S4.

Therefore, according to the impedance measurement devices 1, 1A, 1B, 1C, 1D, and 1E, it is possible to use a component of a low breakdown voltage specification as a component constituting the signal injection unit 3 since the signal injection unit 3 injects the AC signal S1 to the core wire of the target injection line L in a non-contact manner even when a high voltage is present in the target injection line L to which the battery Bat is connected in series and the AC signal S1 for measurement is injected, and as a result, it is possible to reduce manufacturing costs of the signal injection unit 3, thus to sufficiently reduce manufacturing costs of the entire impedance measurement devices 1, 1A, 1B, 1C, 1D, and 1E, and to reliably measure the internal impedance Zb (or the internal impedance Zc) of the battery Bat (or the battery cell Cel) as the measurement target.

Also, the impedance measurement devices 1, 1A, 1B, 1C, 1D, and 1E include the aforementioned signal injection device 10, and it is possible to more reliably cause the magnetic flux Mc to be generated at the magnetic core 2, to more reliably and efficiently inject the AC signal S1 to the target injection line L, and as a result, to measure the internal impedance Zb (or the internal impedance Zc) of the battery Bat (or the battery cell Cel) with high accuracy by the processing unit 7 measuring the internal impedance Zb (or the internal impedance Zc) of the battery Bat (or the battery cell Cel) on the basis of the current value of the AC signal S1 flowing through the target injection line L (the current value of the injection current Ii: the detection signal S3) and the voltage values generated at the ends of the battery Bat (end-to-end voltage signal S4) when the AC signal S1 is injected to the target injection line L when the processing unit 7 measures the internal impedance Zb (or the internal impedance Zc) of the battery Bat (or the battery cell Cel) as a measurement target that is connected in series to the target injection line.

In addition, according to the impedance measurement devices 1, 1A, 1B, 1C, 1D, and 1E, the injection current Ii flows through the battery Bat and a minute AC voltage generated inside the battery Bat can be accurately detected even if the output voltage of the battery Bat is a significantly high voltage or in a case where noise such as switching noise is present in the surroundings of the load Load or the impedance measurement devices 1, 1A, 1B, 1C, 1D, and 1E, by the non-contact-type current sensor 5 detecting the injection current Ii (the current of the AC current) flowing through the target injection line L in a non-contact manner with respect to the target injection line L and outputting the detection signal S3 to the processing unit 7 and by the voltage detection unit 6 outputting the end-to-end voltage signal S4 detected by being in contact with the ends of the battery Bat that is a measurement target to the processing unit 7 in an insulated state from the battery Bat. Therefore, according to the impedance measurement devices 1, 1A, 1B, 1C, 1D, and 1E, it is possible to accurately measure the internal impedance Zb (or the internal impedance Zc) of the battery Bat (or the battery cell Cel). Also, according to the impedance measurement devices 1, 1A, 1B, 1C, 1D, and 1E, it is possible to measure the internal impedance Zb (or the internal impedance Zc) of the battery Bat (or the battery cell Cel) in a non-contact manner and without cutting the target injection line L, by using the non-contact-type current sensor 5.

Also, according to the impedance measurement devices 1, 1A, 1B, 1C, 1D, and 1E, it is possible to increase the ratio (S/N) of the signal level (S) with respect to the noise level (N) and to accurately measure the internal impedance Zb (or the internal impedance Zc) even when the signal level of the AC signal S1 injected to the target injection line L is small, by the arithmetic circuit 77 of the processing unit 7 (or 7A) calculating the internal impedance Zb (or the internal impedance Zc) of the battery Bat (or the battery cell Cel) as a measurement target on the basis of the in-phase component and the quadrature component of the injection current Ii (detection signal S3) as an AC current output from the quadrature detection circuit 75 and the in-phase component and the quadrature component of the end-to-end voltage signal S4 as the AC voltage output from the quadrature detection circuit 76.

Also, in the impedance measurement devices 1, 1A, 1B, 1C, 1D, and 1E, the signal injection unit 3 includes the primary winding component CP constituting the primary winding to be magnetically coupled to the target injection line L as the secondary winding and injects the AC signal S1 to the target injection line L by applying the AC signal S1 to the ends of the primary winding component CP. Additionally, in the impedance measurement devices 1, 1A, 1B, 1C, 1D, and 1E, the primary winding component CP is configured by winding the insulated coated wire around the magnetic core 2 with an annular shape into which the target injection line L is inserted. Therefore, according to the impedance measurement devices 1, 1A, 1B, 1C, 1D, and 1E, it is possible to simply constitute the primary winding component CP and to reliably inject the AC signal S1 to the target injection line L.

Also, according to the impedance measurement devices 1, 1A, 1B, 1C, 1D, and 1E, it is possible to avoid saturation of the magnetic core 2 by providing the gaps G at the magnetic cores 2 and 2A.

Also, in the impedance measurement devices 1, 1A, 1B, 1C, 1D, and 1E, the magnetic core 2 (or the magnetic core 2A) is configured of a plurality of C-type unit magnetic cores UC, and the plurality of unit magnetic cores UC are caused to overlap such that the separation distance between two mutually adjacent gaps G is equal along the outer periphery of the magnetic core 2 (or the magnetic core 2A) in a top view in the overlapping state. Therefore, according to the impedance measurement devices 1, 1A, 1B, 1C, 1D, and 1E, it is possible to stably inject the AC signal S1 to the target injection line L without decreasing the injection of the AC signal S1 to the target injection line L regardless of the position of the target injection line L even if the target injection line L inserted into the magnetic core 2 (or the magnetic core 2A) is located at a place near the gaps G.

In addition, in the impedance measurement devices 1, 1A, 1B, 1C, 1D, and 1E, the primary winding component CP includes the four (four is an example of Na) windings from the first winding Wd1 to the fourth winding Wd4 and four (four is an example of Na) parallel switches from the first parallel switch SW1 to the fourth parallel switch SW4 that are connected in parallel to the first winding Wd1 to the fourth winding Wd4, respectively, and the first winding Wd1 to the first winding Wd4 are wound such that the numbers of turns are different from each other. Therefore, according to the impedance measurement devices 1, 1A, 1B, 1C, 1D, and 1E, it is possible to accurately inject the AC signal S1 to the target injection line L regardless of how large or small the load impedance seen from the signal injection winding W3 is when the load Load is connected to the battery Bat and a closed loop state has been achieved, by changing the number of turns of the primary winding component CP overall. In addition, according to the impedance measurement devices 1A, 1B, 1C, 1D, and 1E, it is possible to increase an increase/decrease in number of turns as compared with the primary winding component CP (signal injection winding W2) configured such that the numbers of turns are the same.

Furthermore, according to the impedance measurement devices 1, 1A, 1B, 1C, 1D, and 1E, it is possible to finely control the number of turns of the primary winding component CP overall since the first winding Wd1 to the fourth winding Wd4 (an example in which Na is 4) are wound the number of times obtained by multiplying 1, 2, 4, and 8 (an example in which Ma of $2^{Ma}$ is each of integers from 0 to 3) by 10 (an example in which La is 10).

Also, according to the impedance measurement devices 1, 1A, 1B, 1C, 1D, and 1E, it is possible to use thin insulated coated wires (or enameled wires) as the windings Wd with larger numbers of turns since the first winding Wd1 to the first winding Wd4 are formed such that the wire diameters of the core wires in the insulated coated wires of the windings Wd with larger numbers of turns are thinner than the wire diameters of the core wires in the insulated coated wires of the windings Wd with smaller numbers of turns, and as a result, it is possible to sufficiently improve productivity of the signal injection winding W3.

Also, according to the impedance measurement devices 1D and 1E, the signal injection unit 3 includes the capacitor circuit CS that constitutes, along with the signal injection winding W2 (or the signal injection winding W3), the LC resonance circuit (the LC parallel resonance circuit RC1 or the LC serial resonance circuit RC2) having a resonance point at a frequency of the AC signal S1 or a frequency in the vicinity of the frequency, the AC signal S1 is thus likely to flow through the signal injection winding W2 (or the signal injection winding W3), and as a result, it is possible to sufficiently reduce a loss of the AC signal S1 at the LC resonance circuit (the LC parallel resonance circuit RC1 or the LC serial resonance circuit RC2).

Also, according to the impedance measurement devices 1D and 1E, the signal injection unit 3 includes the damping resistor R1 (or the damping resistor R4) that causes the Q value of the LC resonance circuit (the LC parallel resonance circuit RC1 or the LC serial resonance circuit RC2) to decrease, and it is thus possible to sufficiently reduce a loss of the AC signal S1 at the LC resonance circuit (the LC parallel resonance circuit RC1 or the LC serial resonance circuit RC2) even if the frequency of the AC signal S1 generated by the signal generation circuit 31A and the resonance frequency of the LC resonance circuit (the LC parallel resonance circuit RC1 or the LC serial resonance circuit RC2) are slightly different from each other.

Also, according to the impedance measurement devices 1D and 1E, the signal injection unit 3 includes the amplification circuit (the FET 1 or the FETs 2 and 3) for amplifying the AC signal S1, the LC resonance circuit (the LC parallel resonance circuit RC1 or the LC serial resonance circuit RC2) is disposed as a load circuit of the amplification circuit (the FET 1 or the FETs 2 and 3), and it is thus possible to cause the amplification circuit (the FET 1 or the FETs 2 and 3) to linearly amplify the AC signal S1 of a sine wave.

Also, according to the impedance measurement device 1D, one end of the LC parallel resonance circuit RC1 is connected to the voltage $V_H$ of a high potential, the amplification circuit is configured of an N-channel MOSFET (FET 1), and it is possible to simply constitute the amplification circuit (FET 1) by the other end side of the LC parallel resonance circuit RC1 being connected to the drain terminal, the source terminal being connected to the reference potential, and a pulse signal as the AC signal S1 being input to the gate terminal to thereby perform class-D amplification on the AC signal S1.

Also, according to the impedance measurement device 1D, the voltage $V_H$ of the high potential is configured to be variable, the drain voltage of the FET 1 changes, and as a result, it is possible to freely change the voltage (this is also a power) of the AC signal S1 to be output from the FET 1.

Also, according to the impedance measurement device 1E, it is possible to reliably perform class-D amplification on the AC signal S1 with the amplification circuits (FETs 2 and 3) configured of the push-pull circuits, by one end of the LC serial resonance circuit RC2 being connected to the reference potential, the amplification circuit being configured as a push-pull circuit by the N-channel MOSFET (FET 2) and the P-channel MOSFET (FET 3), the drain terminal of the FET 2 being connected to the voltage $V_H$ of a higher potential than the midpoint potential $V_M$ (reference potential), the drain terminal of the FET 3 being connected to the voltage $V_L$ of a lower potential than the midpoint potential $V_M$ (reference potential), the other end side (the LPF 33 side) of the LC serial resonance circuit RC2 being connected to each of source terminals of the FETs 2 and 3, a positive pulse signal as the AC signal S1 being input to the gate terminal of the FET 2, and a negative pulse signal as the AC signal S1 being input to the gate terminal of the FET 3 to perform class-D amplification on the AC signal S1.

Also, according to the impedance measurement device 1E, the voltage $V_H$ of the high potential and the voltage $V_L$ of the low potential are configured to be variable, the drain voltages of the FETs 2, 3 thus change, and as a result, it is possible to cause the voltages (these are also powers) of the AC signal S1 output from the FETs 2. 3 to be freely changed.

Also, according to the impedance measurement devices 1D and 1E, it is possible to reliably cause the amplification circuit (the FET 1 or the FETs 2 and 3) to linearly amplify the AC signal S1 of a sine wave by including any of the LPF 33 and the BPF that is connected in series to the LC resonance circuit (the LC parallel resonance circuit RC1 or the LC serial resonance circuit RC2) and allows passage of the AC signal S1.

Also, according to the impedance measurement devices 1D and 1E, the capacitor circuit CS includes the four capacitors from the first capacitor (capacitor C11) to the fourth capacitor (capacitor 14: an example in which Nb is 4) that are connected in parallel as a whole and four switches from the first serial switch (switch SW1) to the fourth serial switch (switch SW4) that are connected in series to the first capacitor (capacitor C11) to the fourth capacitor, respectively, and the processing unit 7 (arithmetic circuit 77) performs ON/OFF control on the four serial switches SWb in accordance with the frequency of the AC signal S1, changes the capacity of the entire capacitor circuit CS, and can thereby finely control the resonance frequency of the LC resonance circuit (the LC parallel resonance circuit RC1 or the LC serial resonance circuit RC2).

Also, according to the impedance measurement devices 1D and 1E, the first capacitor (capacitor C11) to the fourth capacitor have mutually different capacities, and it is thus possible to increase an increase/decrease in capacity as compared with the capacitor circuit CS configured by capacitors with the same capacity.

Also, according to the impedance measurement devices 1D and 1E, the first capacitor (capacitor C11) to the fourth capacitor (capacitor 14: the example in which Nb is 4) have capacities obtained by multiplying $2^{Mb}$ (Mb denotes four integers from 0 to (Nb−1:3)) by a specific capacity ("0.025 μF" in this example), respectively, and it is thus possible to change the capacity of the entire capacitor circuit CS and to thereby finely control the resonance frequency of the LC resonance circuit (the LC parallel resonance circuit RC1 or the LC serial resonance circuit RC2).

Also, in the impedance measurement devices 1, 1A, 1B, 1C, 1D, and 1E, the processing unit 7 (arithmetic circuit 77) controls the signal level of the AC signal S1 to be output from the signal injection unit 3 such that the current value of the injection current Ii (AC signal S1) detected by the non-contact-type current sensor 5 is within the target current value range. Also, in the impedance measurement devices 1, 1A, 1B, 1C, 1D, and 1E, the processing unit 7 (arithmetic circuit 77) controls ON/OFF of the first parallel switch SW1 to the fourth parallel switch SW4 such that the current value of the injection current Ii (AC signal S1) detected by the non-contact-type current sensor 5 is within the target current value range. Also, in the impedance measurement devices 1, 1A, 1B, 1C, 1D, and 1E, the processing unit 7 (arithmetic circuit 77) determines the load impedance of the target injection line L and performs ON/OFF of the first parallel switch SW1 to the fourth parallel switch SW4 on the basis of the current value (AC current Iac) of the AC signal S1 that the signal injection unit 3 is injecting to the target injection line L and the current value (injection current Ii) of the AC signal S1 detected by the non-contact-type current sensor 5, the number of turns of the primary winding component CP overall is thereby caused to increase when the determined load impedance is small, or the number of turns of the primary winding component CP overall is caused to decrease when the determined load impedance is large. Therefore, according to the impedance measurement devices 1, 1A, 1B, 1C, 1D, and 1E, it is possible to increase the ratio (S/N) of the signal level (S) with respect to the noise level (N) of the detection signal S3 and the end-to-end voltage signal S4, and as a result, it is possible to accurately measure the internal impedance Zb (or the internal impedance Zc) in the calculation processing (measurement processing) of the internal impedance Zb (or the internal impedance Zc) performed by the processing unit 7 (arithmetic circuit 77).

Also, according to the impedance measurement devices 1, 1A, 1B, 1C, 1D, and 1E, the non-contact-type current sensor 5 as a signal detection unit is separated as a separate member from the signal injection unit 3 and includes the secondary winding component CP2, and it is thus possible to avoid a leaking magnetic flux in accordance with the AC signal S1 injected by the signal injection winding W2 of the signal injection unit 3 becoming noise and leaking to the secondary winding component CP2 and to thereby accurately measure the internal impedance Zb (or the internal impedance Zc). In this case, it is also possible to employ, as a signal detection unit and independently from the non-contact-type current sensor 5, a configuration in which a secondary winding component forming a primary winding to be magnetically coupled to the target injection line L as a secondary winding is wound around the magnetic core 2 (2A). However, with the configuration, the leaking magnetic flux in accordance with the AC signal S1 injected by the signal injection winding W2 of the signal injection unit 3 becomes noise and leaks to the secondary winding component, and it is thus preferable to configure the signal detection unit as a separate element from the signal injection unit 3.

Also, according to the impedance measurement devices 1, 1A, 1B, 1C, 1D, and 1E, it is possible to achieve size reduction of the impedance measurement devices 1, 1A, 1B, 1C, 1D, and 1E and to sufficiently reduce manufacturing costs by the non-contact-type current sensor 5 (signal detection unit) having both the function of detecting the AC current Iac for measuring the internal impedance Zb (the configuration of the current detection unit) and the function of controlling the current value of the AC current Iac (the function of the signal detection unit).

Also, according to the impedance measurement devices 1B and 1C, it is possible to use the magnetic core 2 (or the magnetic core 2A) or the air core coil AC of a material for the best suitable coupling to the target injection line L in accordance with the frequency of the AC signal S1 and to thereby sufficiently efficiently inject the AC signal S1 to the target injection line L over a wide frequency band when the AC signal S1 is injected to the target injection line L by a transformer scheme, by grouping the frequency band of the AC signal S1 into groups and using the magnetic core 2 (or the magnetic core 2A) or the air core coil AC as the primary winding component CP in accordance with each frequency band group F.

Also, according to the impedance measurement devices 1B and 1C, it is possible to sufficiently efficiently inject the AC signal S1 to the target injection line L since the magnetic cores 2 (or the magnetic cores 2A) of the two types of materials for suitable coupling to the target injection line L are used in accordance with the frequency of the AC signal S1 at the boundary portion FLM (or the boundary portion FMH) by the signal injection unit 3 applying the AC signal S1 to the two primary winding components CP corresponding to the two adjacent frequency band groups F when the frequency of the AC signal S1 is changed from one of the frequency band groups F to the other frequency band group F at the boundary portion FLM (or the boundary portion FMH) of the two frequency band group F of the mutually adjacent frequency bands of the AC signal S1. Moreover, according to the impedance measurement devices 1B and 1C, it is possible to moderate variations in signal level of the AC signal S1 due to switching of the primary winding component CP that applies the AC signal S1 when the frequency of the AC signal S1 is changed from one of the frequency band groups F to the other frequency band group F at the boundary portion FLM (or the boundary portion FMH) of the two frequency band groups F of mutually adjacent frequency bands of the AC signal S1.

In addition, according to the impedance measurement devices 1, 1A, 1B, 1C, 1D, and 1E, it is possible to reliably inject the AC signal S1 of a high frequency band to the target injection line L with a simple configuration by configuring the primary winding component CP1B with the air core coil AC.

Also, according to the impedance measurement devices 1B and 1C, the signal injection unit 3 (signal generation circuit 31) includes a plurality of (two in the above example) primary winding components CP of identical specification and synchronously applies the AC signal S1 at the same frequency and in the same phase to the plurality of (two in the above example) primary winding components CP. With this configuration, the signal injection unit 3 can inject the injection current Ii of the sufficiently large current value to the target injection line L as compared with utilization of a single primary winding component CP.

Also, the impedance measurement device 1C includes a plurality of the voltage detection units 6, each of the plurality of voltage detection units 6 detects a voltage value of the AC signal S1 generated at each end of each battery cell Cel as a plurality of measurement targets that are connected in series to the target injection line L and outputs the end-to-end voltage signal S4 to the processing unit 7, and the processing unit 7 (arithmetic circuit 77) can synchronously measure the internal impedance Zb and the internal impedance Zc of the plurality of measurement targets (the battery Bat and Cel) by measuring the internal impedance Zc of each battery cell Cel on the basis of the detection signal S3 and the plurality of end-to-end voltage signal S4.

Also, the impedance measurement devices 1A, 1B, 1C, 1D, and 1E include the capacitor that is connected in parallel to ends of the load Load in the measurement target system in which the battery Bat as the measurement target and the load Load as the non-measurement target are connected with the target injection line L and forms a closed loop with an annular shape, and it is thus possible to increase the current value of the AC current Iac when the signal injection unit 3 injects the AC signal S1 to the target injection line L even if the impedance of the load Load is large.

Also, the impedance measurement devices 1A, 1B, and 1C include the class-D amplification unit as a final stage to constitute the signal injection unit 3, and the signal injection unit 3 can maintain the output level of the AC signal S1 at a controlled specific level even with respect to variations in load.

Moreover, according to the impedance measurement devices 1, 1A, 1B, 1C, 1D, and 1E, it is possible to supply the AC signal S1 that is a sine wave signal to the battery Bat, to constitute a frequency response as a measurable FRA, and to thereby perform impedance measurement with high accuracy by causing the aforementioned signal generation circuit 31 of the signal injection unit 3 to sweep the frequency of the AC signal S1.

In addition, according to the impedance measurement devices 1, 1A, 1B, 1C, 1D, and 1E, it is possible to constitute the magnetic core 2 (magnetic core 2A) that is unlikely to cause saturation with respect to a DC current by using any of a permalloy core, a sendust core, an amorphous core, a powder magnetic core, pure iron, a silicon steel plate, Permendur, nickel, cobalt, Fe—Si—Al, and electromagnetic stainless steel as the metal-based magnetic core, and it is possible to avoid occurrence of an eddy current at the magnetic core 2 (magnetic core 2A) by using any of Mn—Zn-based ferrite and Ni—Zn-based ferrite as the ferrite-based magnetic core.

Note that the signal injection device 10 is not limited to the application to the impedance measurement device and can be applied to various measurement tools that inject the AC signal S1 to the target injection line L to perform measurement. Also, the impedance measurement device is not limited to measurement of the internal impedance Zb of the battery Bat and the internal impedance Zc of the battery cell Cel and can measure impedances of various measurement targets. For example, it is also possible to set a water electrolysis cell electrolyzing water and manufacturing hydrogen as a measurement target, to connect the probes P1 and P2 to an anode and a cathode of a water electrolysis cell, and to measure the internal impedance of the water electrolyte cell in a closed loop in which the water electrolysis cell and the power source for the water electrolysis cell instead of the load Load are connected with the target injection line L. In this case, it is possible to synchronously measure each internal impedance of each water electrolysis cell in a state where a plurality of water electrolysis cells are connected in series, by using the impedance measurement device 1C.

Additionally, it is also possible to wind the winding W1 and the winding W2 around separate magnetic cores 2 in the impedance measurement device 1.

Moreover, it is also possible to apply the configuration of the signal generation circuit 31A in the impedance measurement device 1D and the configuration of the signal generation circuit 31B in the impedance measurement device 1E to the configuration of the signal generation circuit 31 in the impedance measurement devices 1, 1A, 1B, and 1C.

Also, although the examples of the impedance measurement devices 1, 1A, 1B, and 1C using the non-contact-type current sensor 5 as a current sensor for detecting the current value of the injection current Ii have been described, the current sensor is not limited to the non-contact type, and it is possible to employ a configuration in which a current transformer, a current detection resistor, or the like is disposed in the target injection line L to detect the current value of the injection current Ii.

Furthermore, in a case where it is not necessary to insulate the reference potential (floating ground) of the impedance measurement devices 1, 1A, 1B, 1C, 1D, and 1E, it is possible to omit the disposition of the insulating circuit 62 and to set the reference potential (ground) and the reference potential (floating ground) of the impedance measurement devices 1, 1A, 1B, 1C, 1D, and 1E to the same potential. In addition, the A/D conversion circuits 71, 72, and 73 can be provided in the signal generation circuit 31, the non-contact-type current sensor 5, and the voltage detection unit 6, respectively. Also, although the example in which the 2f signal generation circuit 31a and the ½ frequency division circuit 31b are configured as the signal generation circuit 31 has been described, it is also possible to employ a configuration in which the 2f signal generation circuit 31a and the ½ frequency division circuit 31b are provided separately and independently from the signal generation circuit 31.

Also, although the examples in which calculation of the impedance such as the internal impedance Zb (or the internal impedance Zc) of the battery Bat is performed through digital processing in the impedance measurement devices 1, 1A, 1B, 1C, 1D, and 1E have been described, it is also possible to employ a configuration in which the impedance is obtained through analog calculation performed by an analog circuit on the basis of the AC signal S1, the detection signal S3, and the end-to-end voltage signal S4.

INDUSTRIAL APPLICABILITY

According to the invention of the present application, it is possible to use a component of a low breakdown voltage specification as a component constituting the signal injection unit, and as a result, it is possible to reduce manufacturing costs of the signal injection unit, thus to sufficiently reduce manufacturing costs of the entire impedance measurement device, and to reliably measure the impedance of the measurement target. Therefore, the invention of the present application can be widely applied to such impedance measurement devices for measuring impedances.

REFERENCE SIGNS LIST 1, 1A to 1E Impedance measurement device
2, 2A Magnetic core
3, 3A Signal injection unit
31, 31A, 31B Signal generation circuit
33 Low pass filter
34 to 36 Power supply circuit
4, 4A to 4D Magnetic flux cancellation unit
41 Hall element
42 Voltage driver
43, 48 LPF
44 Adder circuit
45 Current driver
47 Synchronous detection circuit
5 Non-contact-type current sensor
6, 6-1, 6-2, 6-3 Voltage detection unit
61 Buffer circuit
62 Insulating circuit
7, 7A Processing unit 74 Phase shifter circuit
75, 76, 76-1, 76-2, 76-3 Quadrature detection circuit
77 Arithmetic circuit
10 Signal injection device
AC Air core coil
Bat Battery
C11 to C14 Capacitor
Cel1 to Cel3 Battery cell
CP1, CP1A, CP1B, CP1C, CP1D Primary winding component
CP2 Secondary winding component
CS Capacitor circuit
FL, FM, FH Frequency band group
FLM, FMH Boundary portion
G Gap
Ii Injection current
Load Load
R1, R4 Damping resistor
RC1 LC parallel resonance circuit
RC2 LC serial resonance circuit
S1 AC signal
S2 Voltage signal
S3 Detection signal
S4 end-to-end voltage signal
Sd Output signal
Sdc DC signal
Sr Reference signal
SW1 to SW4 Parallel switch
SW11 to SW14 Serial switch
UC Unit magnetic core
W1 Magnetic flux cancellation winding
W2, W3 Signal injection winding
Wd1 to Wd4 Winding
Zb Internal impedance
Zc Internal impedance

The invention claimed is:

1. An impedance measurement device comprising:
a signal injection unit configured to generate an AC signal for measurement and inject the AC signal to a target injection line to which a measurement target is connected in series;
a non-contact-type current detection unit configured to detect a current value of the AC signal flowing through the target injection line in a non-contact manner with respect to the target injection line, and output a current detection signal;
a voltage detection unit configured to detect a voltage value of the AC voltage generated at ends of the measurement target by being in contact with the ends, and output a voltage detection signal; and
a processing unit configured to receive input of the current detection signal and the voltage detection signal and measure an impedance of the measurement target on the basis of the current detection signal and the voltage detection signal,
wherein the signal injection unit is configured to inject the AC signal to the target injection line in a non-contact manner.

2. The impedance measurement device according to claim 1, wherein the voltage detection unit includes an insulating circuit configured to output the detected voltage detection signal to the processing unit in a state where the voltage detection unit is insulated from the measurement target.

3. The impedance measurement device according to claim 1,
wherein the processing unit includes
a first quadrature detection circuit configured to receive input of the AC signal, perform quadrature detection on the current detection signal, and generate an in-phase component and a quadrature component of the AC current,
a second quadrature detection circuit configured to receive input of the AC signal, perform quadrature detection on the voltage detection signal, and generate an in-phase component and a quadrature component of the AC voltage, and
an arithmetic circuit configured to compute the impedance of the measurement target on the basis of the in-phase component and the quadrature component of the AC current output from the first quadrature detection circuit and the in-phase component and the quadrature component of the AC voltage output from the second quadrature detection circuit.

4. The impedance measurement device according to claim 1, wherein the signal injection unit includes a primary winding component constituting a primary winding to be magnetically coupled to the target injection line as a secondary winding, the signal injection unit injecting the AC signal to the target injection line by applying the AC signal to the primary winding component.

5. The impedance measurement device according to claim 4, wherein the primary winding component includes an insulated coated wire wound around a first magnetic core, the first magnetic core having an annular shape and being configured to receive insertion of the target injection line.

6. The impedance measurement device according to claim 5, wherein the first magnetic core is provided with gaps.

7. The impedance measurement device according to claim 6, wherein
the first magnetic core is configured of a plurality of C-type unit magnetic cores, and
the plurality of unit magnetic cores overlap each other such that a separation distance between two of the gaps being mutually adjacent is equal along an outer periphery of the first magnetic core in a top view in an overlapping state.

8. The impedance measurement device according to claim 5, wherein
the primary winding component includes Na windings from a first winding to an Na-th winding (Na is an integer greater than or equal to two) that are configured of the insulated coated wires wound around the first magnetic core and are connected in series as a whole, and Na switches from a first parallel switch to an Na-th parallel switch that are connected in parallel to the first winding to the Na-th winding, respectively, and
the processing unit performs ON/OFF control on the Na parallel switches to change the number of turns of the primary winding component overall.

9. The impedance measurement device according to claim 8, wherein each of the first winding to the Na-th winding is wound such that the numbers of turns are different from each other.

10. The impedance measurement device according to claim 9, wherein each of the first winding to the Na-th winding is wound a number of times obtained by multiplying $2^{Ma}$ (Ma denotes Na integers from 0 to (Na−1)) by La being an integer greater than or equal to 1.

11. The impedance measurement device according to claim 9, wherein the first winding to the Na-th winding are formed such that wire diameters of core wires in the insulated coated wires of windings with larger numbers of turns are thinner than wire diameters of core wires in the insulated coated wires of windings with smaller numbers of turns.

12. The impedance measurement device according to claim 8, comprising:
a signal detection unit configured to detect a current value of the AC signal flowing through the target injection line, wherein
the processing unit performs ON/OFF control on the first parallel switch to the Na-th parallel switch such that a current value of the AC signal detected by the signal detection unit is within the target current value range.

13. The impedance measurement device according to claim 8, comprising:
a signal detection unit configured to detect a current value of the AC signal flowing through the target injection line, wherein
the processing unit determines a load impedance of the target injection line and performs ON/OFF control on the first parallel switch to the Na-th parallel switch on the basis of a current value of the AC signal injected by the signal injection unit to the target injection line and a current value of the AC signal detected by the signal detection unit, to thereby increase the number of turns of the primary winding component overall when the determined load impedance is small or decrease the number of turns of the primary winding component overall when the determined load impedance is large.

14. The impedance measurement device according to claim 5, wherein
the signal injection unit includes a plurality of the primary winding components made to correspond to a plurality of frequency band groups grouped from a frequency band of the AC signal to be generated, respectively, and when injecting the AC signal of a frequency belonging to one frequency band group of the plurality of frequency band groups, the signal injection unit applies the AC signal to ends of the primary winding component corresponding to the one frequency band group,
the frequency band is grouped into two frequency band groups,
the first magnetic core in the primary winding component made to correspond to a frequency band group on a low frequency band side of the two frequency band groups is configured of a metal-based magnetic core, and
the first magnetic core in the primary winding component made to correspond to a frequency band group on a high frequency band side of the two frequency band groups is configured of a ferrite-based magnetic core.

15. The impedance measurement device according to claim 14, wherein the signal injection unit is configured to change a frequency of the AC signal, and applies the AC signal to two of the primary winding components corresponding to two frequency band groups of the plurality of frequency band groups when changing the frequency of the AC signal from one of the two frequency band groups to another of the two frequency band groups at a boundary portion of the two frequency band groups, the two frequency band groups having mutually adjacent frequency bands of the AC signal.

16. The impedance measurement device according to claim 14, wherein the metal-based magnetic core is any of a permalloy core, a sendust core, an amorphous core, a powder magnetic core, pure iron, a silicon steel plate, Permendur, nickel, cobalt, Fe—Si—Al, and electromagnetic stainless steel, and the ferrite-based magnetic core is any of Mn—Zn-based ferrite and Ni—Zn-based ferrite.

17. An impedance measurement device according to claim 5, wherein
the signal injection unit includes a plurality of the primary winding components made to correspond to a plurality of frequency band groups grouped from a frequency band of the AC signal to be generated, respectively, and when injecting the AC signal of a frequency belonging to one frequency band group of the plurality of frequency band groups, the signal injection unit applies the AC signal to ends of the primary winding component corresponding to the one frequency band group,
the frequency band is grouped into three frequency band groups,
the first magnetic core in the primary winding component made to correspond to a frequency band group on a low frequency band side among the three frequency band groups is configured of a metal-based magnetic core,
the first magnetic core in the primary winding component made to correspond to a frequency band group on a middle frequency band side among the three frequency band groups is configured of a ferrite-based magnetic core, and
the primary winding component made to correspond to a frequency band group on a high frequency band side among the three frequency band groups is configured of an air core coil.

18. The impedance measurement device according to claim 4, wherein the signal injection unit includes a capacitor circuit that constitutes, with the primary winding, an LC resonance circuit that has a resonance point at a frequency of the AC signal or at a frequency in a vicinity of the frequency.

19. The impedance measurement device according to claim 18, wherein the signal injection unit includes a damping resistor configured to cause a Q value of the LC resonance circuit to decrease.

20. The impedance measurement device according to claim 18,
wherein the signal injection unit includes an amplification circuit configured to amplify the AC signal, and
the LC resonance circuit is disposed as a load circuit of the amplification circuit.

21. The impedance measurement device according to claim 20,
wherein the LC resonance circuit is configured of an LC parallel resonance circuit in which one end of the LC resonance circuit is connected to a high potential, and
the amplification circuit is configured of an N-channel MOSFET in which a side of a second end of the LC resonance circuit is connected to a drain terminal, a source terminal is connected to a low potential, and a pulse signal serving as the AC signal is input to a gate terminal, to thereby perform class-D amplification on the AC signal.

22. The impedance measurement device according to claim 21, wherein a voltage of the high potential is configured to be variable.

23. The impedance measurement device according to claim 20,
wherein the LC resonance circuit is configured of an LC serial resonance circuit in which a first end of the LC resonance circuit is connected to a reference potential, and
the amplification circuit is configured as a push-pull circuit by an N-channel MOSFET and a P-channel MOSFET in which a drain terminal of the N-channel MOSFET is connected to a high potential as compared with the reference potential, a drain terminal of the P-channel MOSFET is connected to a low potential as compared with the reference potential, a side of a second end of the LC serial resonance circuit is connected to a source terminal of the N-channel MOSFET and a source terminal of the P-channel MOSFET, a positive pulse signal serving as the AC signal is input to a gate terminal of the N-channel MOSFET, and a negative pulse signal serving as the AC signal is input to a gate terminal of the P-channel MOSFET, to thereby perform class-D amplification on the AC signal.

24. The impedance measurement device according to claim 23, wherein each of a voltage of the high potential and a voltage of the low potential is configured to be variable.

25. The impedance measurement device according to claim 18, comprising: either an LPF or a BPF that is connected in series to the LC resonance circuit and allows passage of the AC signal.

26. The impedance measurement device according to claim 18,
wherein the capacitor circuit includes Nb capacitors from a first capacitor to an Nb-th capacitor (Nb is an integer greater than or equal to 2) that are connected in parallel as a whole, and
Nb switches from a first serial switch to an Nb-th serial switch connected in series to the first capacitor to the Nb-th capacitor, respectively, and
the processing unit performs ON/OFF control on the Nb serial switches in accordance with a frequency of the AC signal to change a capacity of the entire capacitor circuit.

27. The impedance measurement device according to claim 26, wherein the first capacitor to the Nb-th capacitor have mutually different capacities.

28. The impedance measurement device according to claim 27, wherein each of the first capacitor to the Nb-th capacitor has a capacity obtained by multiplying $2^{Mb}$ (Mb denotes Nb integers from 0 to (Nb−1)) by a specific capacity.

29. The impedance measurement device according to claim 4, wherein the primary winding component is configured of an air core coil.

30. The impedance measurement device according to claim 4, wherein the signal injection unit includes a plurality of the primary winding components of identical specification, and synchronously applies the AC signal of the same frequency and the same phase to the plurality of primary winding components of identical specification.

31. The impedance measurement device according to claim 1, comprising:
a signal detection unit configured to detect a current value of the AC signal flowing through the target injection line, wherein
the processing unit controls a signal level of the AC signal output from the signal injection unit such that a current value of the AC signal detected by the signal detection unit is within a target current value range.

32. The impedance measurement device according to claim 31, wherein the signal detection unit includes a secondary winding component that is formed as a separate member from the signal injection unit and forms a secondary winding to be magnetically coupled to the target injection line as a primary winding.

33. The impedance measurement device according to claim 31, wherein the signal detection unit functions as the current detection unit.

34. The impedance measurement device according to claim 1, comprising:
a plurality of the voltage detection units, wherein
each of the plurality of voltage detection units detects a voltage value of the AC voltage generated at each of the ends of the plurality of measurement targets connected in series to the target injection line by being in contact with the end, and outputs the voltage detection signal to the processing unit, and
the processing unit measures each of impedances of the plurality of measurement targets on the basis of the current detection signal and a plurality of the voltage detection signals output from the plurality of voltage detection units, respectively.

35. The impedance measurement device according to claim 1, comprising:
a capacitor connected in parallel to ends of a non-measurement target in a measurement target system in which the measurement target and the non-measurement target are connected with the target injection line to form a closed loop with an annular shape.

36. The impedance measurement device according to claim 1, wherein the signal injection unit includes a class-D amplification unit as a final stage and injects the AC signal amplified by the class-D amplification unit to the target injection line.

37. The impedance measurement device according to claim 1, wherein the signal injection unit sweeps a frequency of the AC signal.

* * * * *